US010229390B2

(12) United States Patent
Courson et al.

(10) Patent No.: US 10,229,390 B2
(45) Date of Patent: Mar. 12, 2019

(54) METHOD OF EARLY CASE ASSESSMENT IN LAW SUITS

(75) Inventors: Gardner G. Courson, Skillman, NJ (US); Vincent J. Miraglia, Vienna, VA (US); Blane A. Erwin, Kingwood, TX (US); Patrick T. O'Donnell, Houston, TX (US)

(73) Assignee: Bridgeway Software, Inc., Chicago, IL (US)

( * ) Notice: Subject to any disclaimer, the term of this patent is extended or adjusted under 35 U.S.C. 154(b) by 1657 days.

(21) Appl. No.: 13/014,001

(22) Filed: Jan. 26, 2011

(65) Prior Publication Data

US 2011/0119198 A1 May 19, 2011

Related U.S. Application Data

(63) Continuation of application No. 10/673,050, filed on Sep. 26, 2003, now Pat. No. 7,974,850.

(51) Int. Cl.
*G06Q 10/10* (2012.01)
*G06Q 50/18* (2012.01)

(52) U.S. Cl.
CPC ............ *G06Q 10/10* (2013.01); *G06Q 50/18* (2013.01); *G06Q 50/188* (2013.01)

(58) Field of Classification Search
CPC ....... G06Q 10/10; G06Q 50/18; G06Q 50/188
USPC .................................................. 705/311, 1.1
See application file for complete search history.

(56) References Cited

U.S. PATENT DOCUMENTS

| | | | | |
|---|---|---|---|---|
| 6,738,760 | B1 * | 5/2004 | Krachman | |
| 7,058,661 | B2 * | 6/2006 | Ciaramitaro et al. | |
| 7,197,716 | B2 * | 3/2007 | Newell et al. | 715/760 |
| 2003/0112270 | A1 | 6/2003 | Newell et al. | |

OTHER PUBLICATIONS

J.D. Shomper et al., "Alternative Fees for Litigation: Improved Control and Higher Value," ACCA Docket (May 2000), pp. 1-18.
McGuire, Woods, Battle & Boothe, LLP, "Early Case Assessment: Employment Litigation" Slide Presentation 1998.
"A New Era The Dupont Legal Model" 1997.

(Continued)

*Primary Examiner* — Carrie S Gilkey
(74) *Attorney, Agent, or Firm* — Blank Rome, LLP

(57) ABSTRACT

A tool which provides a data collection mechanism to guide through various steps in the litigation process and directs users to determine required information. A "Discovery Generator" captures potential discovery requests, which are linked to existing document and form production tools for facilitated production of discovery. The tool provides methodologies that quantify subjective analyzes through the use of weighted measuring schemes. The tool provides a decision tree structure underlying the various steps of the methodology activated by user's answers to queries to aid in the capture and analysis of information. The tool directs users to assign values to reflect the importance of various litigation aspects. Based on the values that are assigned, assessment of the particular aspect of the litigation which is captured through the queries mentioned above, and statistical assessments of likely outcomes, the tool provides counsel with suggested paths forward or an overall assessment of the case.

4 Claims, 101 Drawing Sheets

(56) References Cited

OTHER PUBLICATIONS

Leaps & Bounds, "Moving Ahead With the DuPont Legal Model" 2001.

Screenshots from Litigation Risk Analysis Claim Evaluation, Oct. 2000.

G.G. Couson et al., "Metrics for Success in DuPont's Legal Risk Analysis," Chief Legal Officer, Summer 2002, pp. 29-31.

* cited by examiner

Early Case Assessment: Employment Litigation

Fig. 3
TACTIX
Attorney Client Communication / Attorney Work Product
Cases
Administration
About Tactix
Show Historical
Name
Venue
Type
Open Date
Client
Dana Webster v. Silicon Union, Corp.
M.D. Florida
Age / Termination
09/16/2002
Silicon Union, Corp.
Leonard Ball v. Wong, Cabello
E.D. Massachusetts
Race / Termination
09/17/2002
General Electric
Michel Burns v. Silicon Union, Corp.
S.D. New York
Race / Demotion
01/27/2003
Silicon Union, Corp.
Odessa Catton v. Silicon Union, Corp.
S.D. Mississipi
Sex / Failure to Promote
11/18/2002
Silicon Union, Corp.
Patricia Norman v. Silicon Union, Corp.
C.D. California
Age / Demotion
12/09/2002
Silicon Union, Corp.
Terry Vasquez v. Silicon Union, Corp.
N.D. Georgia
National Origin / Termi...
02/10/2003
Silicon Union, Corp.
Test Case
06/20/2002
General Electric
Test Case 2
Venue
Racial Termination
06/20/2002
General Electric
Tia Carrillo v. Wong, Cabello
E.D. Massachusetts
Race / Termination
06/20/2002
General Electric
Victoria Ennis v.Wong, Cabello
E.D. Virginia
Sex / Failure to Promote
06/20/2002
General Electric
William Windham v. Silicon Union, Corp.
N.D. California
Race / Termination
04/01/2003
Silicon Union, Corp.
Show Primary Contacts
Search:
Open
Vinnie
1.1.0.8
302
302

300

312

METHOD OF EARLY CASE ASSESSMENT IN LAW SUITS

RELATED APPLICATIONS

The present disclosure is a continuation of U.S. application Ser. No. 10/673,050, now U.S. Pat. No. 7,974,850, entitled "Method of Early Case Assessment in Law Suits," by Gardner G. Courson, Patrick T. O'Donnell, Blane A. Erwin, and Vincent J. Miraglia, filed Sep. 26, 2003, which is hereby incorporated by reference.

BACKGROUND OF THE INVENTION

1. Field of the Invention

The invention pertains generally to knowledge management tools, and more particularly to an integrated computer-based system for capturing and managing legal knowledge in making an assessment of the strengths and weaknesses of a lawsuit.

2. Description of the Related Art

Litigation, even relatively simple litigation, is complicated and, as a result, expensive. Because of the complexity and the overall vagaries of litigation, skilled lawyers must be used to make many judgment calls during the course of the case. The reliability of the judgment calls relies on both the amount of relevant data gathered and the experience level of the lawyer. But both gathering more data and using more experienced lawyers increase costs. While this may be acceptable if litigation is infrequent, and thus creates a low overhead burden, or in unusual areas, it becomes difficult when litigation volumes increase, particularity in relatively repetitive situations. In those situations defendants, typically large corporations, begin investigating alternate fee arrangements. However, it is difficult balancing risk between the client and the lawyers. And it is especially difficult because this is usually done very early in the case. To even gather enough information to start to make more reasoned decisions may be expensive itself.

Many articles have been written on topic. One is "Alternative Fees for Litigation: Improved Control and Higher Value" by James D. Shopper and Gardner G. Courson, published in ACCA Docket (May 2000). The article illustrates a flowchart used for early case assessment in employment litigation, a very large litigation area in large corporations. The flowchart is reproduced as FIGS. 1A and 1B. The flowchart basically describes and outlines the pre-trial steps performed in employment litigation. While this is helpful, as noted above, large costs are often incurred in this process, due to the amount of data to be collected coupled with the requirement that much of it must be directly handled, managed and/or reviewed by skilled, and thus expensive, lawyers.

Thus it is desirable to reduce the costs of gathering the information and assessing a case but at the same time not lose any of the knowledge provided by the skilled lawyers.

SUMMARY OF THE INVENTION

In order to analyze a lawsuit quickly and in a cost-effective manner, an early case assessment tool has been developed. This tool is designed to achieve the following goals: cost savings, better results, increased client satisfaction, better litigation management, and more efficient lawyering.

Initially, the tool assists counsel to efficiently identify business problems and legal issues; develop the components of an early case assessment; and properly define goals, potential outcomes, and a successful conclusion.

The tool provides counsel with a data collection mechanism. This mechanism guides counsel through various steps in the litigation process and directs counsel and/or legal assistants to determine what information is required to reach the stated goals. For example, the tool provides a "Discovery Generator" that is available to capture counsel's potential discovery requests, which are normally thought of during the process of reviewing documents and then forgotten or lost. These potential discovery requests are captured and stored. Later, when discovery requests are called for, the tool provides links to existing document and form production tools for facilitated production of discovery, such as Interrogatories or Requests for Production. Links to these document and form production tools are available at various steps in the use of the tool.

A tool according to the invention also can inform the user of the percentage of progress of the required information that has been entered. In this way, the user may identify at what point an assessment of the case may be made with confidence. If insufficient information to allow the user to make an early case assessment with confidence has been gathered, this lack of information is reflected in a percentage metric provided by the tools.

The tool also may interface with third-party databases to obtain expert research or advice on specific disciplines, such as medical research, juror profiles and certain scientific data. Additionally, the tool stores this information and makes it easily accessible for the following analytical aspects of the tool.

The tool also provides an analytical framework that captures the judgment of seasoned practitioners to provide a comprehensive analysis of the legal, factual, and business aspects of the lawsuit. The tool provides methodologies that quantify what have traditionally been anecdotal or subjective analyses through the use of weighted measuring schemes.

These measuring schemes are incorporated into steps that are designed to assist counsel to make a factual assessment, a legal assessment, a staffing assessment, a business assessment, and a budget assessment of the lawsuit. The tool provides a decision tree structure underlying the various steps of the methodology activated by user's answers to yes/no queries to further aid in both the capture and analysis of information.

Additionally, the tool directs counsel to assign values to reflect the importance of various aspects of the litigation. Based on (1) the values that are assigned, (2) counsel's assessment of the particular aspect of the litigation which is captured through the yes/no queries mentioned above, and (3) statistical assessments of likely outcomes based on historical records of previously captured information and analogous assessments, the tool provides counsel with suggested paths forward.

This process will occur on both a step by step basis as well as with an overall assessment of the case. Through this multi-step process, counsel, in cooperation with the client, analyze the strengths and weaknesses of the case and determines the appropriate path forward. This process is conducted in cooperation with other counsel involved in the case in order to reduce costs and to promote efficiency.

Finally, by making the above assessments counsel will be able to present an informed conclusion to the client. Counsel will present a detailed analysis of each assessment, review the strengths and weaknesses of the case, and make recommendations for a path forward.

Because of the automated nature of the tool, lower skilled individuals, thus less expensive individuals, can use the tool. This decreases overall cost, with the structure and analysis incorporated in the tool maintaining the desired level of skilled review.

DETAILED DESCRIPTION OF THE PREFERRED EMBODIMENTS

Figure 1A:
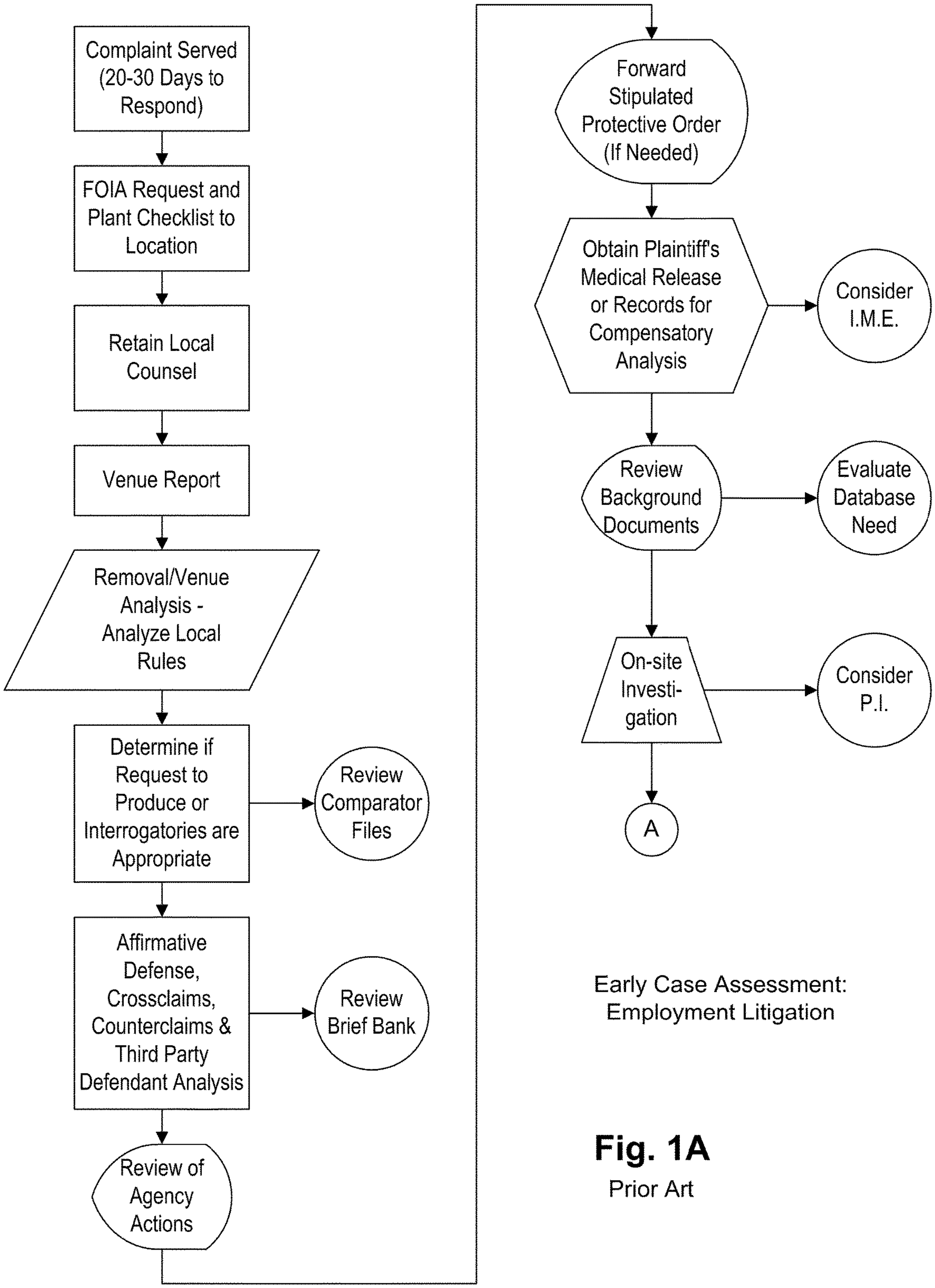
FIGS. 1A and 1B show a prior art flowchart capturing the methodology involved in making an early case assessment of an employment lawsuit.
Figure 1B:
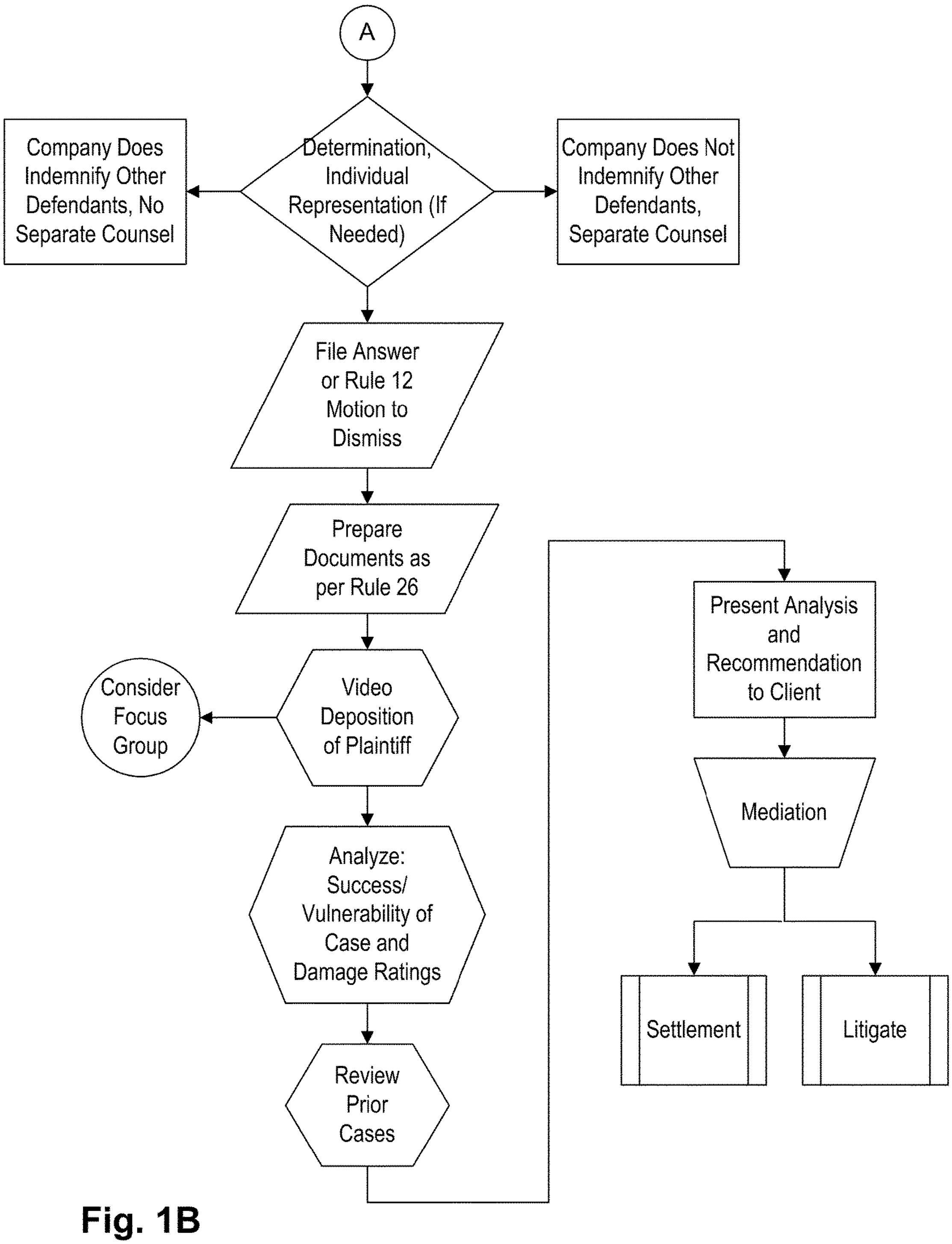

Referring now to FIGS. 1A and 1B, the prior art flowchart for the general flow and operation of employment litigation prior to actual trial is illustrated. It will not be reviewed in any great detail as it is readily understandable by merely reviewing the Figures, but it is also very clear from many of the required steps that a great deal of labor is required to gather the data and a great deal of skill is required to make any determinations and evaluations that are necessary.

Figure 2:
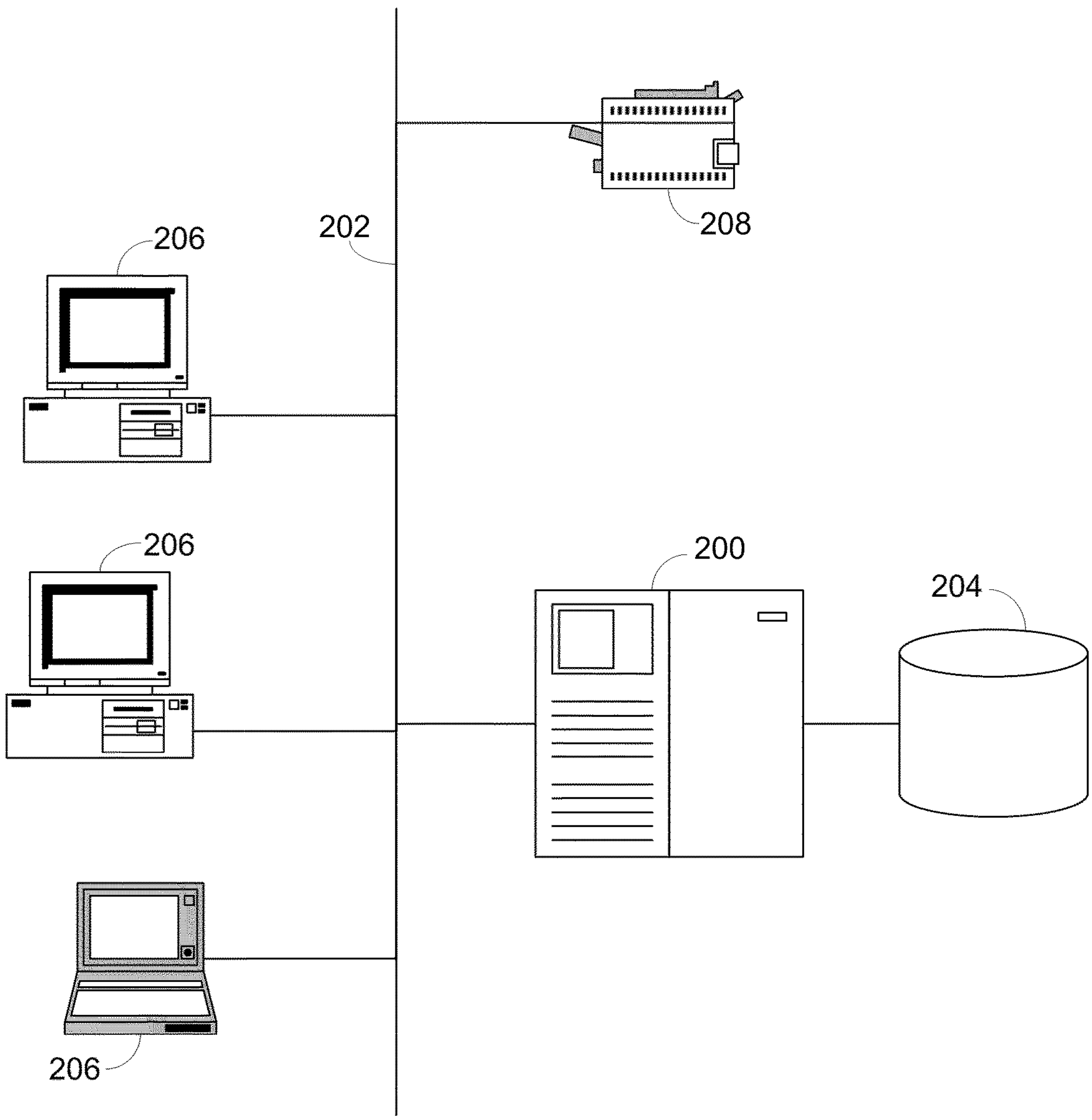
FIG. 2 is a block diagram of an exemplary computer system for operating a tool according to the preferred embodiment.

FIG. 2 illustrates an exemplary computer system for operating a tool according to the present invention. A server 200 is connected to a network 202. Storage 204 is connected to the server 200 to provide storage space for the programs and data. A series of workstations 206 are connected to the network 202 to communicate with the server 200. Also, of course, a printer 208 is connected to the network 202 to provide hard copy output. In the preferred embodiment the actual tool runs as a series of Java applications loaded from the server 200 by certain runtime pieces that are installed locally on the workstation 206. The workstation 206 runtime package references a particular IP address dedicated to the server 200 and from there downloads and executes Java applets to perform the desired functions. It is of course fully understood that this particular Java implementation and the client/server orientation is exemplary and numerous other languages and application locations could be used. For example, it would be common to do a more fully featured client application on the workstation 206, which would then have a backend interface into a database running in the server 200.

Figure 3:
FIG. 3 shows an example of the initial screen interface from which a user may select a matter for developing an early case assessment.
Figure 4:
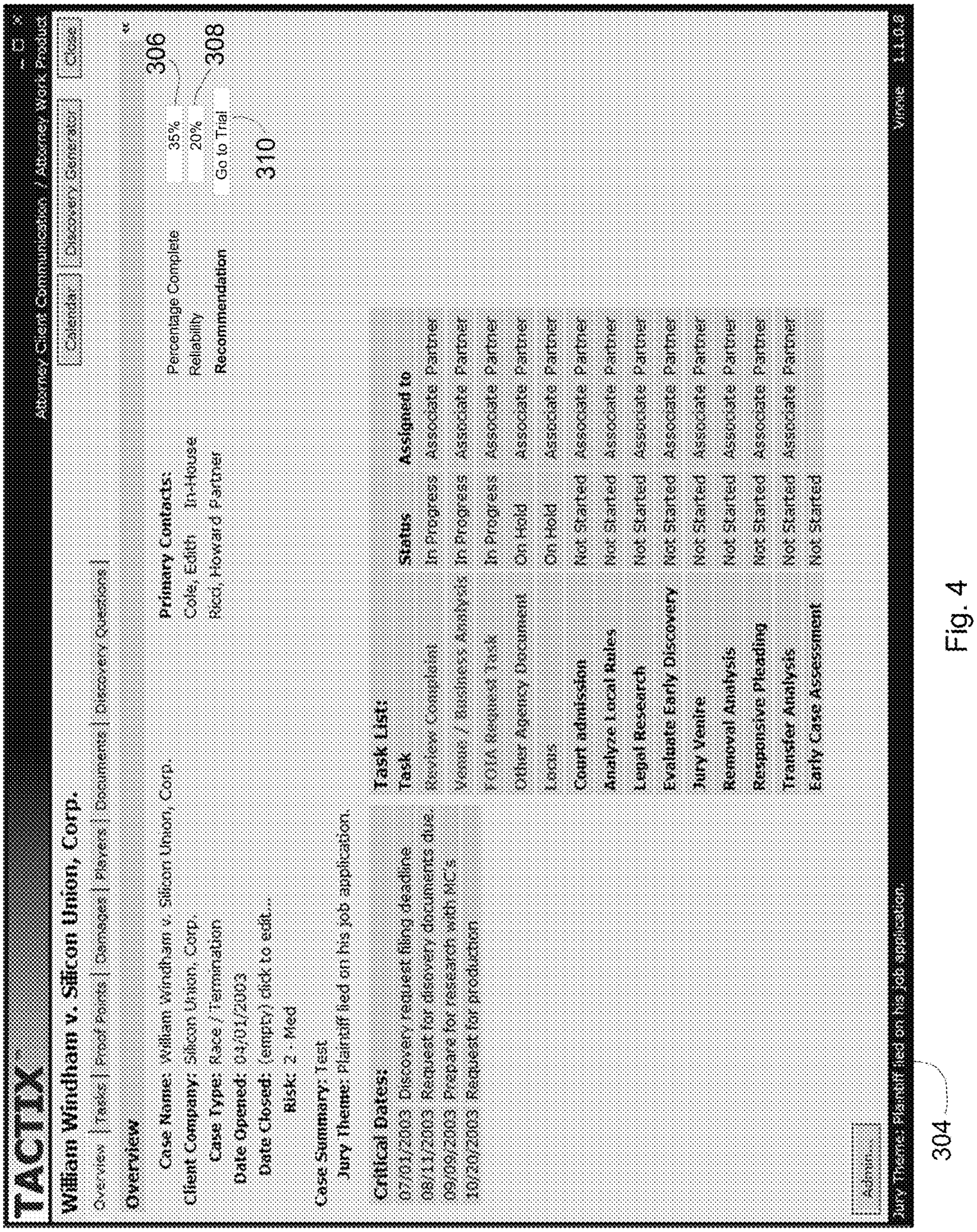
FIG. 4 shows an example screen interface displaying both basic information about the case and providing links to allow a user systematically to conduct the early case assessment.

Referring then to FIG. 3, the initial screen shot or interface 300 of a tool according to the preferred embodiment is shown. A series of case styles 302 are illustrated and selectable by the user. When a case is selected, the overview screen shot 304 of FIG. 4 is presented. As can be seen, this screen 304 provides overview information on the particular case, such as the parties, the type of case, and so on. Certain docketing or date information and task information is also presented. A list of other information, such as proof point information, could also be included for summary review. The task information list allows quick review of task status. It is further noted that on the right-hand side of the screen 304 are three boxes that indicate percentage complete 306, reliability 308 and recommendation 310. The percentage complete 306 value is an indication of how much of the actual data that needs to be collected for the particular case has been obtained. The reliability 308 value is an indication based on the data that has been collected of the reliability of a particular recommendation presented in the recommendation 310 value. As more data is collected, a) the percentage completion 306 value will go up and b) the reliability 308 value will go up. However, they are not necessarily linear. There may be certain facts or data which are particularly more relevant toward the reliability rating and therefore the two are independent values. In addition, and not shown, certain facts or data may be extremely important and markers or indicators to indicate such facts or data may also be provided on this overview screen 304. The third box is the recommendation 310 value. This is based on the analysis of the collected data and case history review of similar cases and provides a recommendation as to the assessment and procedure for the particular case. This is described in more detail below. In the indicated value it says "Go to Trial." Other options are, of course, dismiss, settle, and so on as common in employment litigation in the illustrated example.

Figure 5:
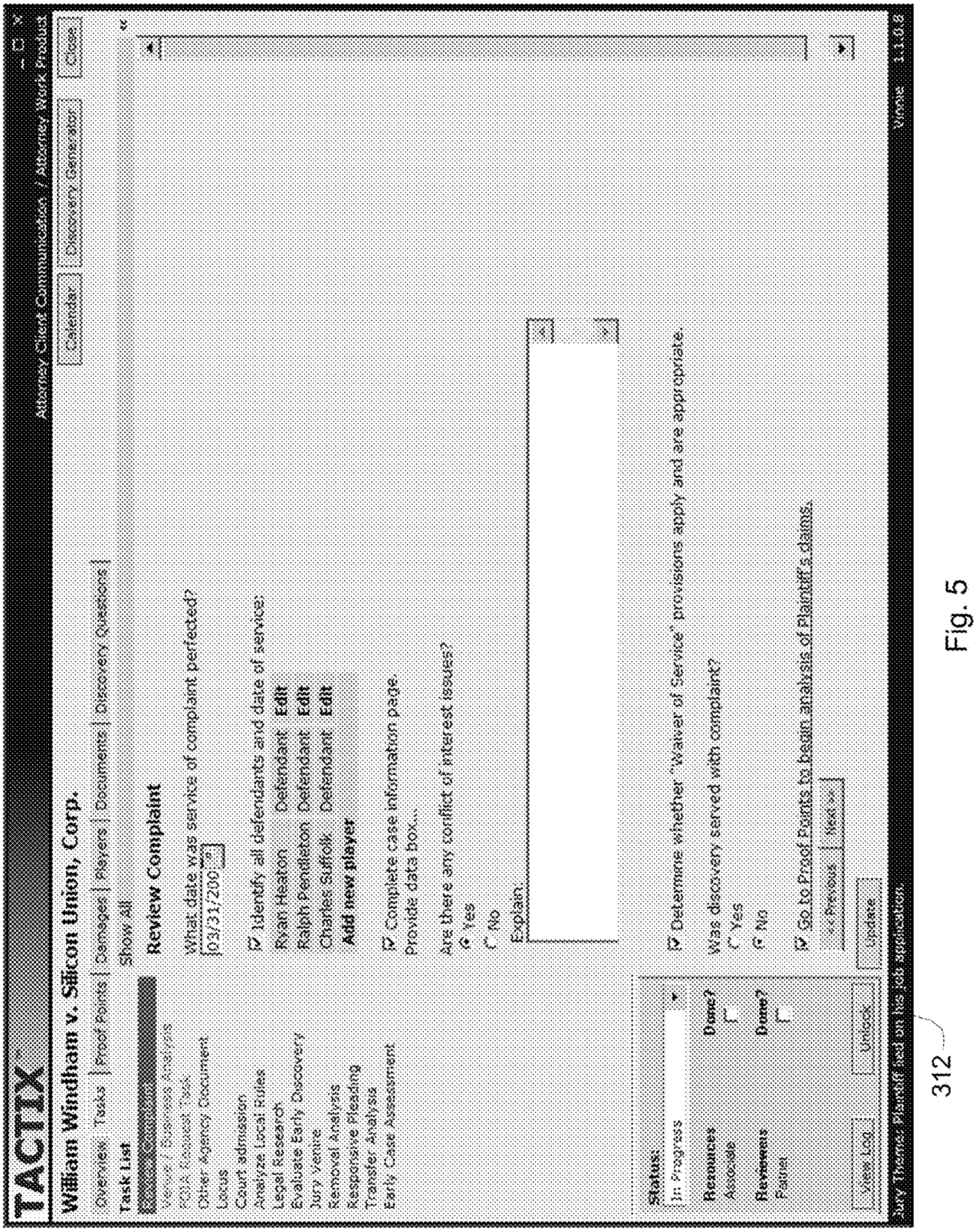
FIGS. 5 to 31 show example screen interfaces for performing early tasks and gathering related data.
Figure 6:
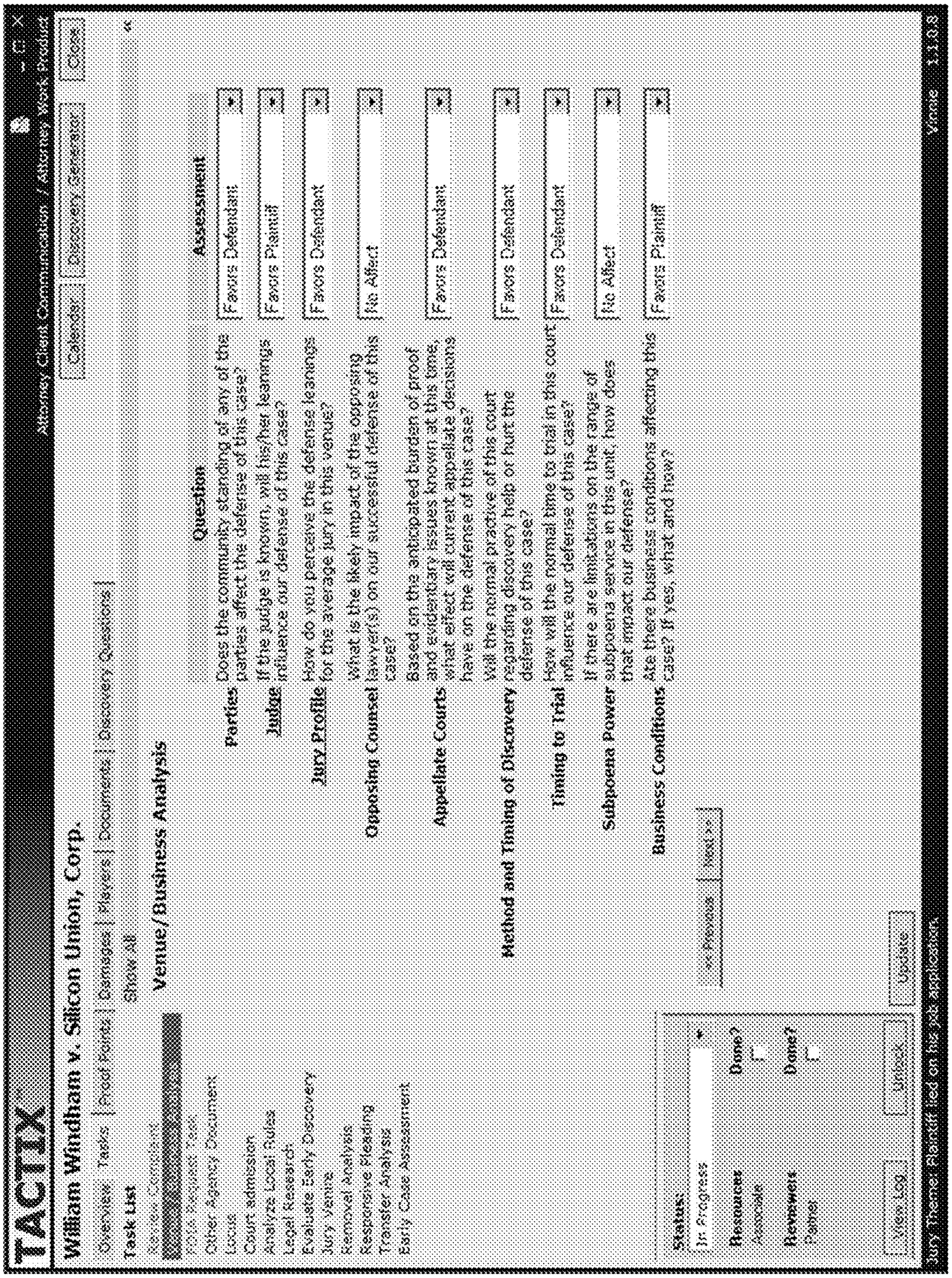
Figure 7:
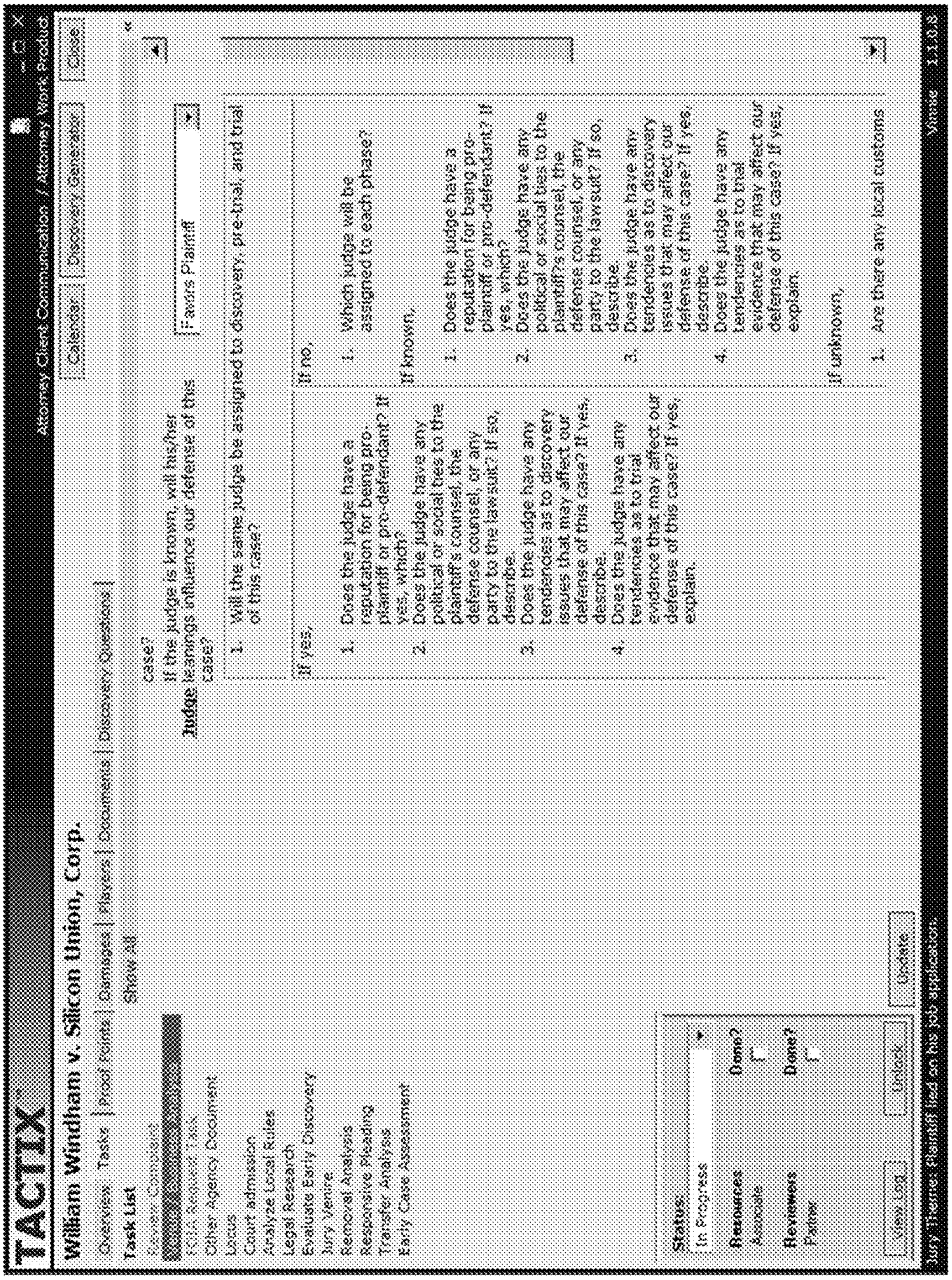
Figure 8:
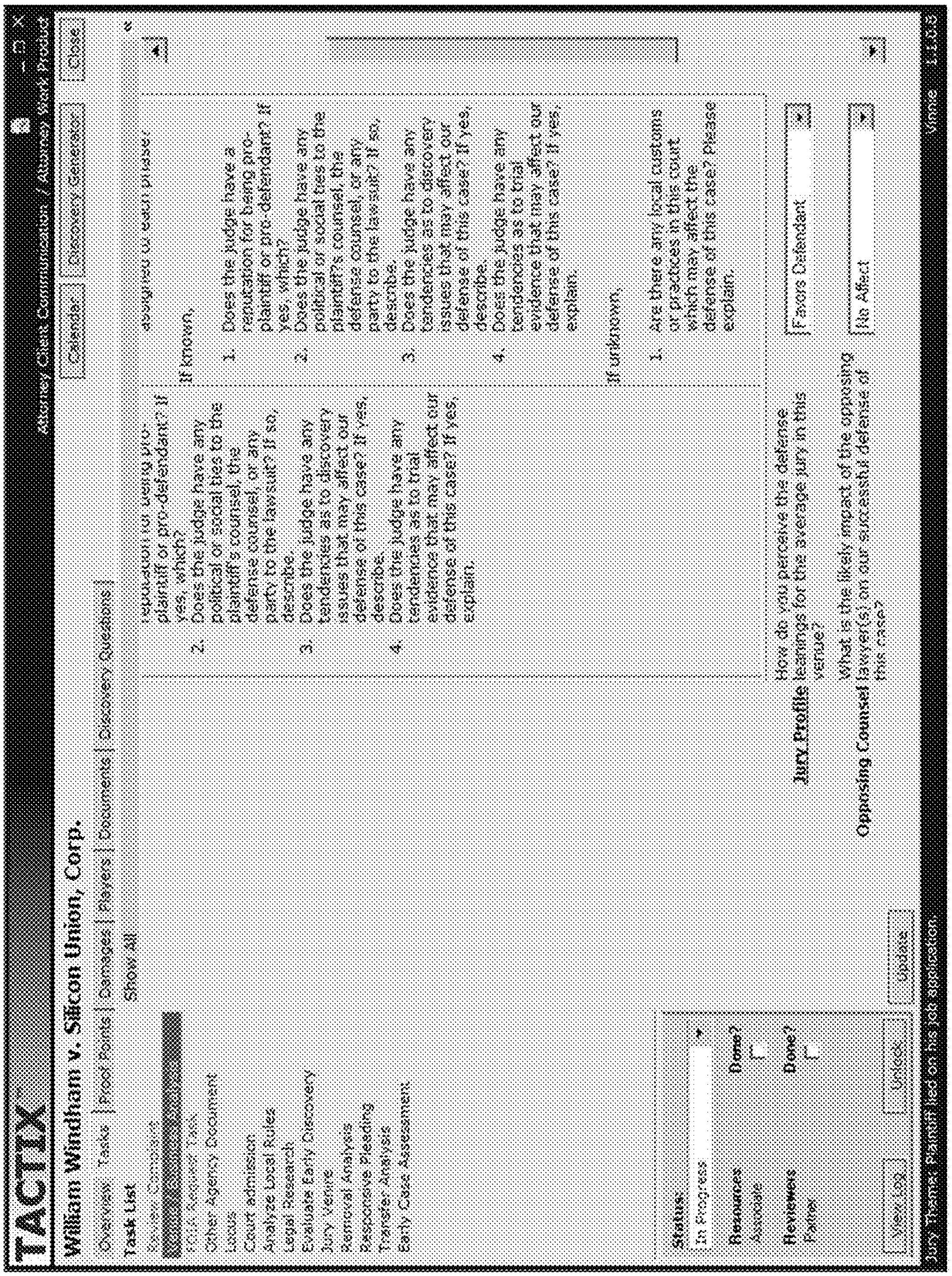
Figure 9:
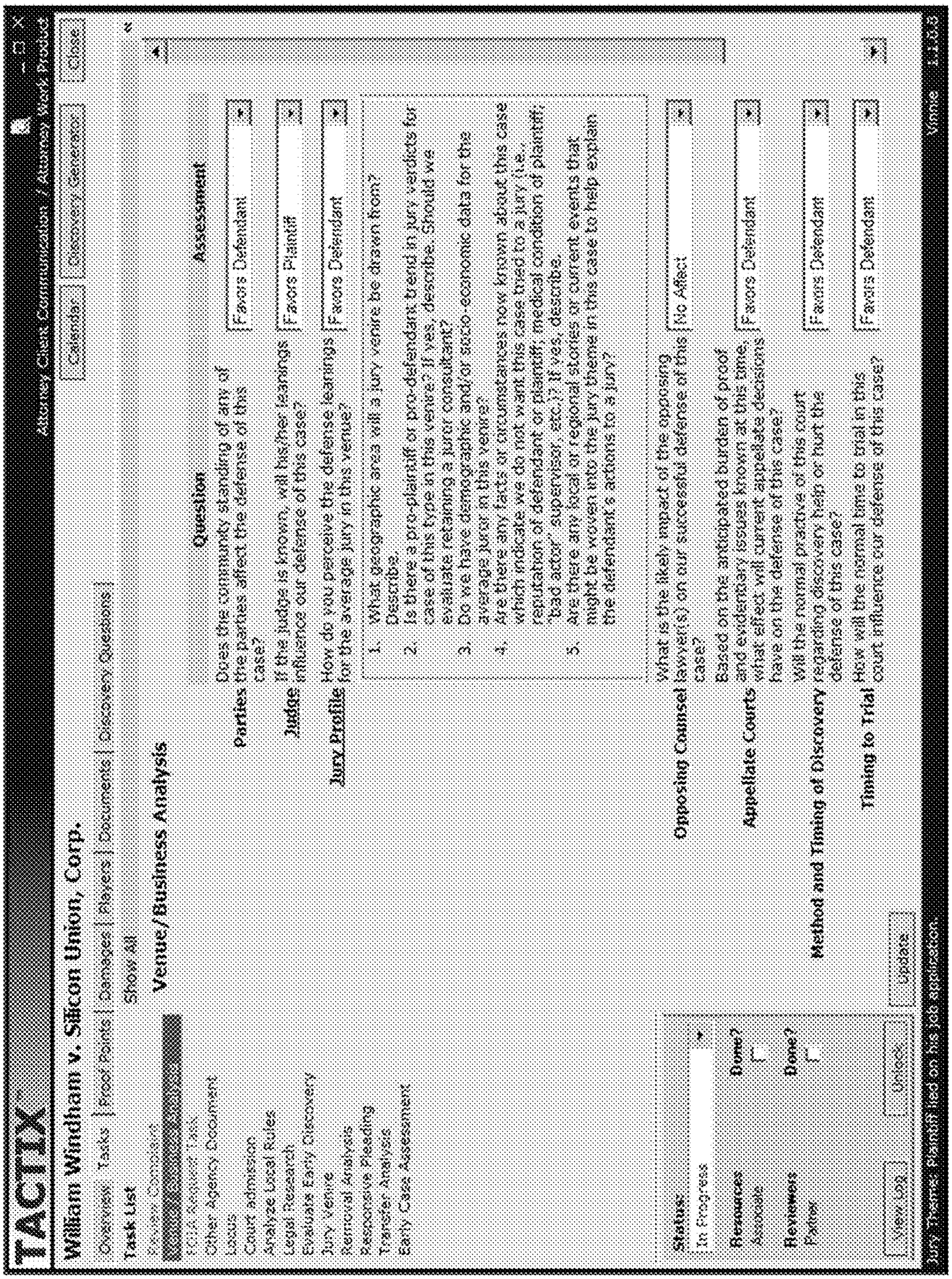

It is, of course, necessary to enter data and that is done by going to a task screen 312 shown in FIG. 5. In the left hand column of the illustrated screen 312 it is noted that there are a series of tasks which need to be performed, including review of the complaint; doing a venue and business analysis; issuing a FOIA request; requesting other agency documentation; doing a locus determination; a court admission evaluation; analysis of the local rules; any legal research necessary; an early evaluation of the discovery; a jury venire; removal analysis, which will be discussed in more detail below; responsive pleading requirements, which is also discussed in more detail below; transfer analysis and early case assessment. Each of these are task and data gathering steps to help develop recommendations. The actual data gathered is used in a weighted manner to help determine the recommendation. The actual weighting values are based on assessments of criticality for each particular response as determined by skilled and experienced lawyers in the field.

In the lower left corner is a status block. This block is provided for each data entry screen to indicate the status of the particular data entry. In the illustrated embodiment of FIG. 5, a status of "In Progress" is shown, with this reflected on the overview of FIG. 4. Other selectable options include completed, on hold and not started. Checkboxes are available for both users and reviewers, and could also include both inside and outside counsel positions. Further, a date entry field could be provided to show expected completion date, which could also be reflected to the overview screen 304. By using this status block and providing the information to the overview screen 304, status of the data entry process can be kept and easily reviewed.

Figure 10:
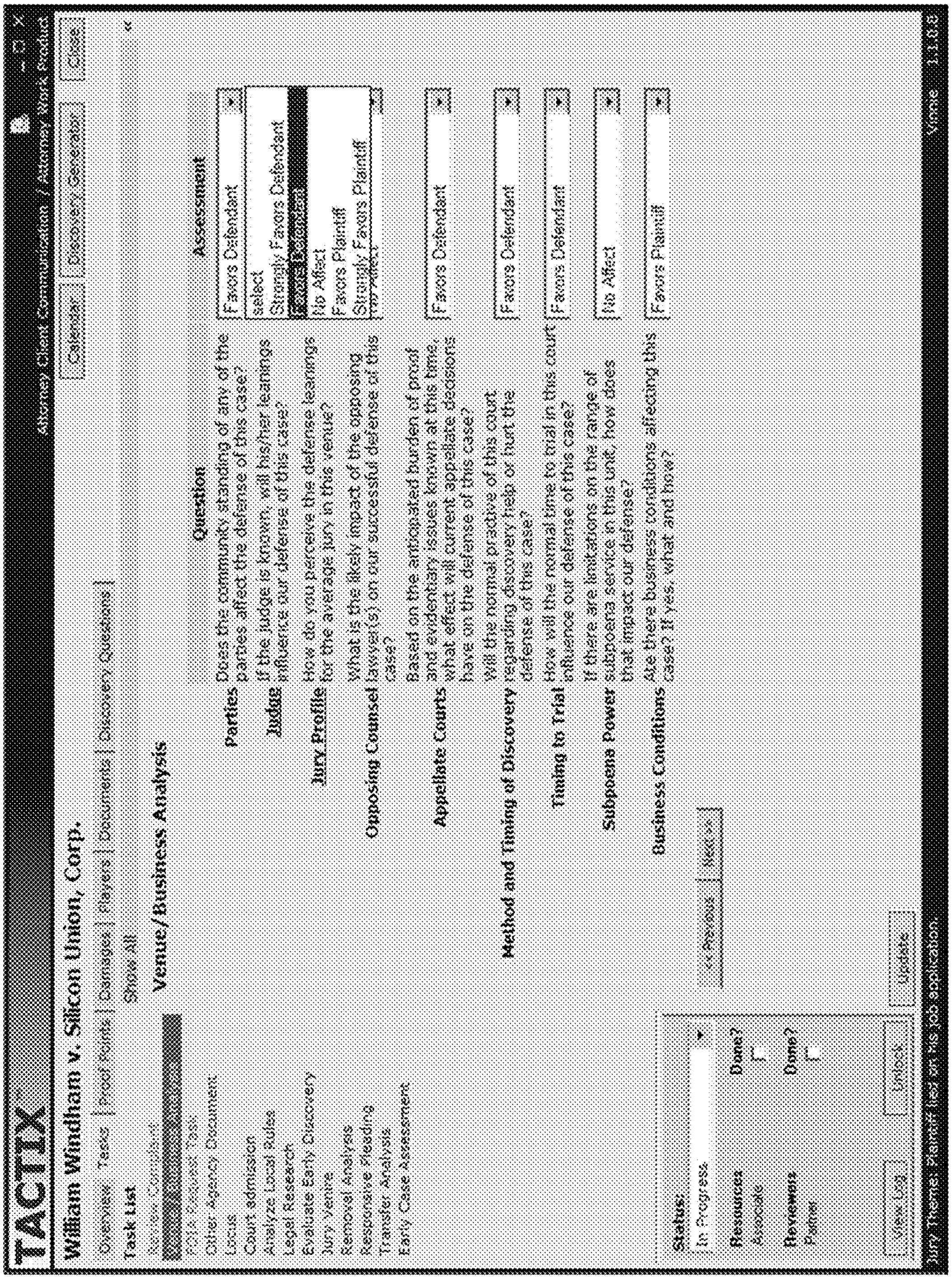
Figure 11:
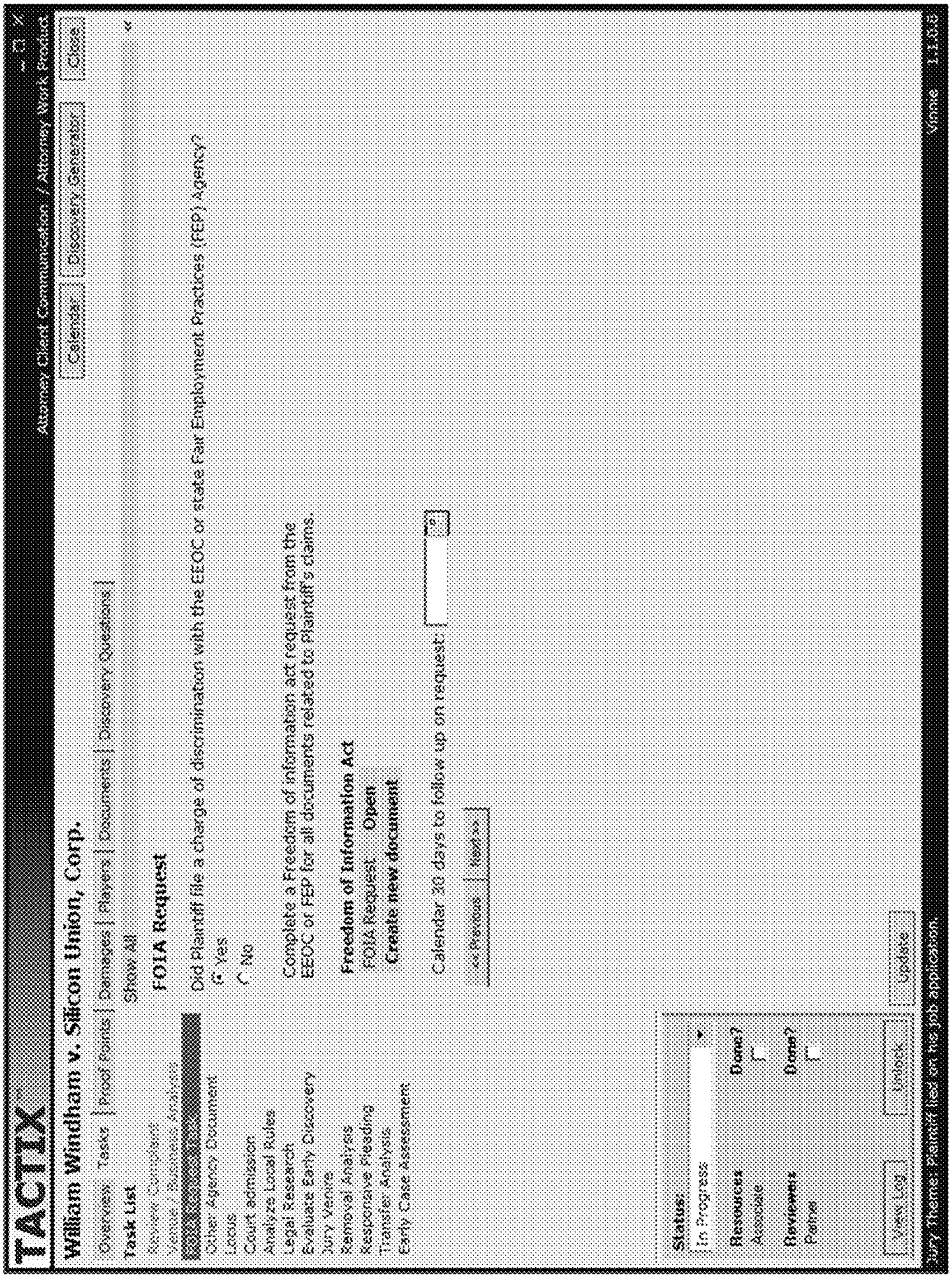
Figure 12:
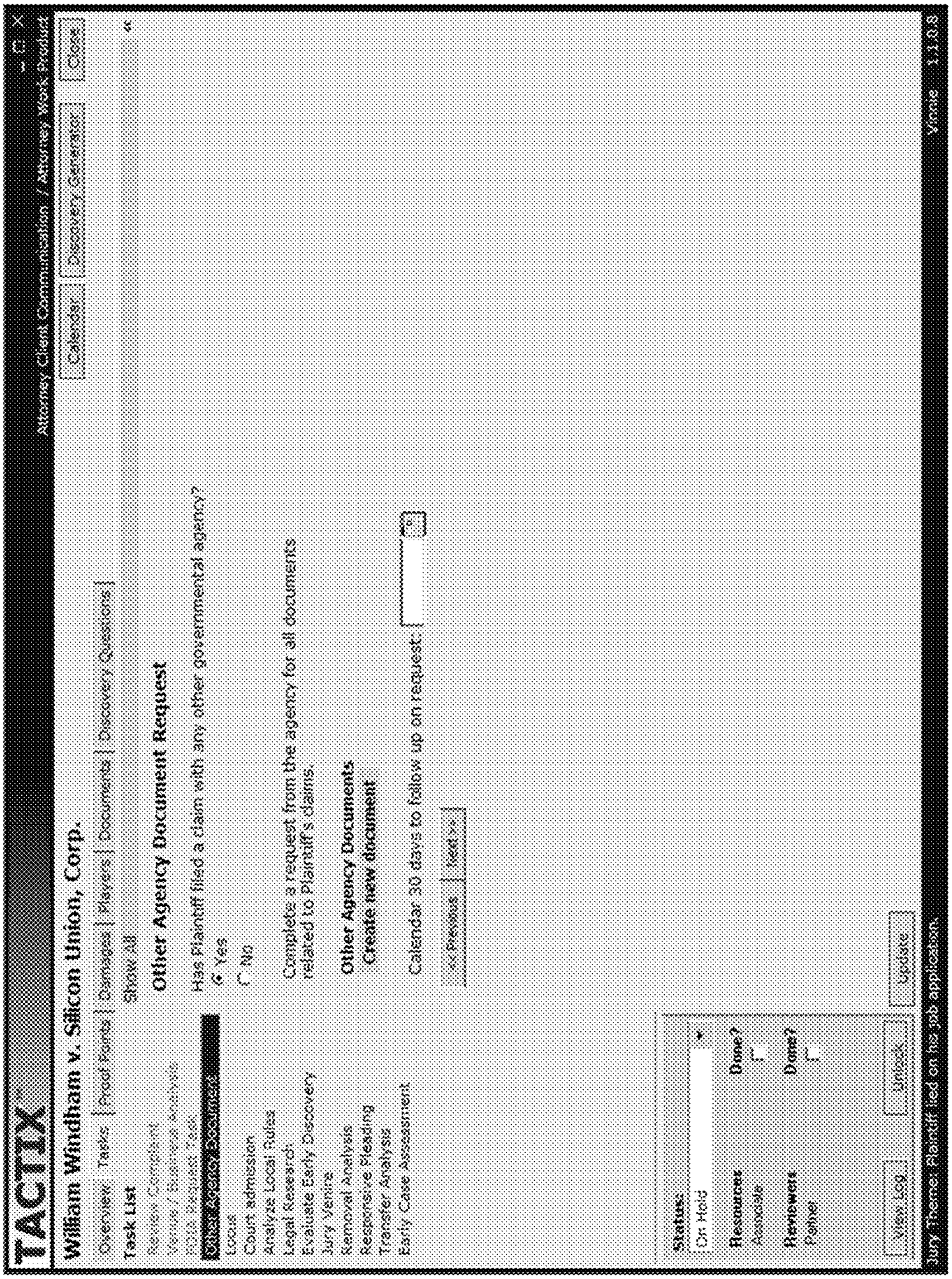
Figure 13:
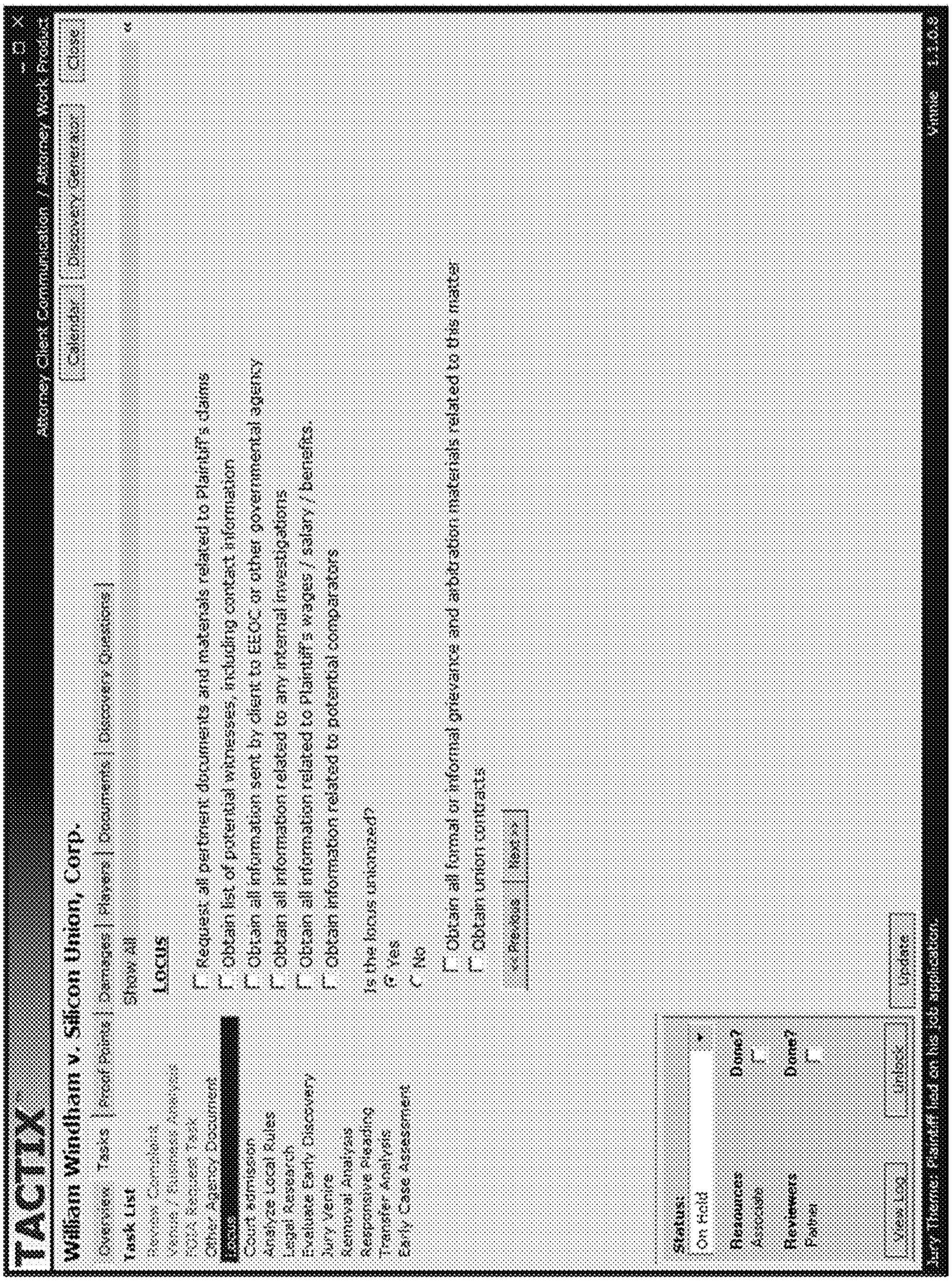
Figure 14:
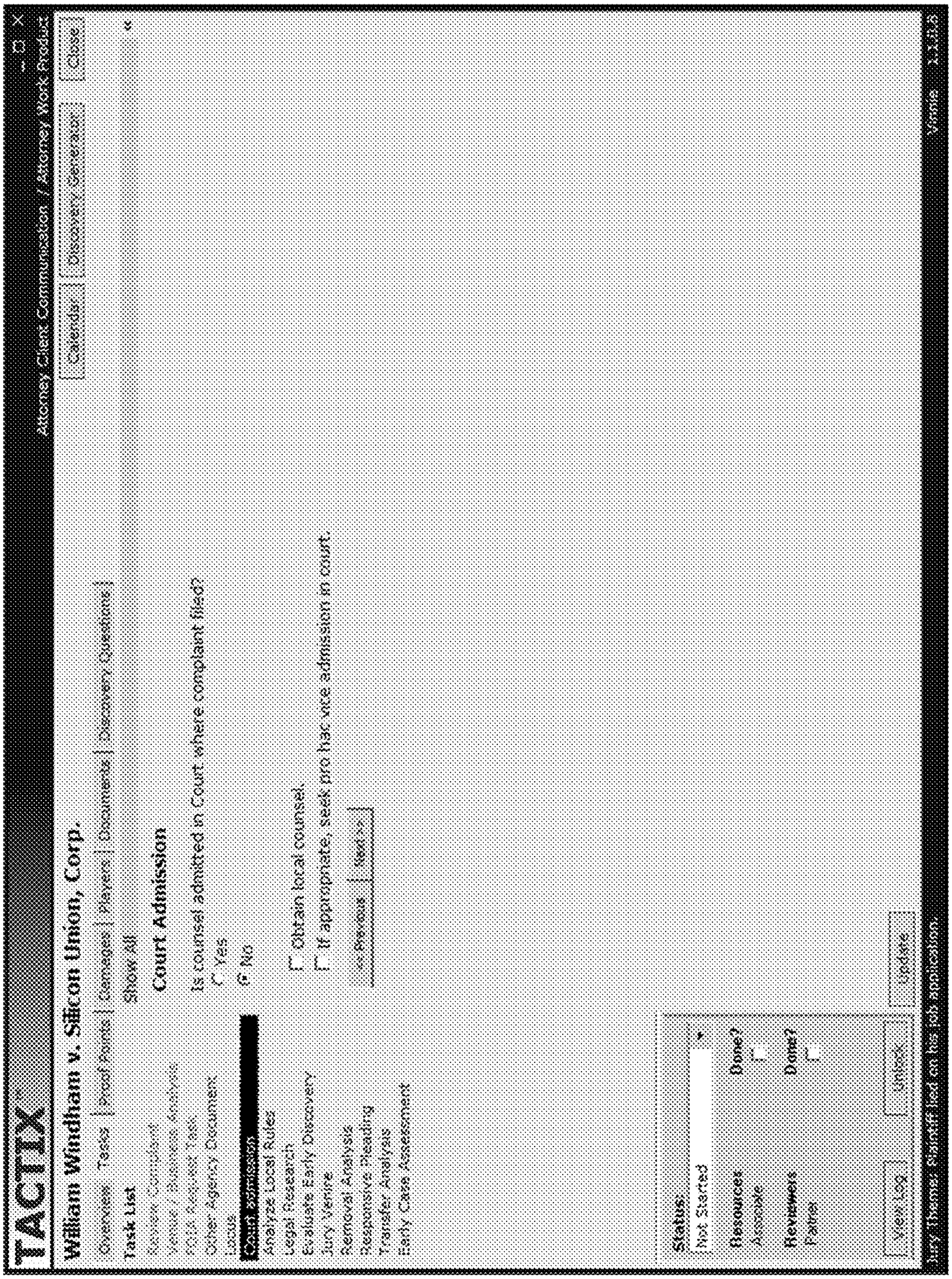
Figure 15:
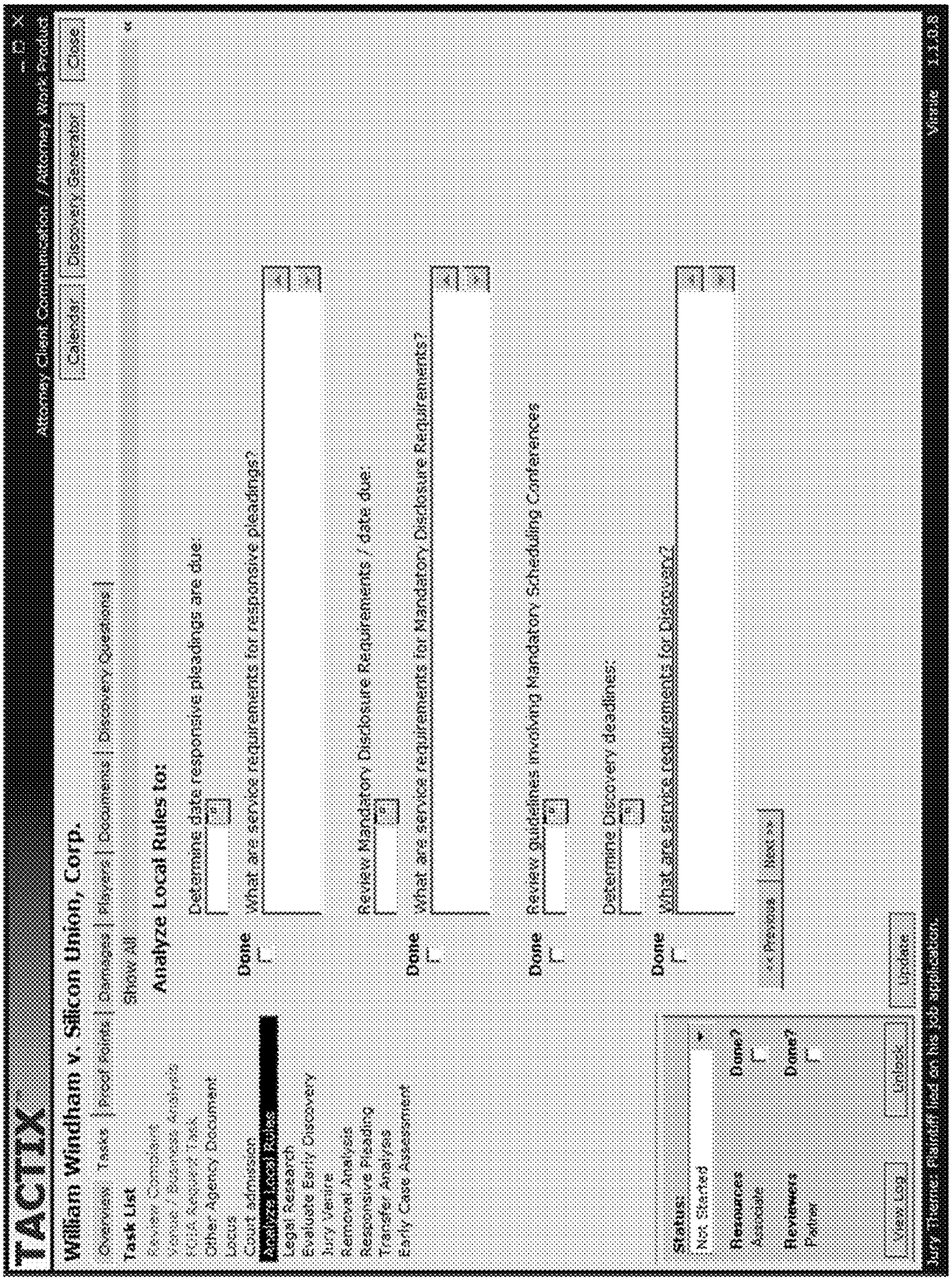
Figure 16:
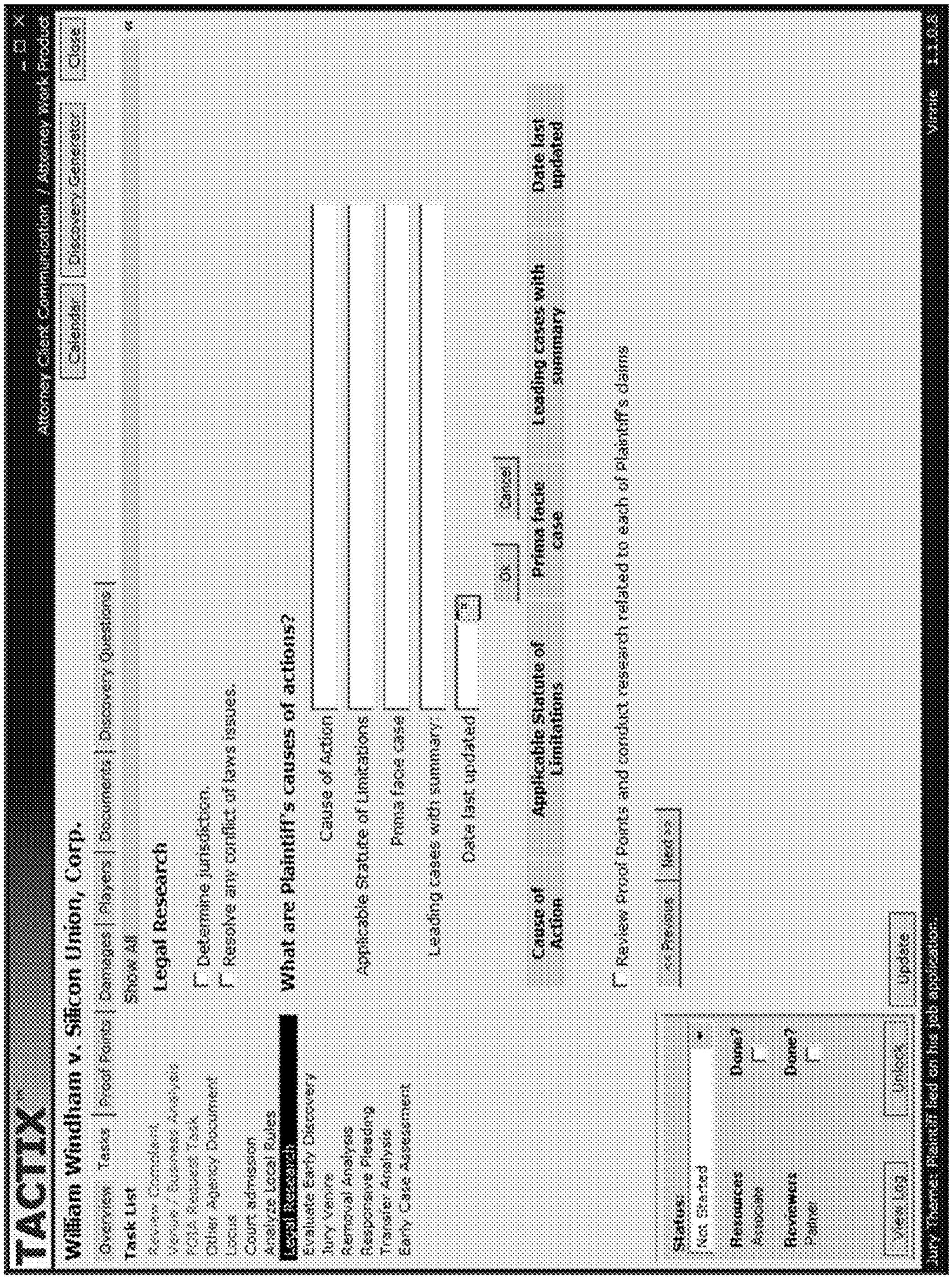
Figure 17:
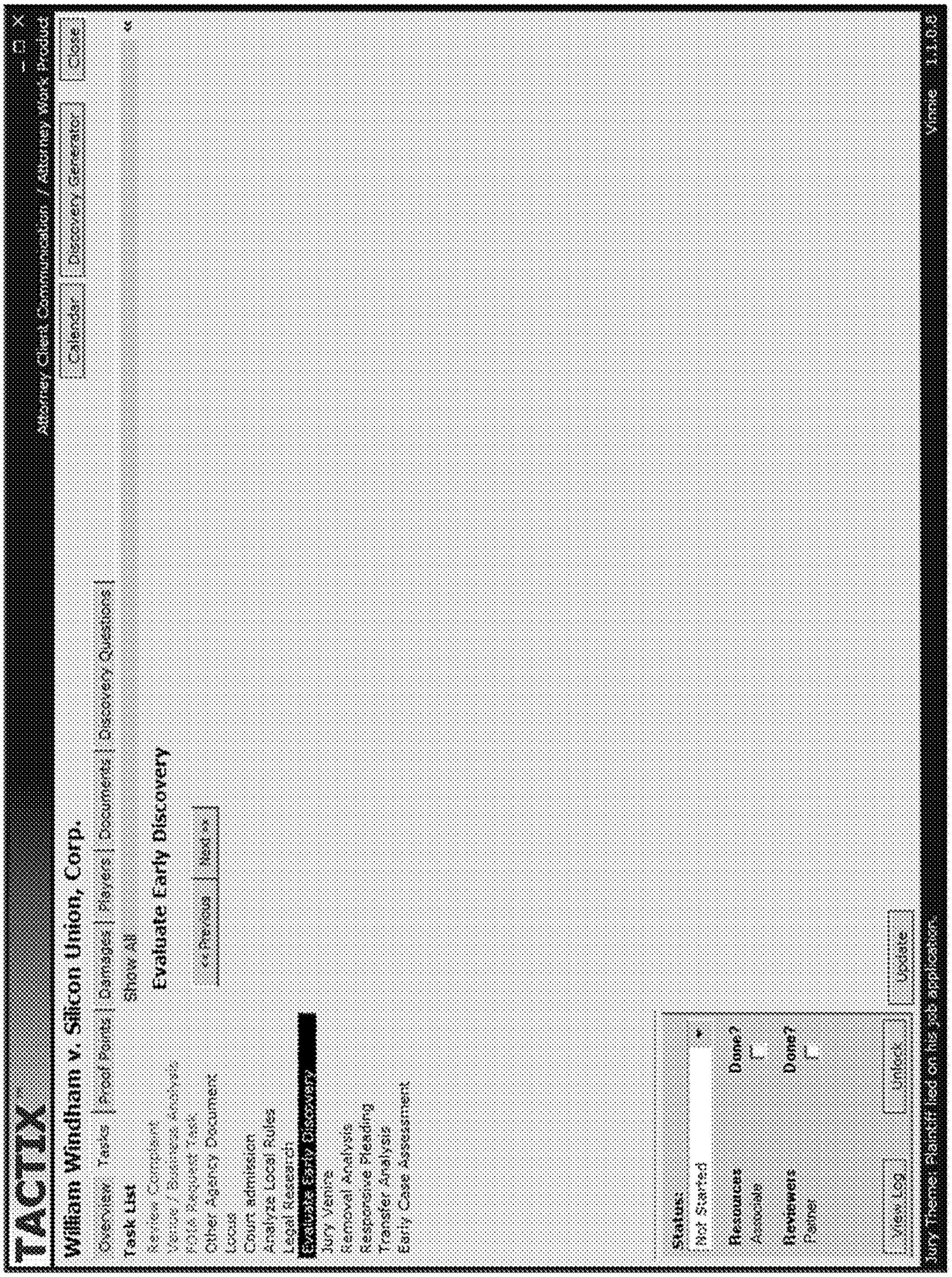
Figure 18:
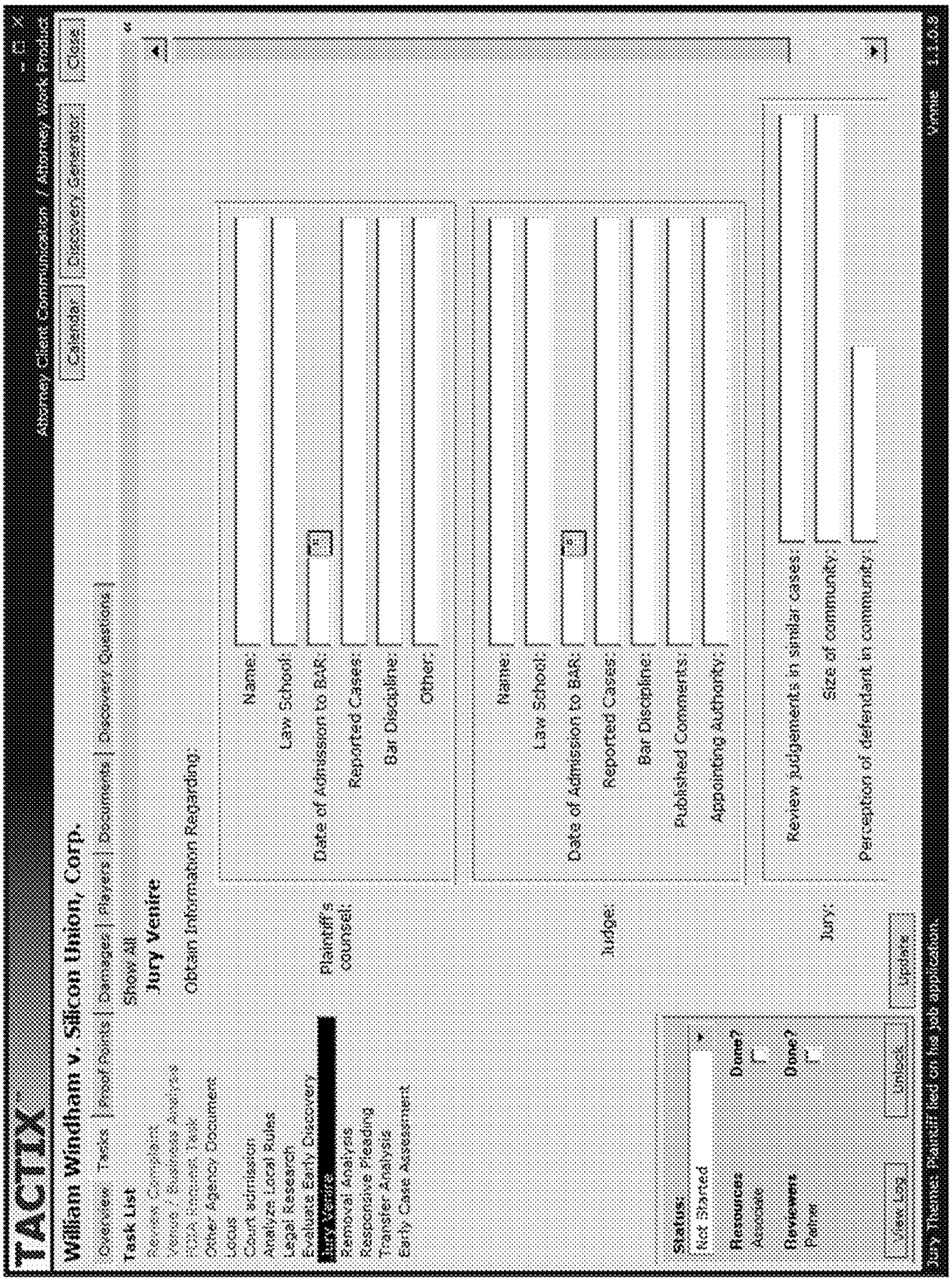
Figure 19:
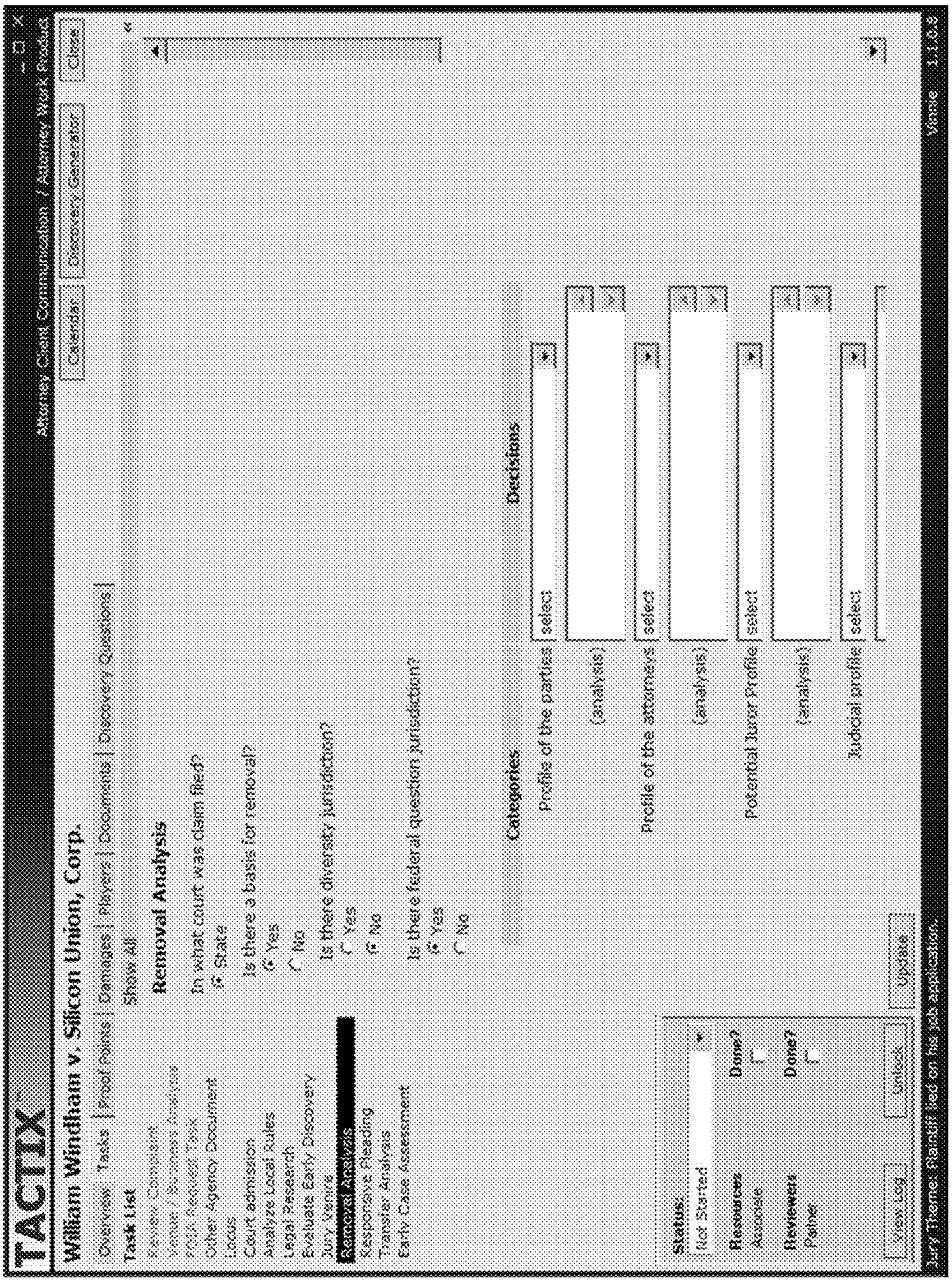
Figure 20:
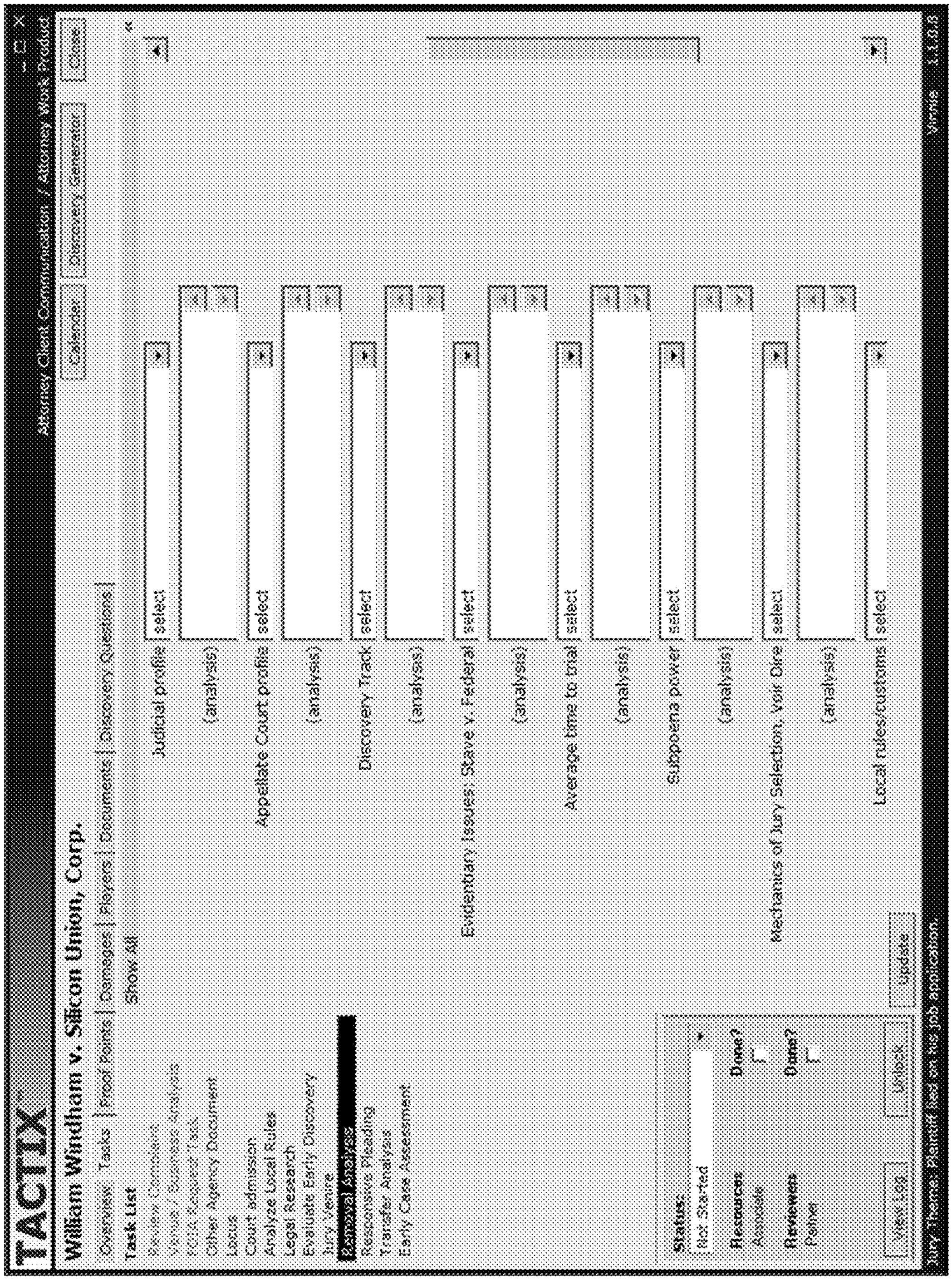

FIGS. 6-10 are screen shots illustrating the venue/business analysis questions. As can be seen, there are a series of questions relevant to determining venue for the particular case and doing a business analysis to see the business factors of the case. As to each particular question, an assessment value is provided as shown in FIG. 10. For example, particular assessments are such as strongly favors defendant, favors defendant, no effect, favors plaintiff and strongly favors plaintiff. These assessments are then weighting values that are entered for each particular question. The result of the assessment and weight value factoring is used to help calculate recommendations provided by the tool. A recommendation could be presented, but is not shown in the exemplary embodiment. Generally, this particular set of questions would be entered by a lawyer, rather than a legal assistant, as generally some experience is required for these particular questions.

The screen shots of FIGS. 11 to 18 are exemplary of screens that are used to obtain the data necessary for other particular tasks indicated in the task list. Most of these particular tasks shown between FIGS. 11 and 18 would readily be done by legal assistant and/or a lawyer. With respect to the need for local counsel shown in FIG. 14, in certain embodiments the tool can link to other programs and databases to assist in selecting and retaining local counsel.

Figure 21:
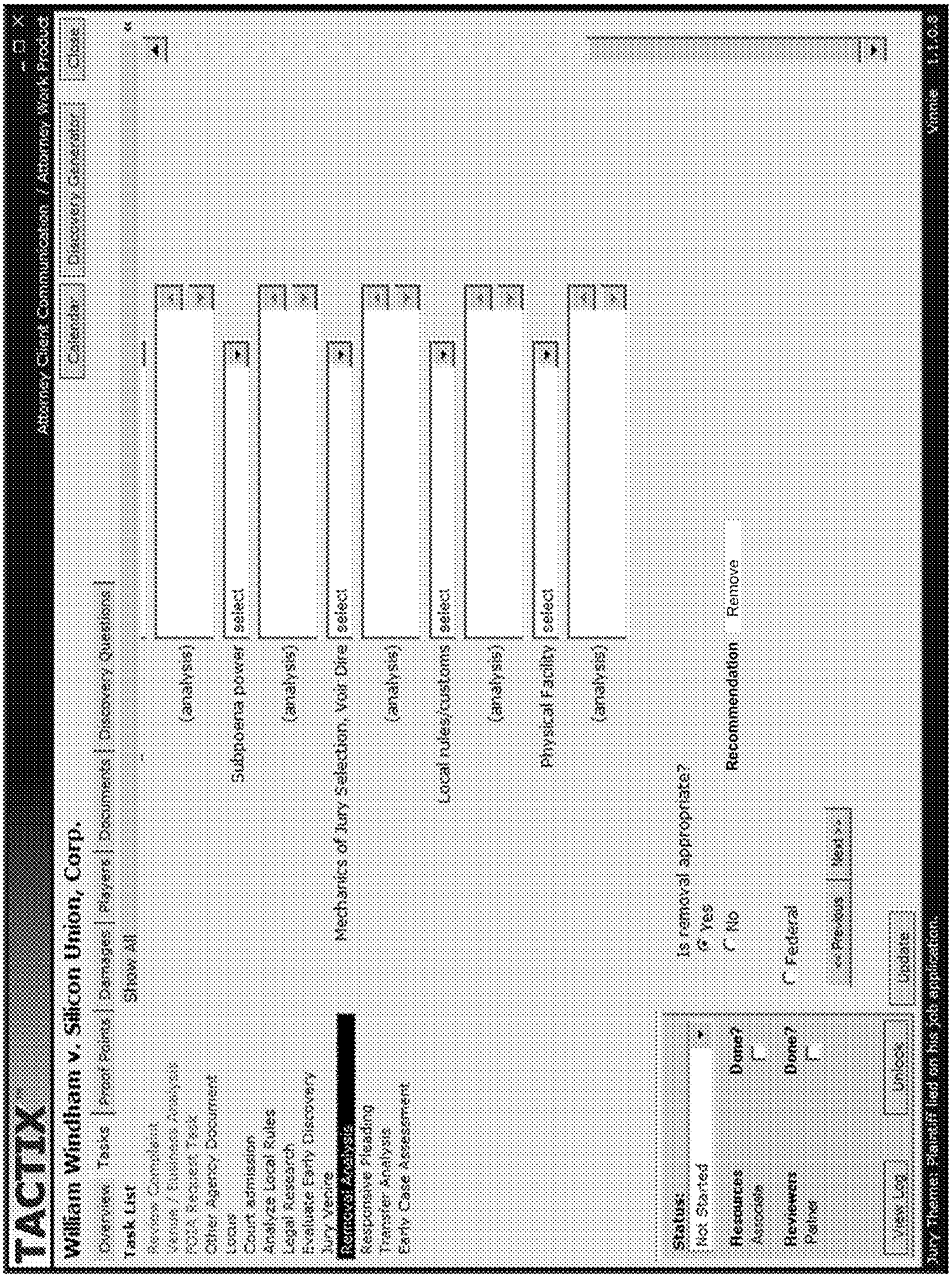
Figure 22:
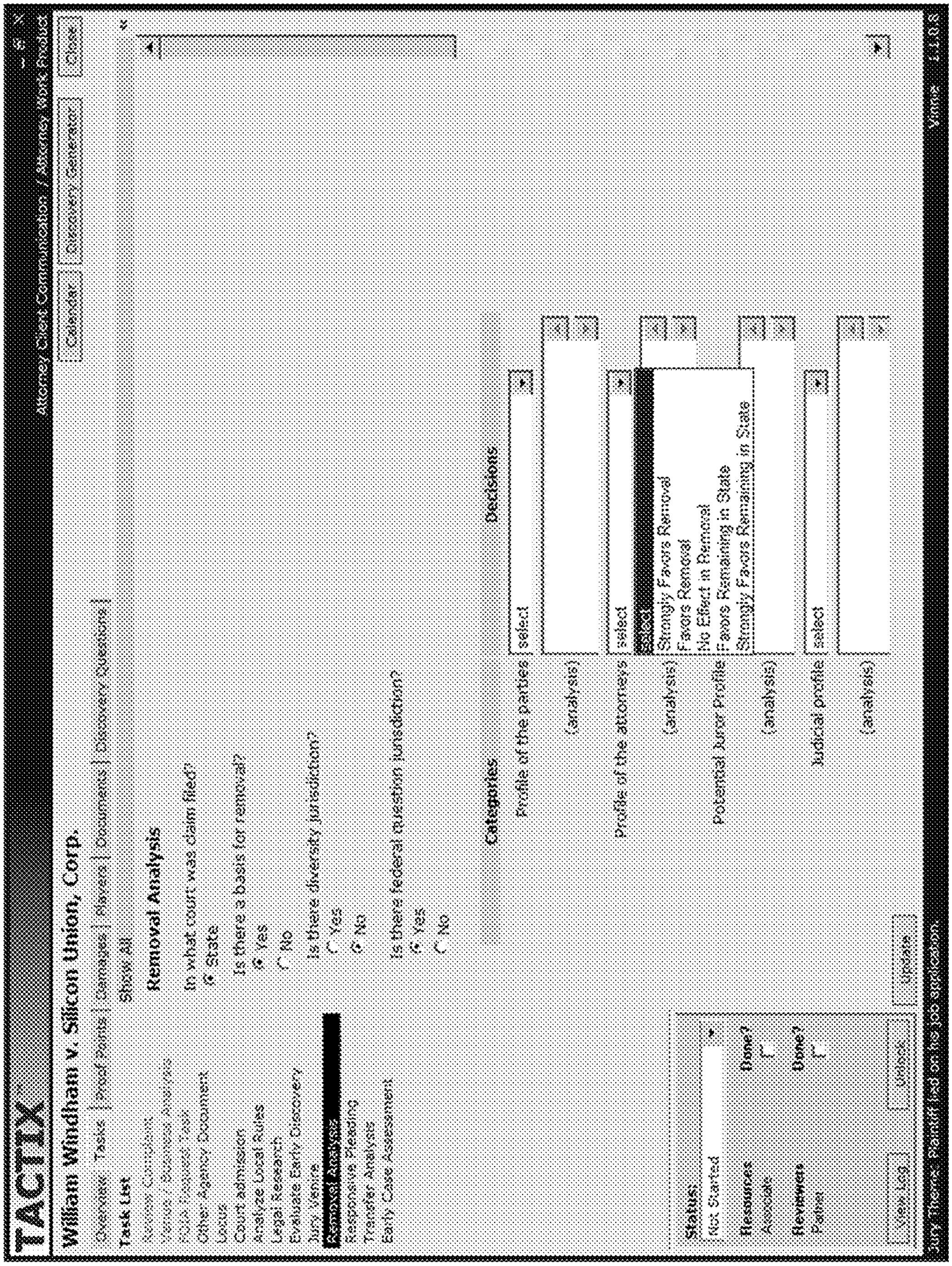

FIGS. 19 through 22 illustrate the exemplary screens used for the removal analysis. For example, there are questions as to whether it was a state or federal court filing, and if it was a state court filing, if there was a basis for removal, what type of jurisdiction and so on. Further, there are a series of decision points that must also be made and these are selected from a list as shown in FIG. 22, which can include strongly favors removal, favors removal, no effect in removal, favors remaining in state and strongly favors remaining in state. Again, these particular selections of the decision values are used in a weighting analysis to determine whether to provide the removal recommendation. It is further noted that under each particular category of decision is an analysis block so that the user can indicate the particular thought process used to develop the particular indicated decision. This allows review by more experienced parties, associates or more skilled partners for example, without requiring the actual in person presence of the particular user that entered the data.

It is noted on FIG. 21 that a recommendation value is provided. It is understood that the particular data is entered as described above. Each of the data values includes a particular value which is then used in a weighted analysis as derived by an experienced lawyer. Using screens not shown, experienced lawyers provide weighting factors for each particular data value. The weighting values are then combined to form a score, which is then translated into a recommendation. Again, experienced lawyers would select the scores for each particular recommendation. In some embodiments of the tool the data values are compared with prior cases and a correlation is done. This correlation then provides a recommendation, which can be combined with the score-based recommendation or provided separately. In more complicated situations, such as the full case recommendation shown in FIG. 4, the individual recommendations and other data points are matched against a statistical decision tree, providing a recommendation for those cases. The statistical decision tree is developed with prior case results and/or input from experienced lawyers. In other alternatives for both the simpler and more complex situations, various machine learning techniques can be used, with complementary techniques used to provide the recommendations. Examples include supervised feedback learning via an N-dimensional hyperplane classifier, a variation on the ID3 algorithm of Quinlan, self organizing mapping techniques according to Teuvo Kohonen and other neural network techniques. The particular data collected from the user may vary by the particular techniques used to ensure convergence, but all data would be similar to that illustrated herein.

Based on the results of the weighted analysis and review or comparison to similarly situated cases, a recommendation is provided by the tool. In the illustration of FIG. 21, the recommendation is to Remove. Although not shown in FIG. 21, it would also be appropriate to include the percentage values of data collection and reliability to go with the particular recommendation value to allow a quicker evaluation of the recommendation value.

Figure 23:
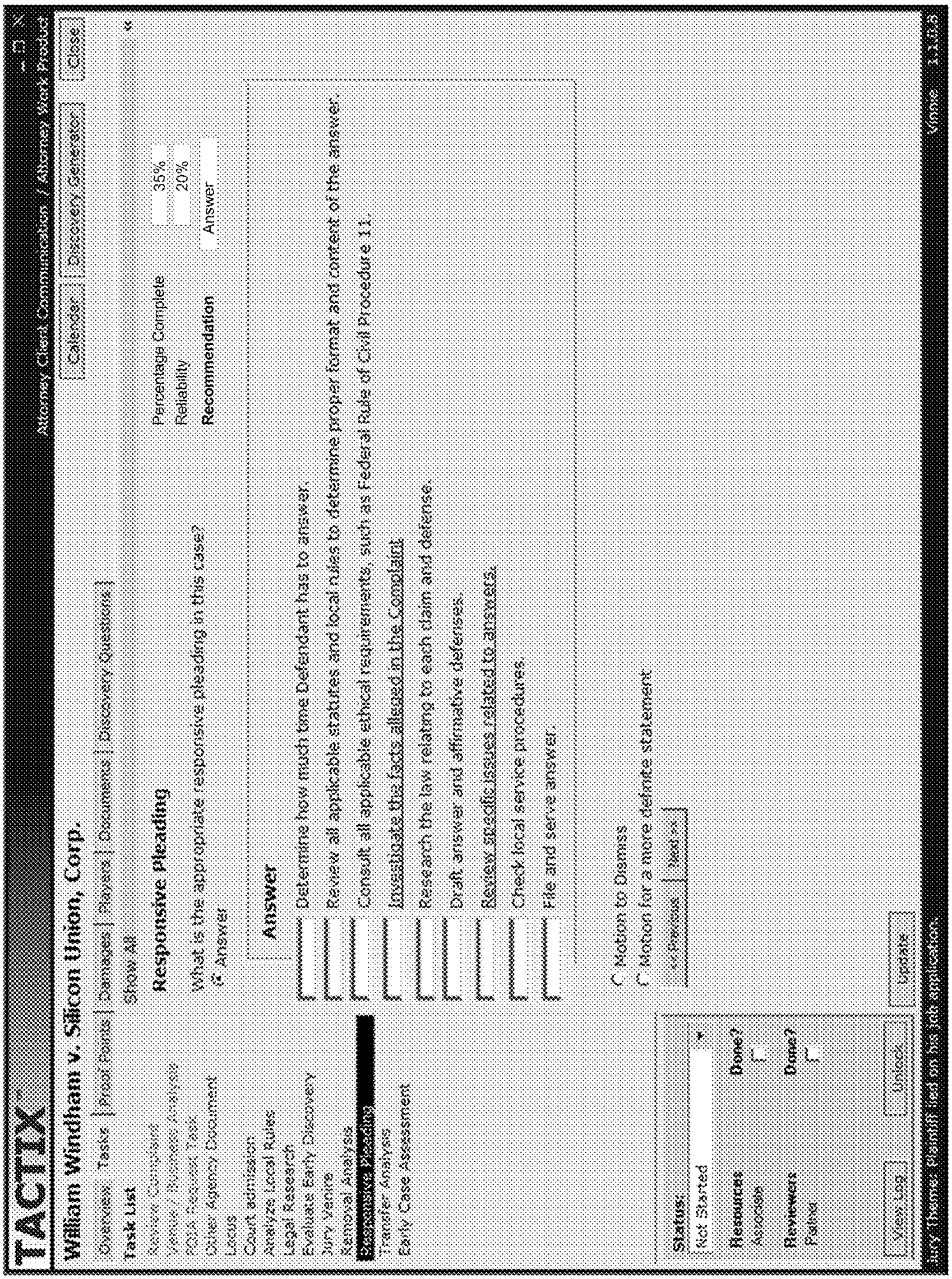
Figure 24:
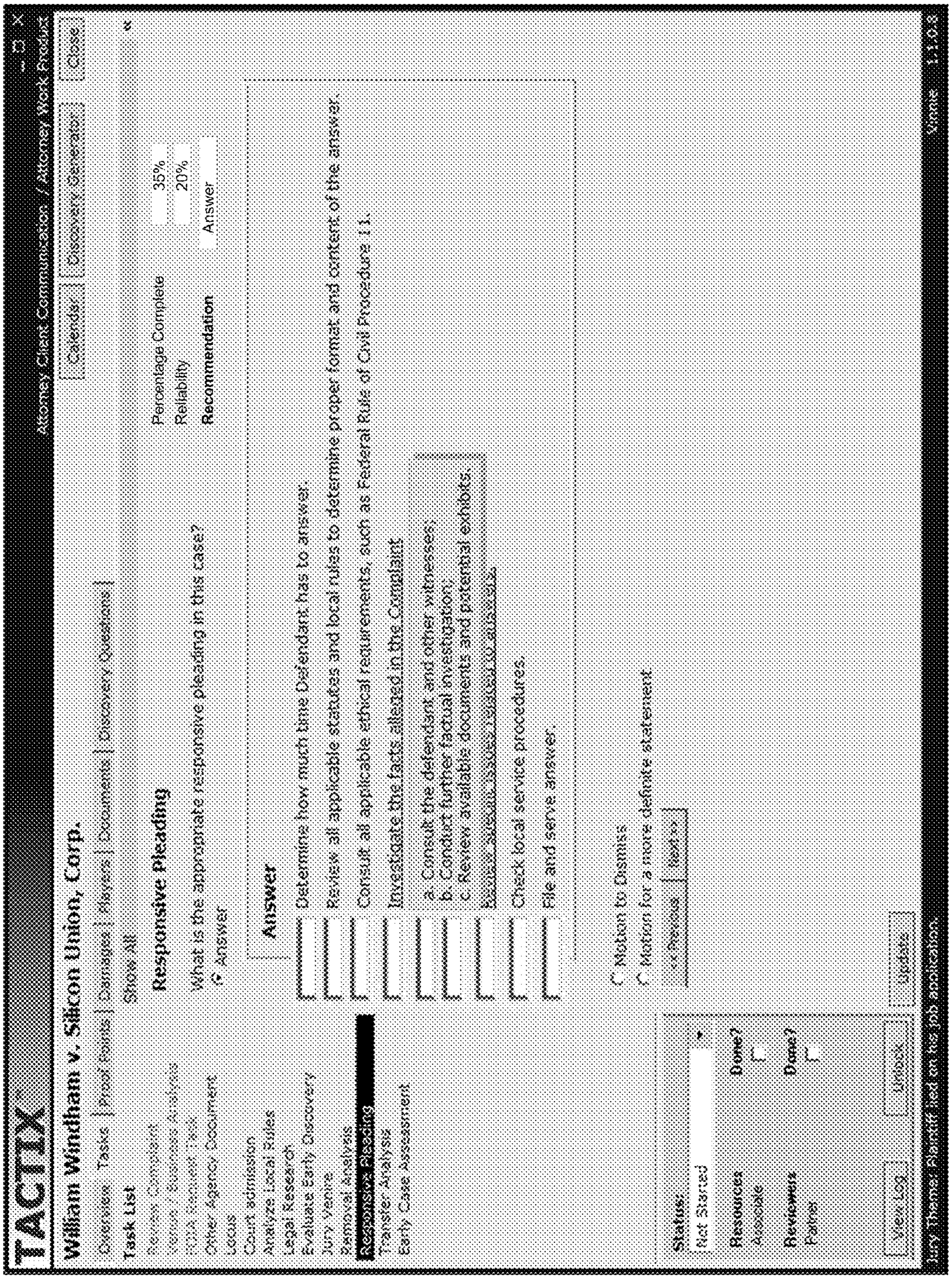
Figure 25:
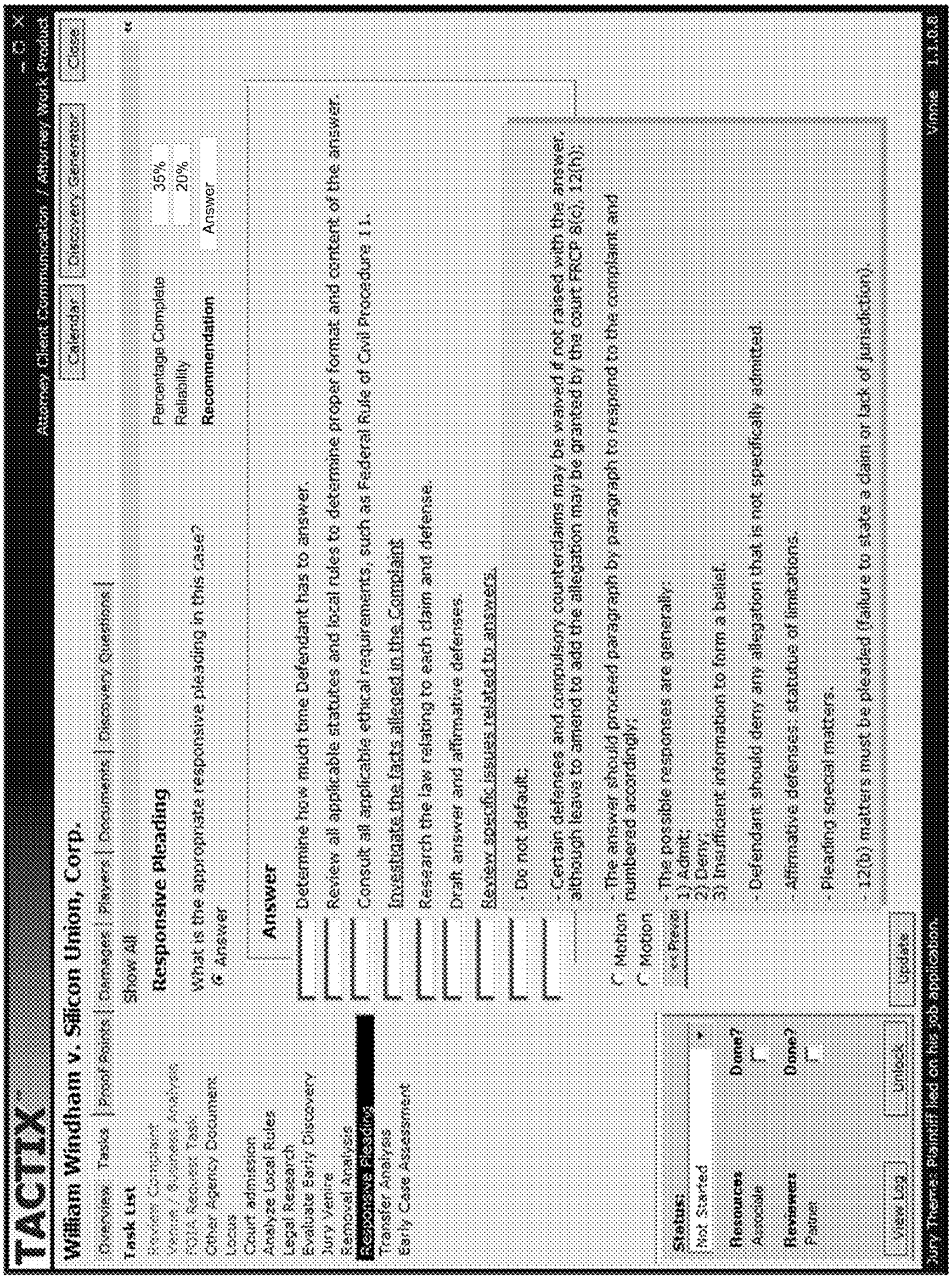
Figure 26:
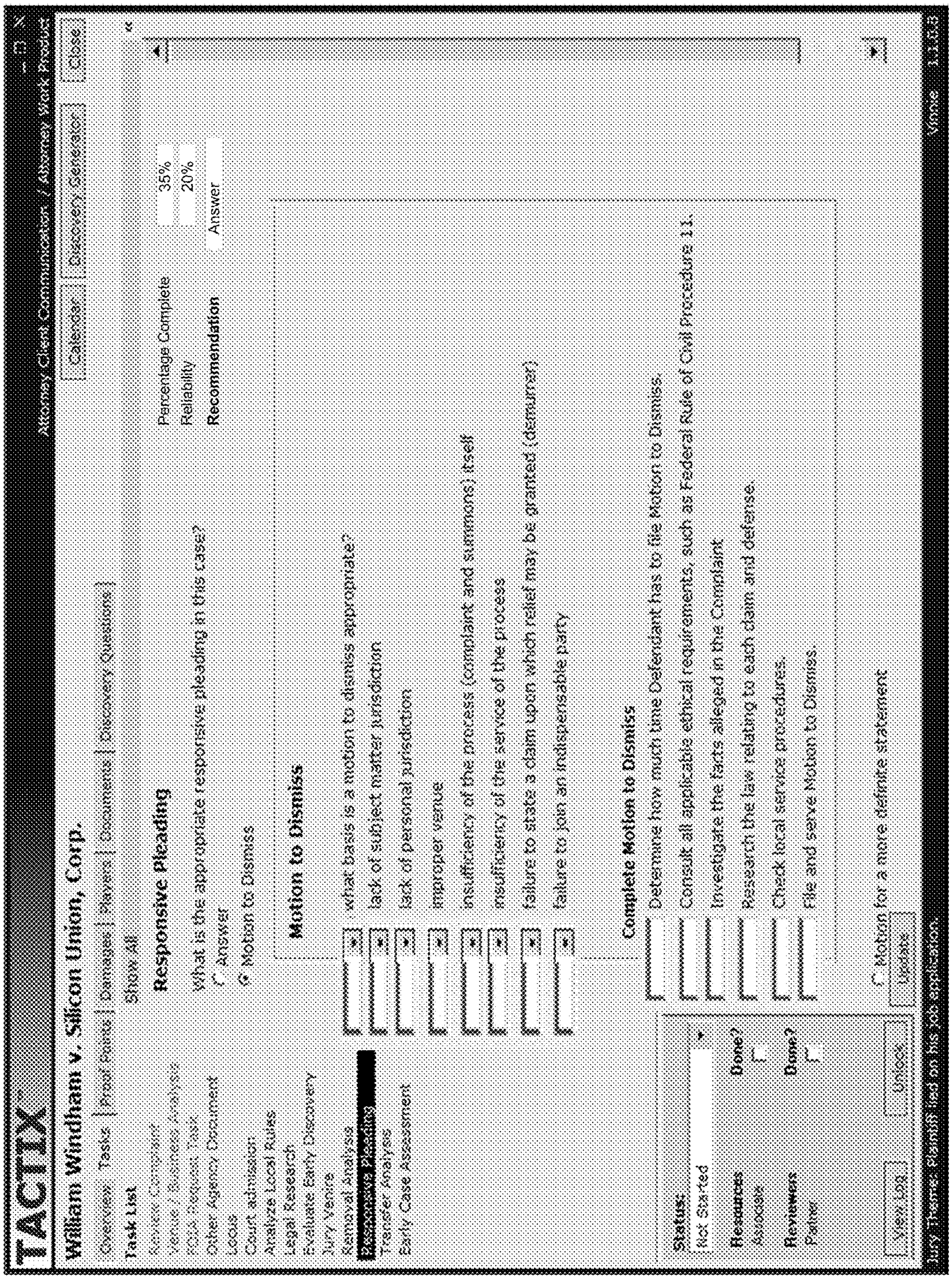
Figure 27:
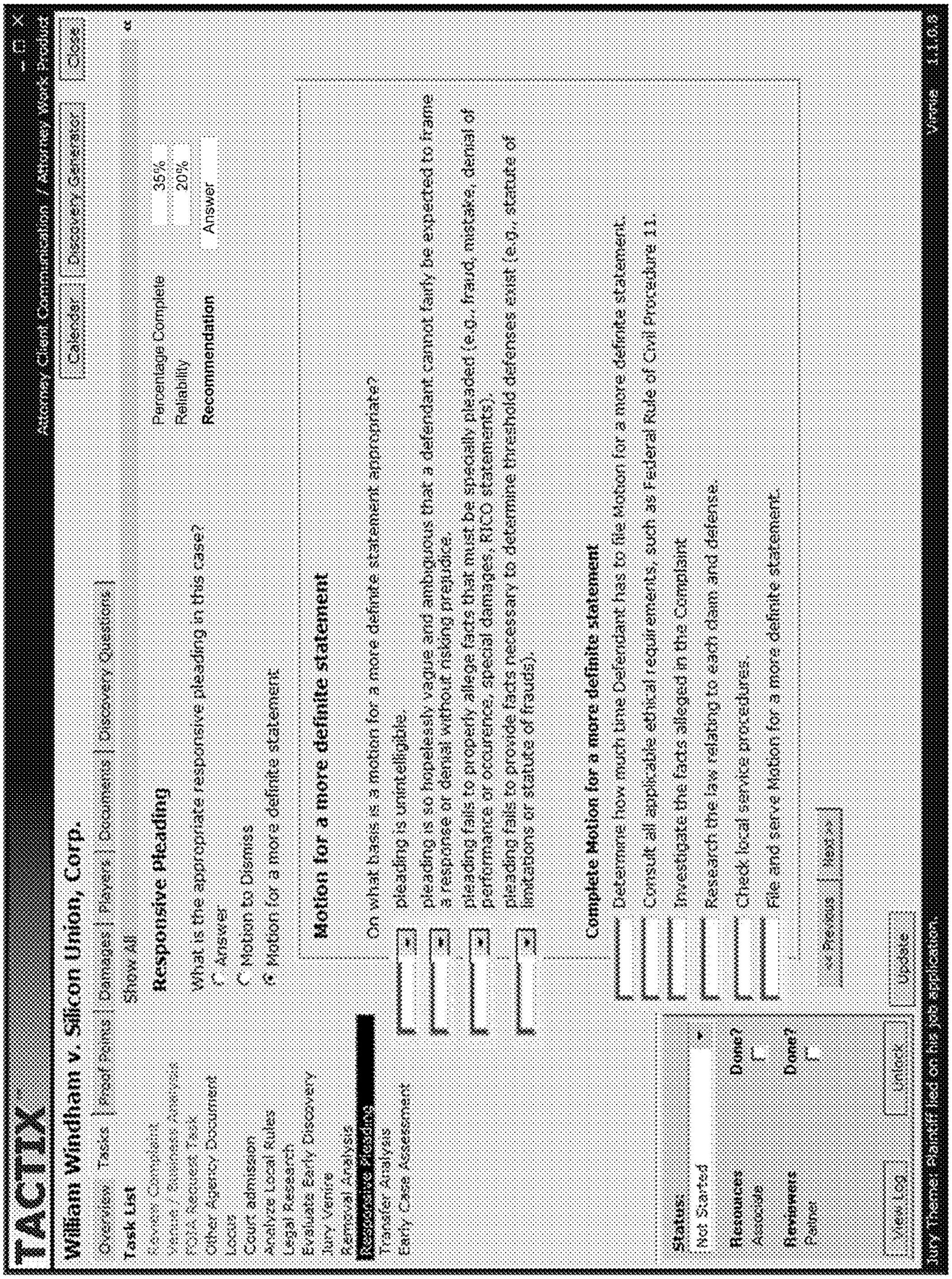
Figure 28:
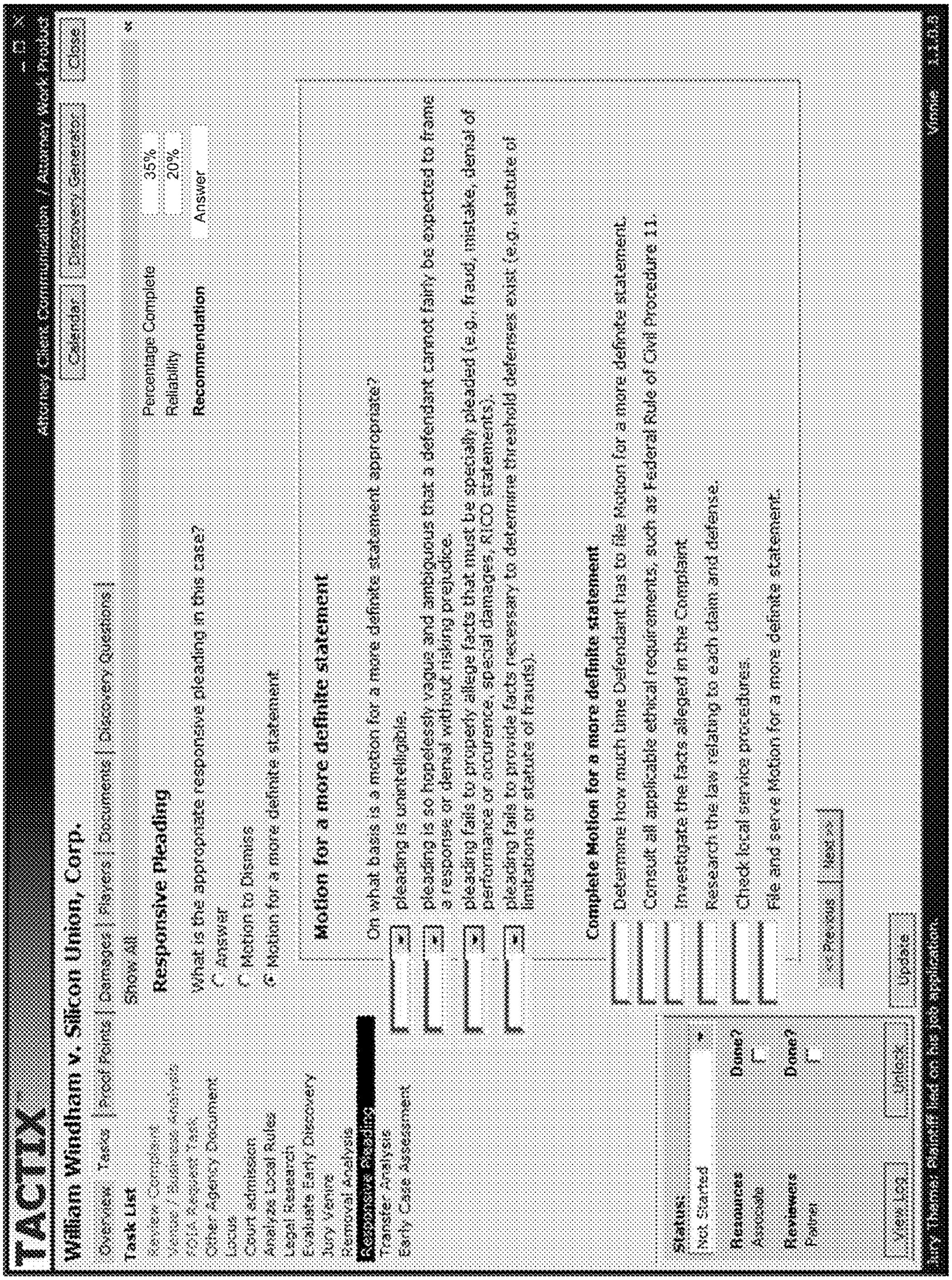

FIGS. 23-28 are exemplary screen shots of the responsive pleading task. In this instance, the decision to be made is to answer, dismiss or move for a more definite statement. Within the right-hand side of each of the screen shots are percent complete, reliability and recommendation values. Also shown in FIG. 23 are the determinations necessary to develop the recommendation. A series of questions are provided with entry locations to determine the amount of time and/or dollars necessary to perform the indicated task. These time and/or dollar values are then used to develop an approximate cost for an answer. It is noted that an answer is always accepted by the court and therefore there is no need to do an analysis on the probability of success. FIG. 26, on the other hand, shows a motion to dismiss exemplary screen shot. It is noted on the bottom of the screen there are entry values for the particular times and/of costs for the particular tasks to develop a cost for this alternative. Above that are a series of questions that have drop down or selection boxes to allow the user to select particular answers for each question. Appropriate values for each particular question are incorporated into the drop down list and are assigned particular numerical values. The numerical values for each of the particular answers is then used in a weighted analysis to determine probability of success, which is then coupled with the cost to develop a probabilistic value, which is then compared with the cost of an answer and the cost of a motion for more definite statement. The questions and task entries for a more definite statement are shown on FIG. 27. When entries have been made for all of the particular values, a complete recommendation can be made. In addition, as data is entered, the percentage completed and reliability numbers are updated so that not necessarily all data needs to be provided to reach a certain level of confidence in the particular recommendation. In the illustrated example the recommendation is to Answer rather than to move to dismiss or for more definite statement. The weighting and probability values are entered as previously described. For the particular responsive pleading analysis, the data values could be entered by a combination of attorneys and legal assistants.

In certain embodiments the tool can include questions and lists relating to potential affirmative defenses, crossclaims and counterclaims. The data gathered would be used in the overall case assessment.

Figure 29:
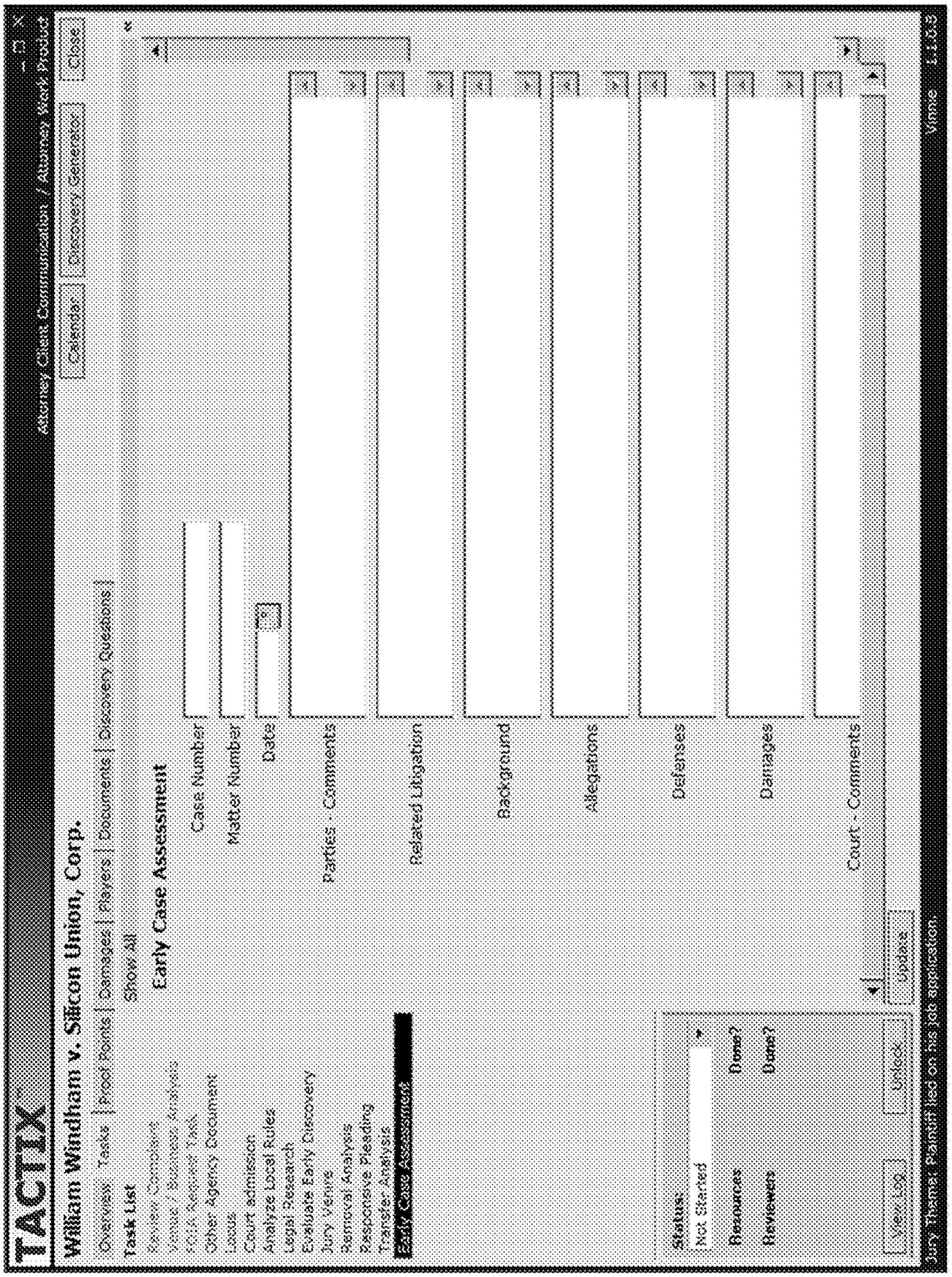
Figure 30:
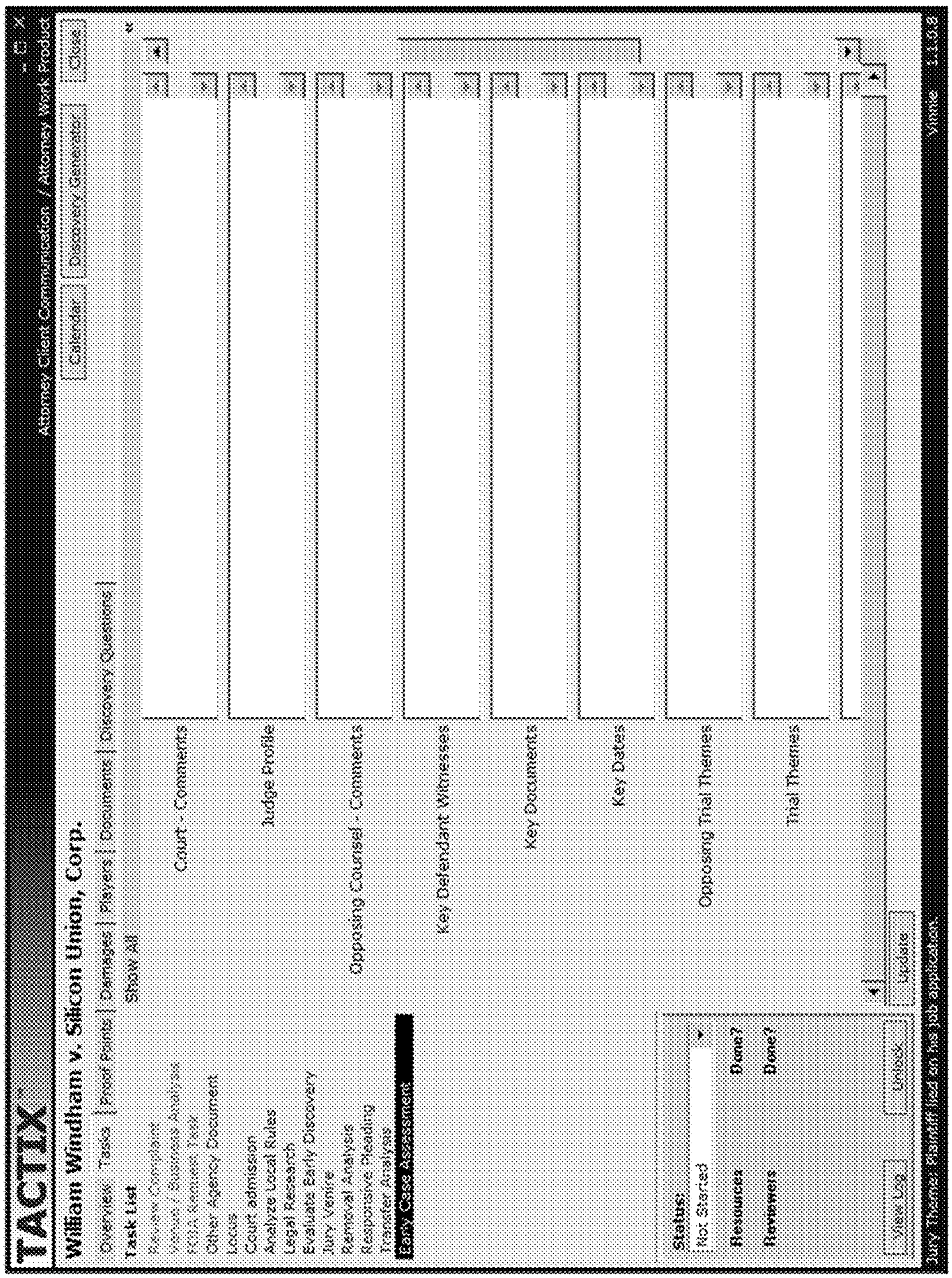
Figure 31:
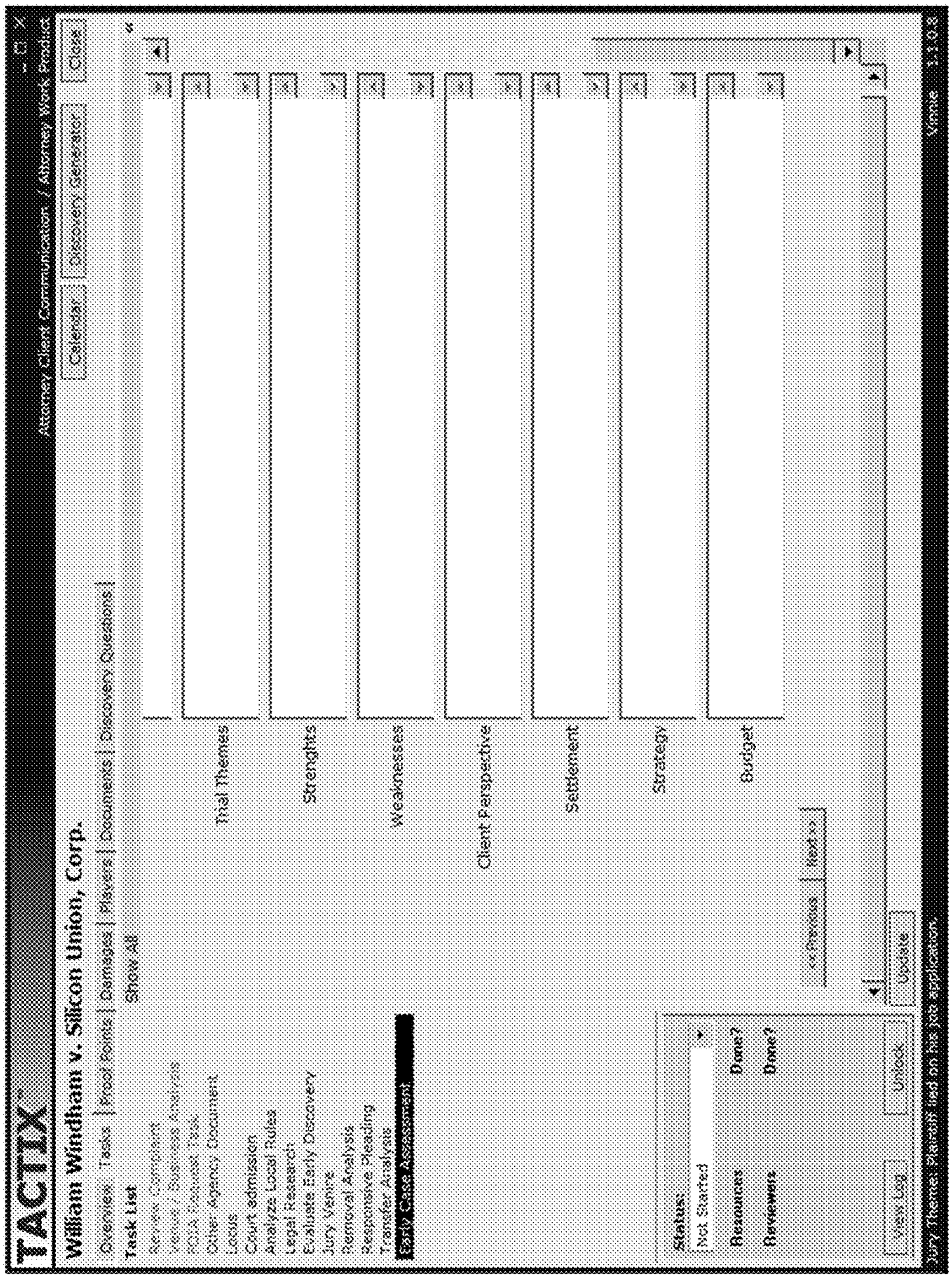

FIGS. 29 to 31 illustrate exemplary early case assessment screen shots. The fields shown are not a predicted analysis or assessment as shown on the overview screen of FIG. 4, but rather a series of fields to allow notes and comments by particular attorneys and/or users of the tool. In alternate embodiments, the actual commentary provided in the particular field can be syntaxed, analyzed and factored into the weighting and correlation analysis of the overall case assessment.

Figure 32:
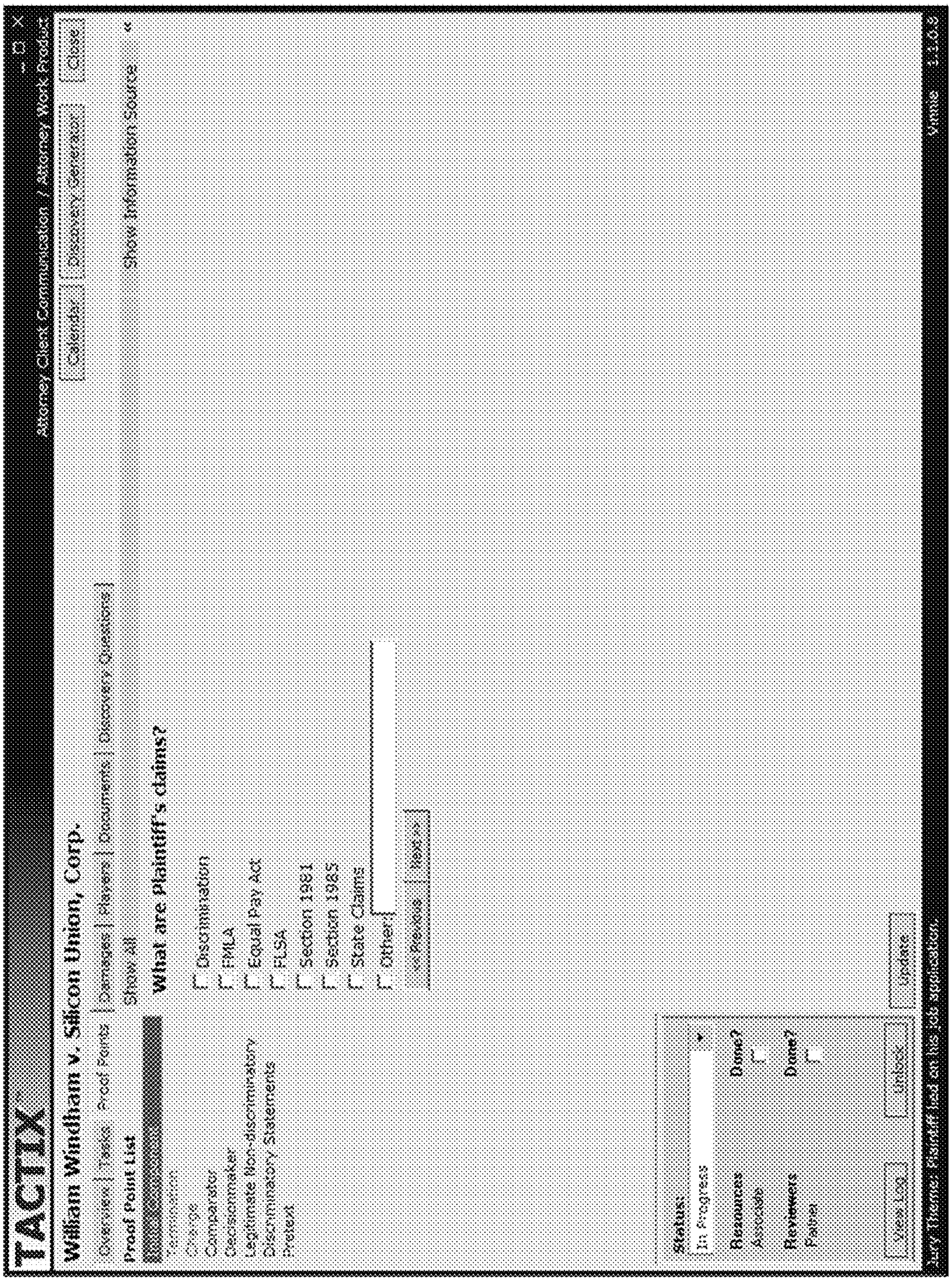
FIGS. 32 to 83 show example screen interfaces for indicating proof points relevant to analysis of the case.
Figure 33:
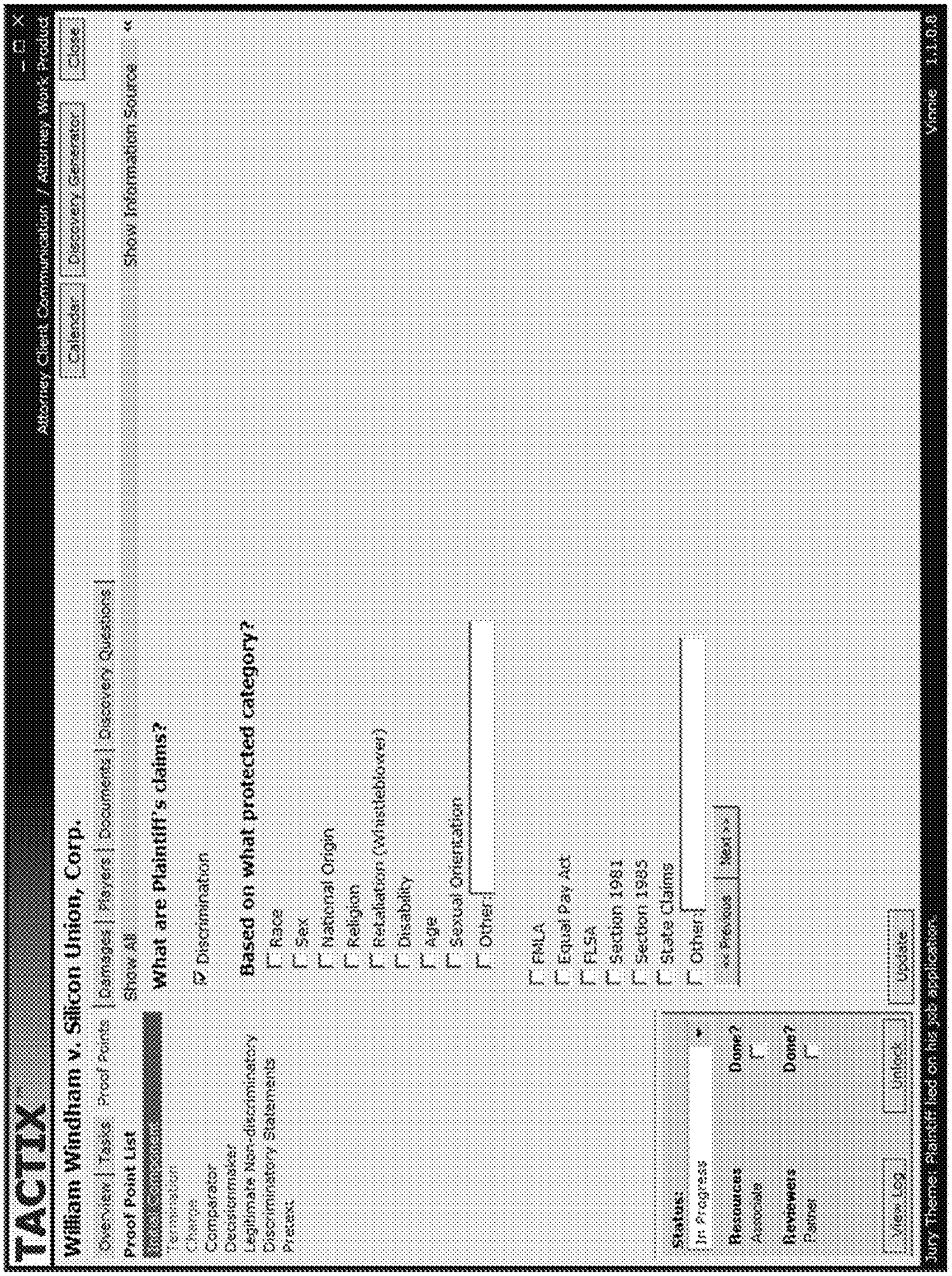
Figure 34:
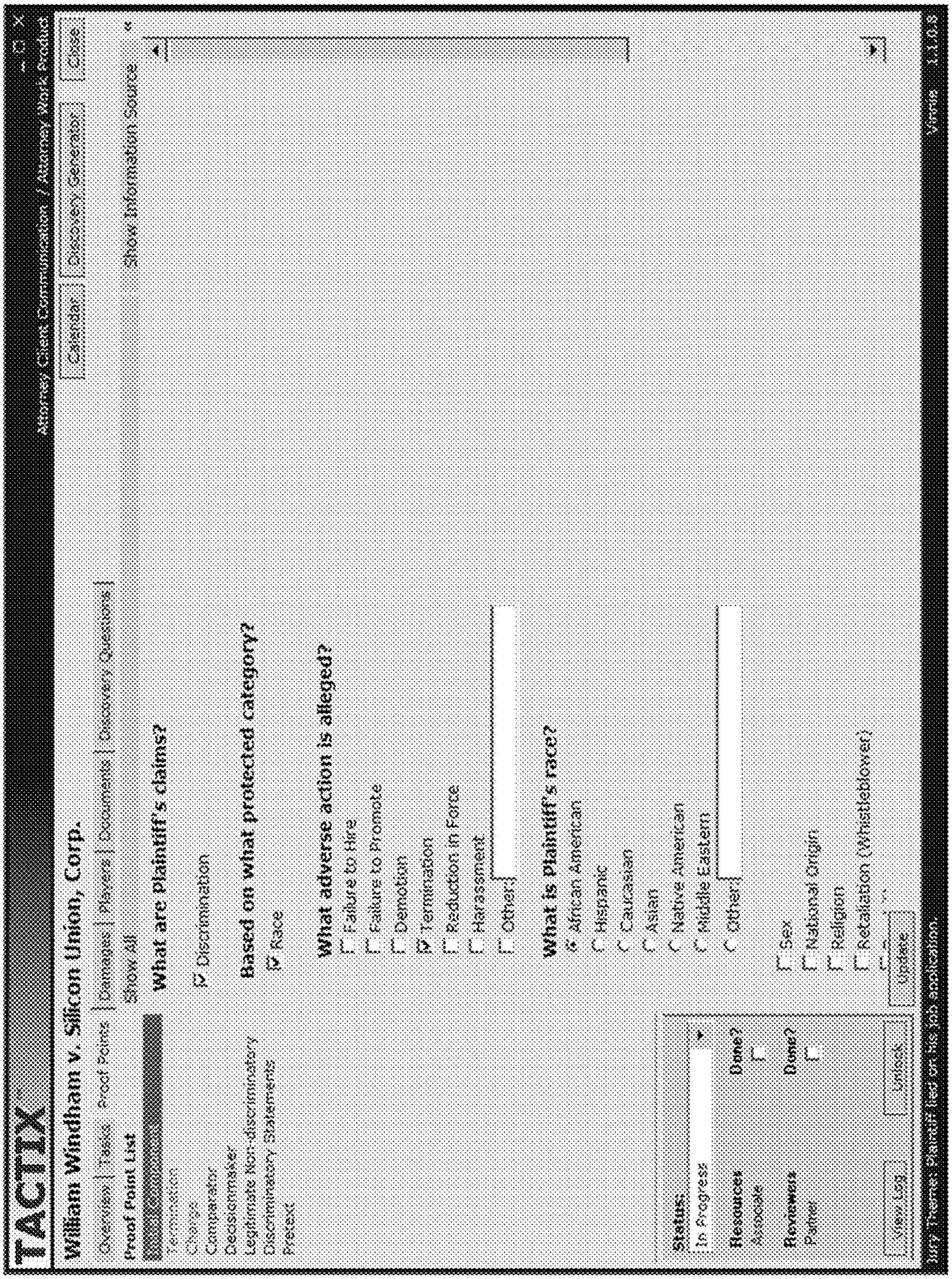
Figure 35:
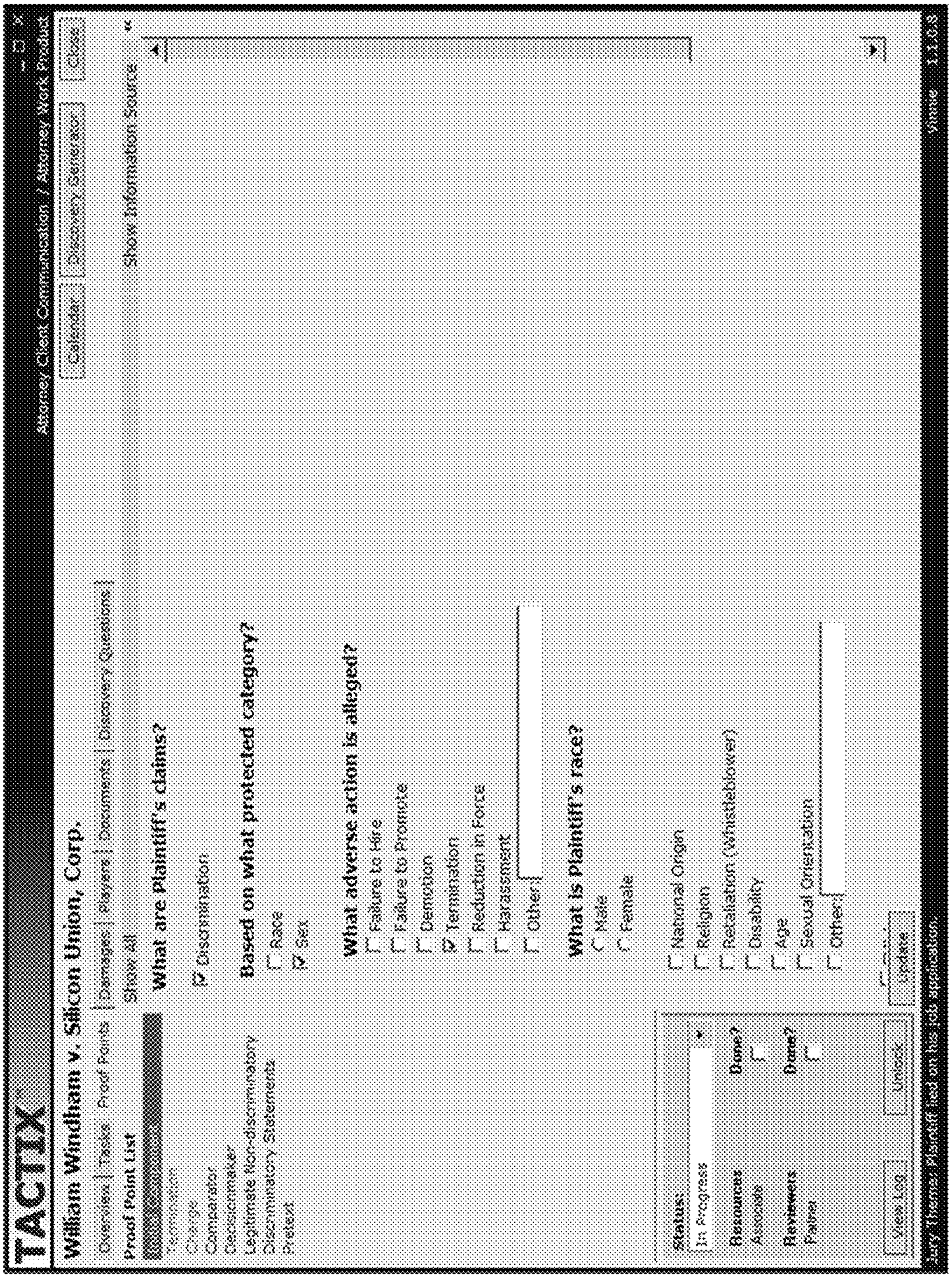
Figure 36:
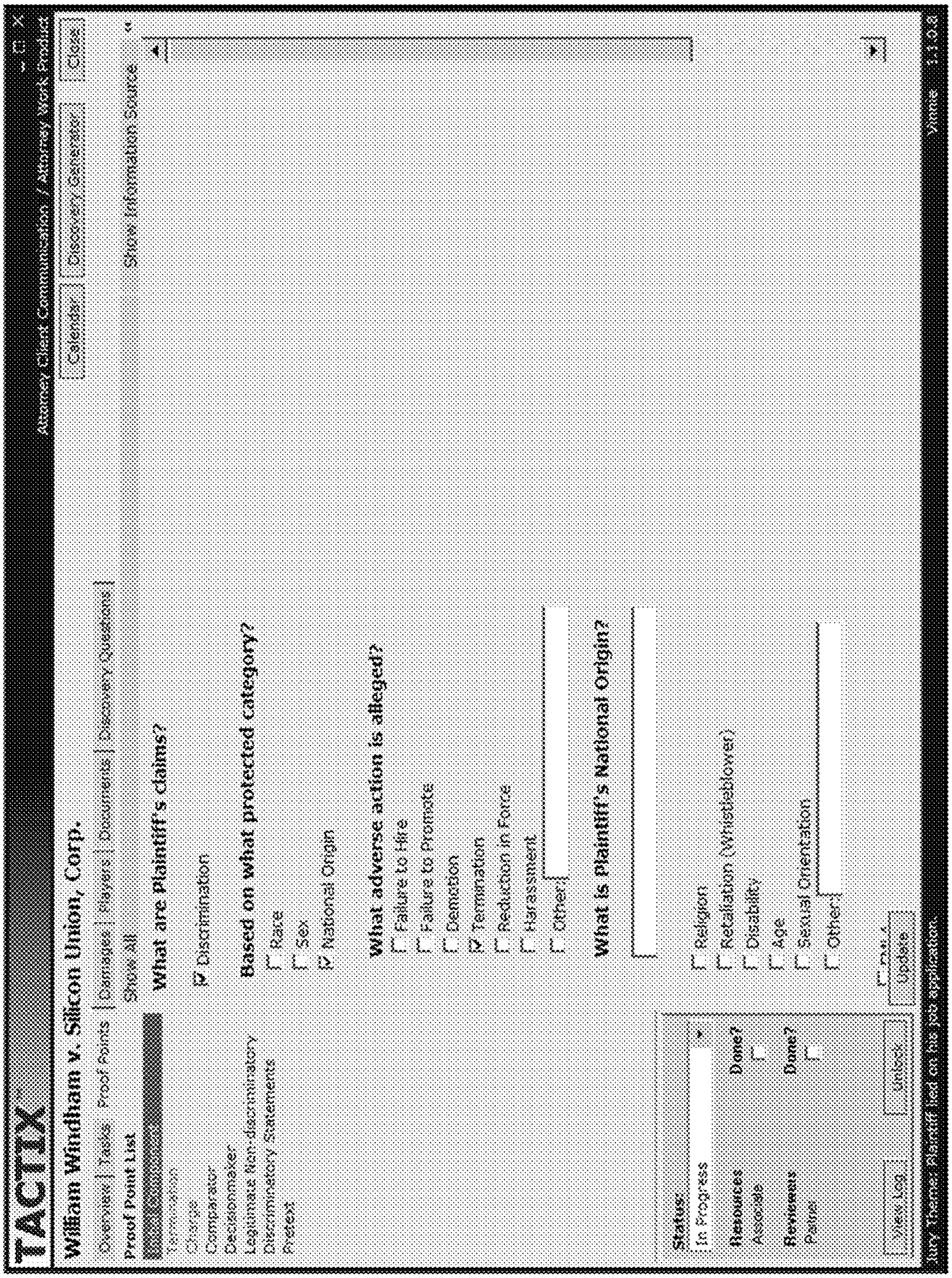
Figure 37:
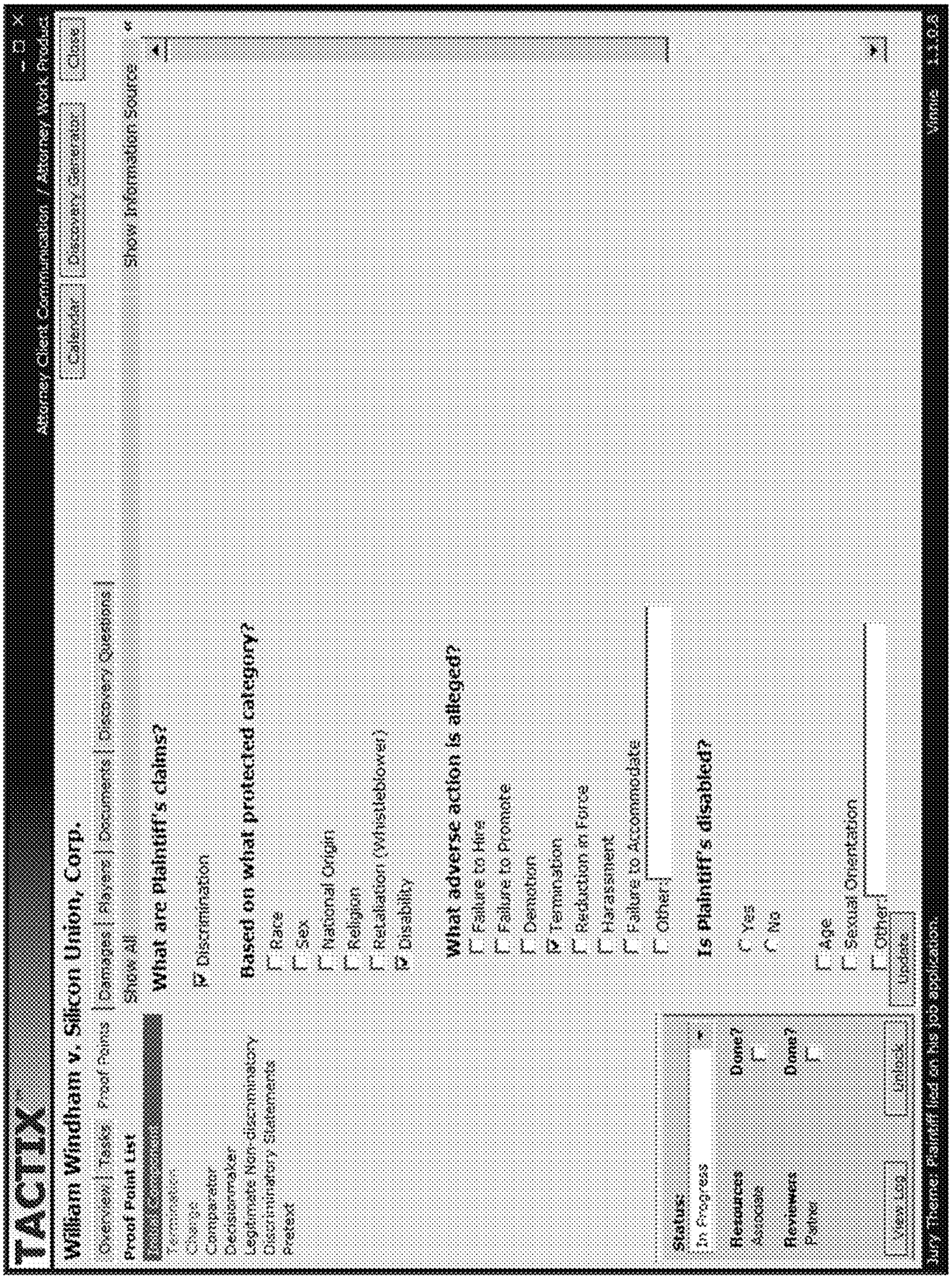
Figure 38:
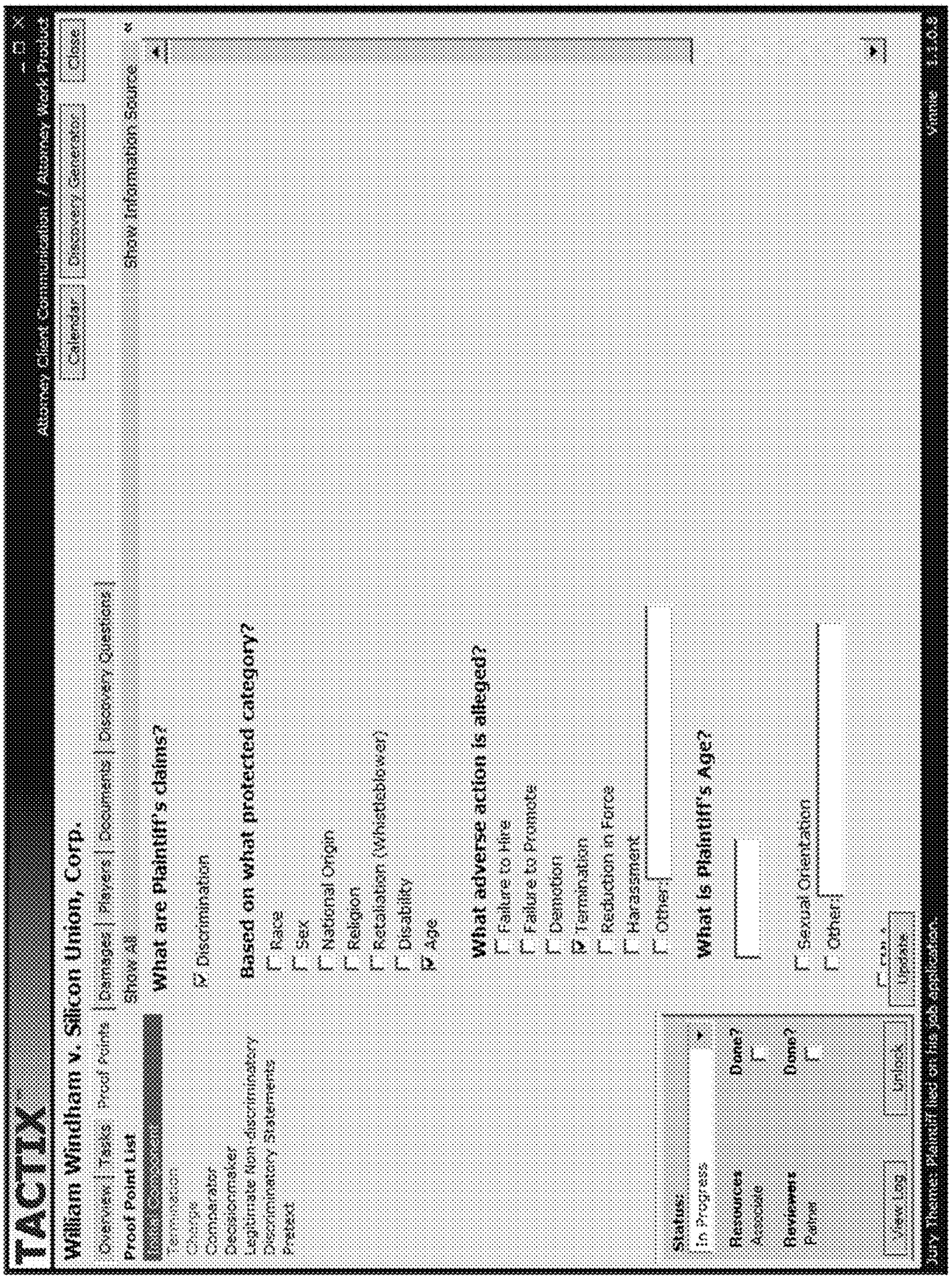
Figure 39:
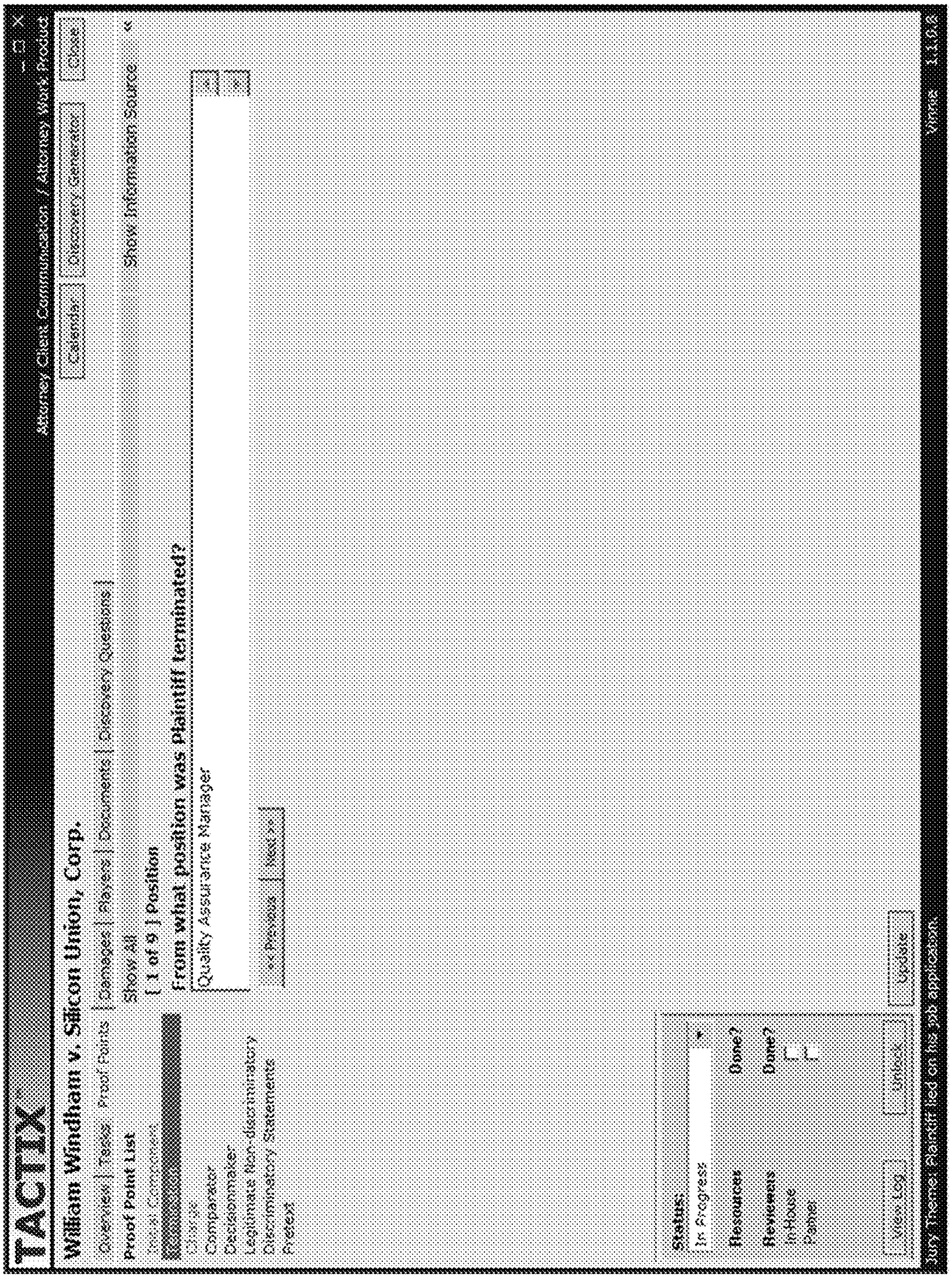
Figure 40:
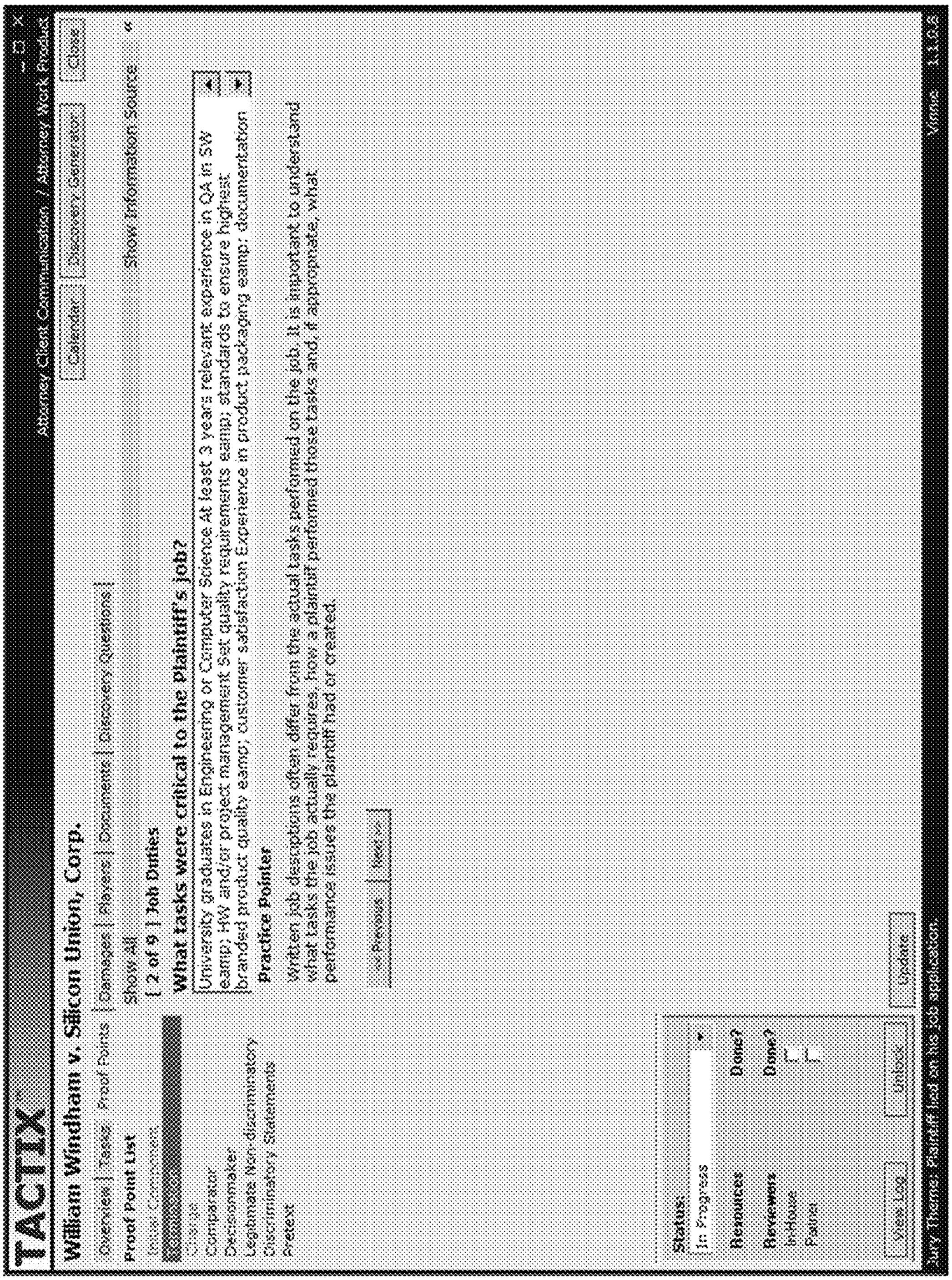
Figure 41:
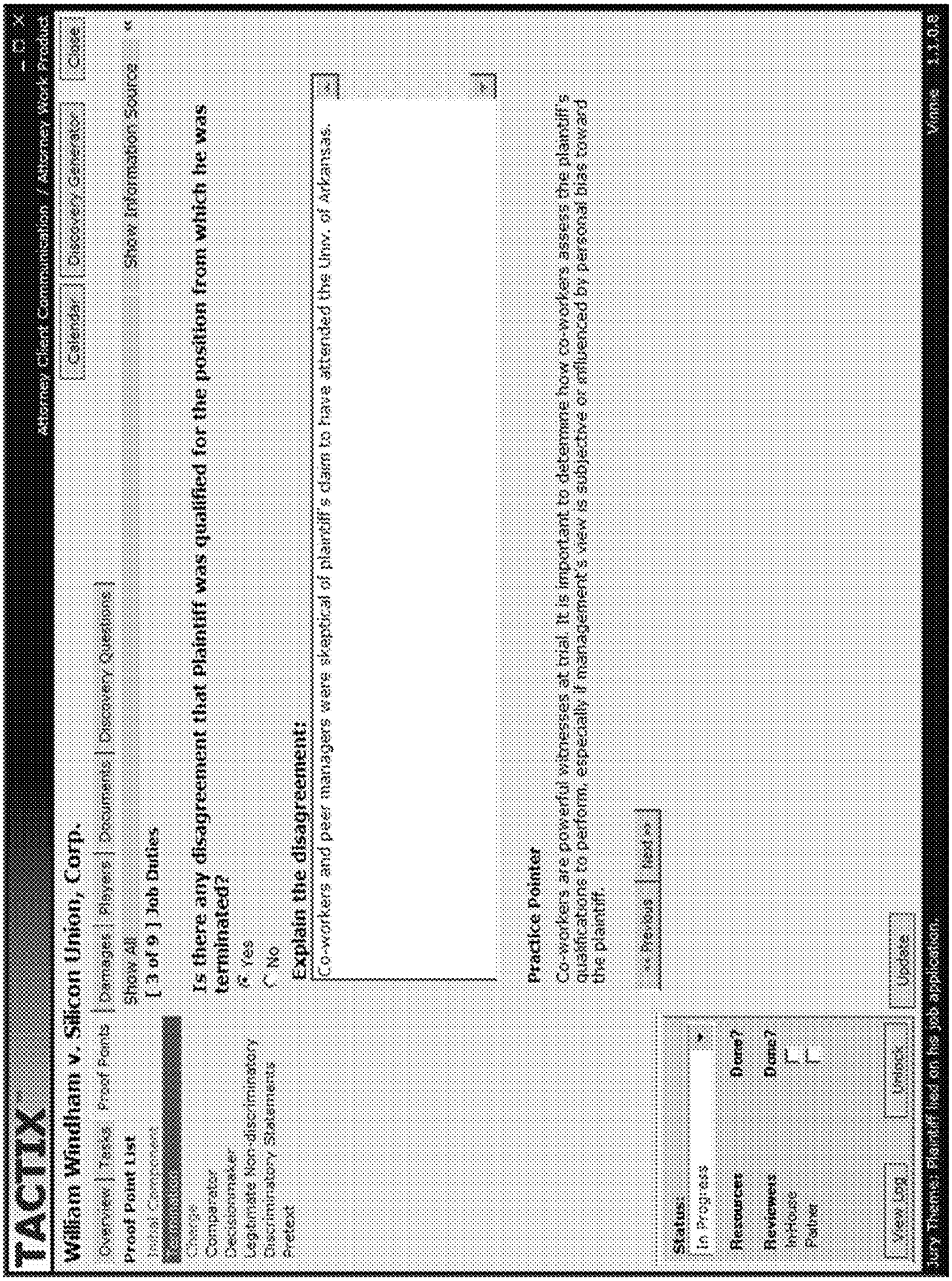
Figure 42:
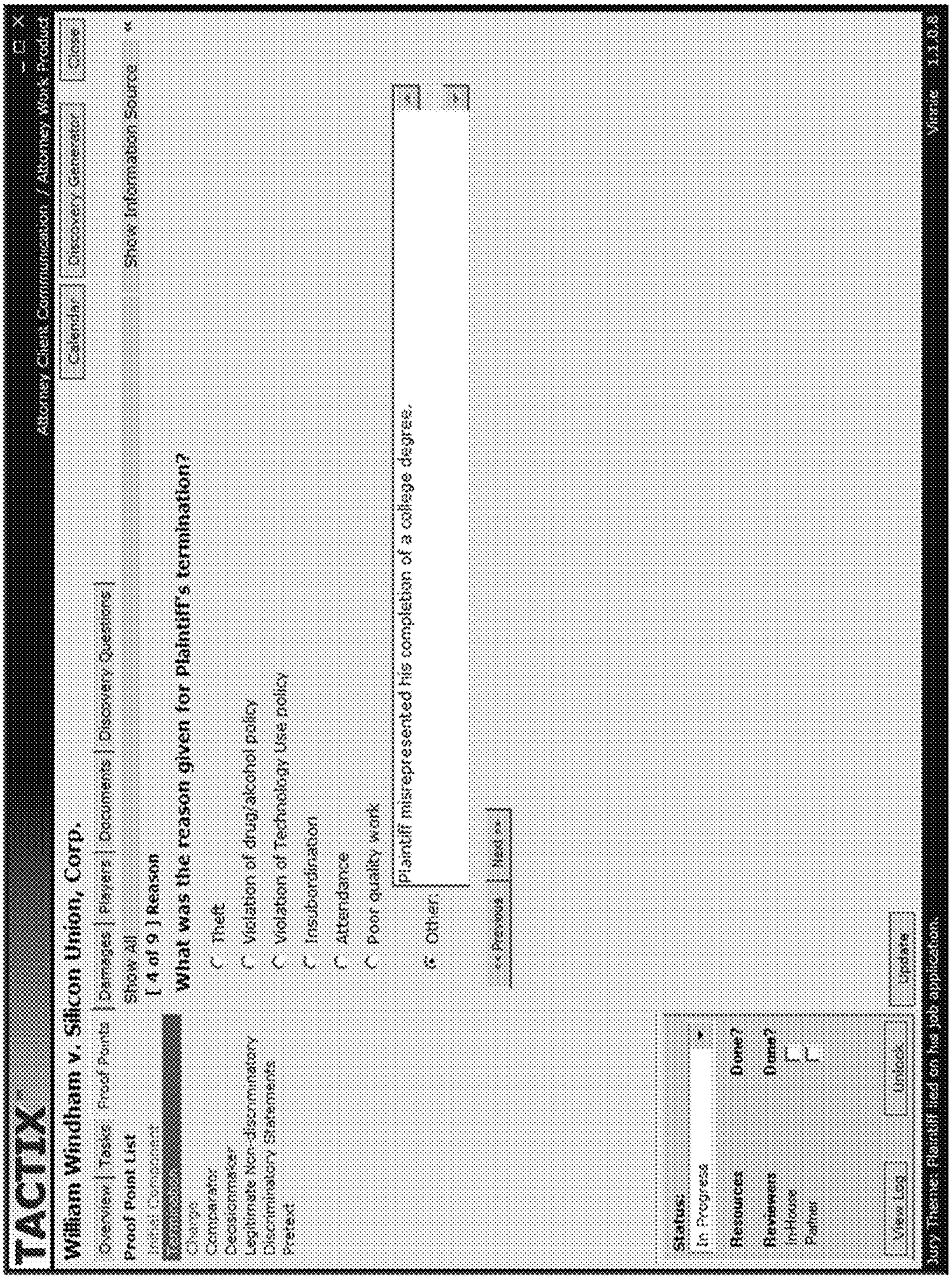
Figure 43:
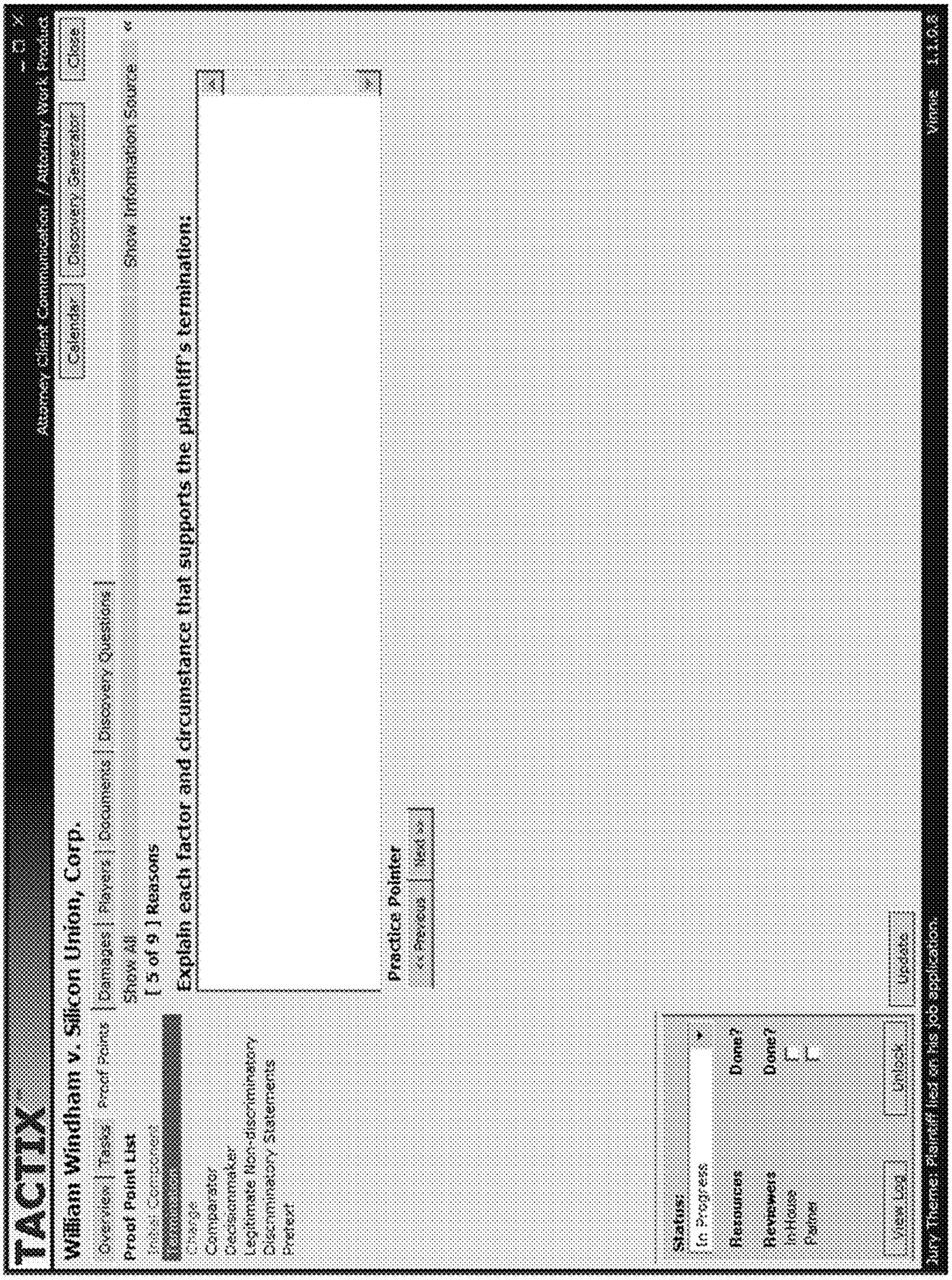
Figure 44:
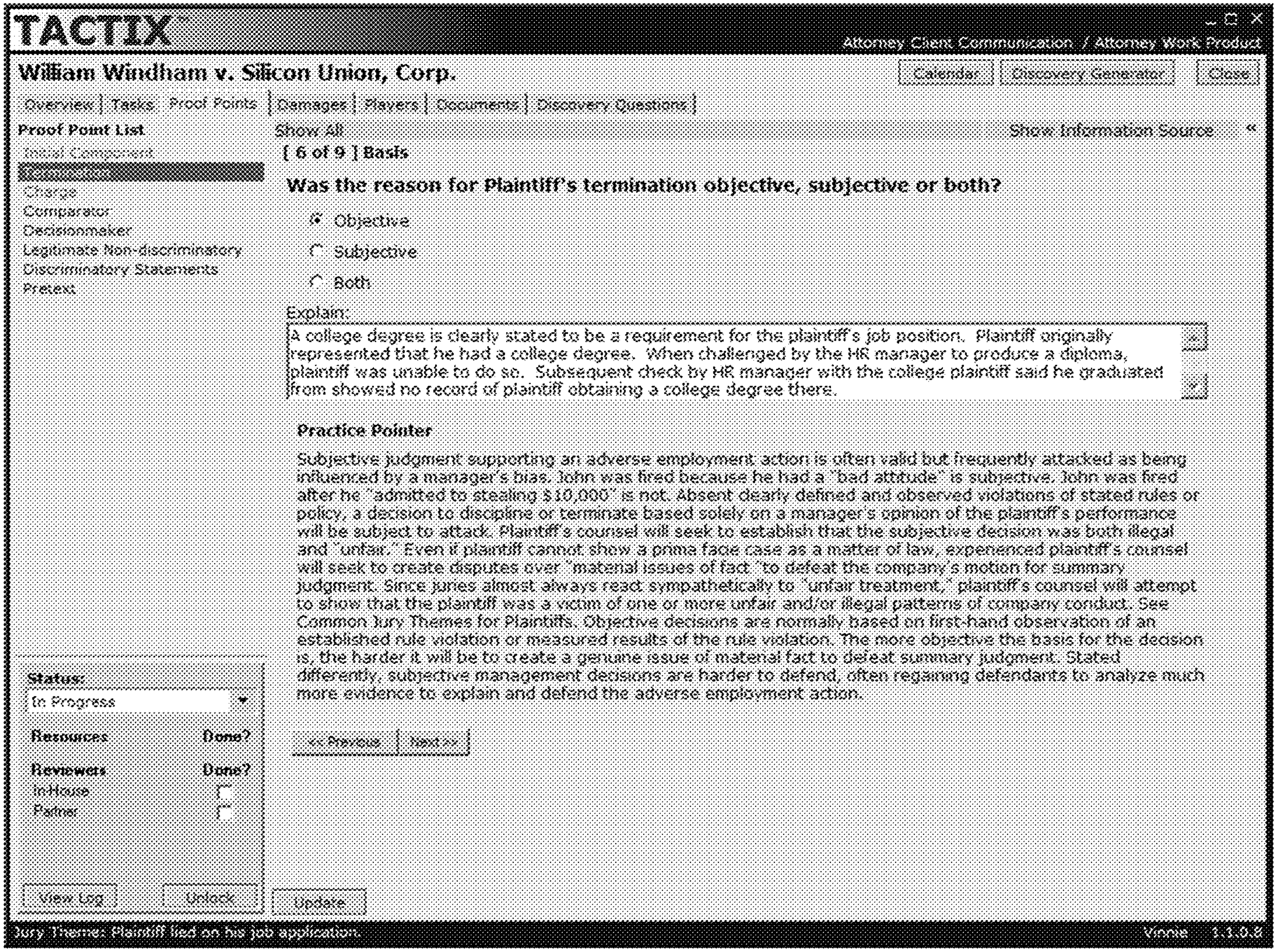
Figure 45:
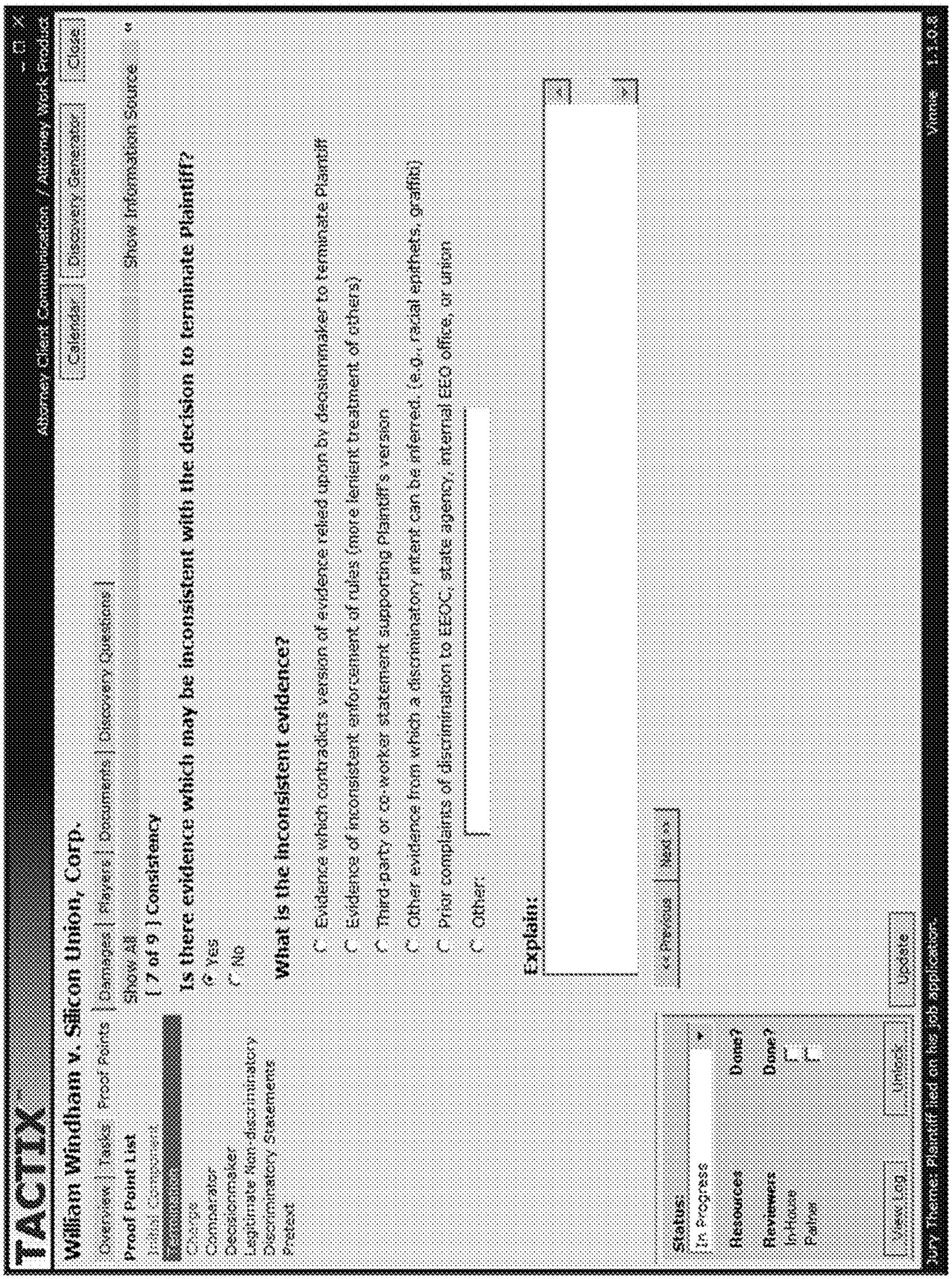
Figure 46:
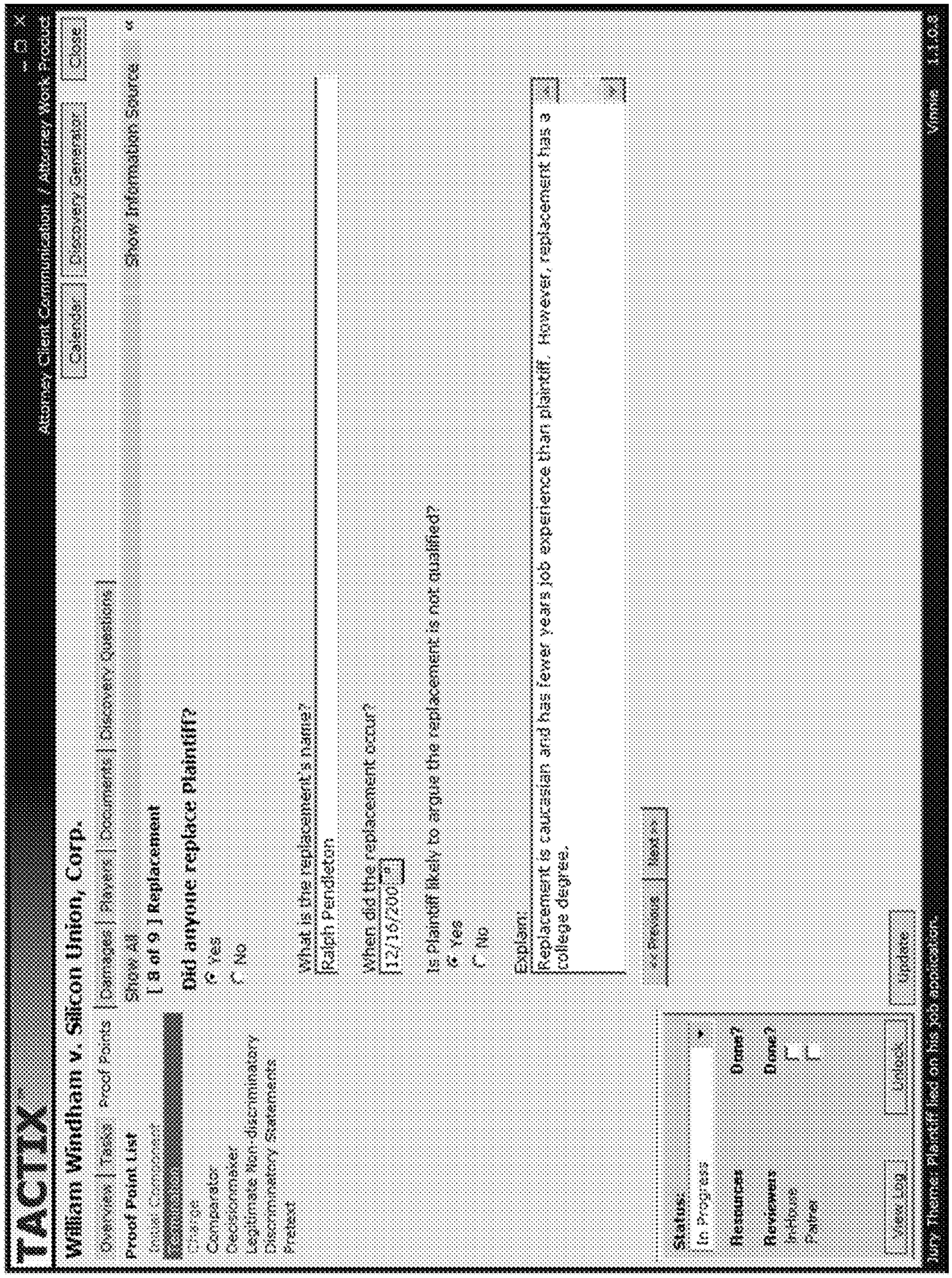
Figure 47:
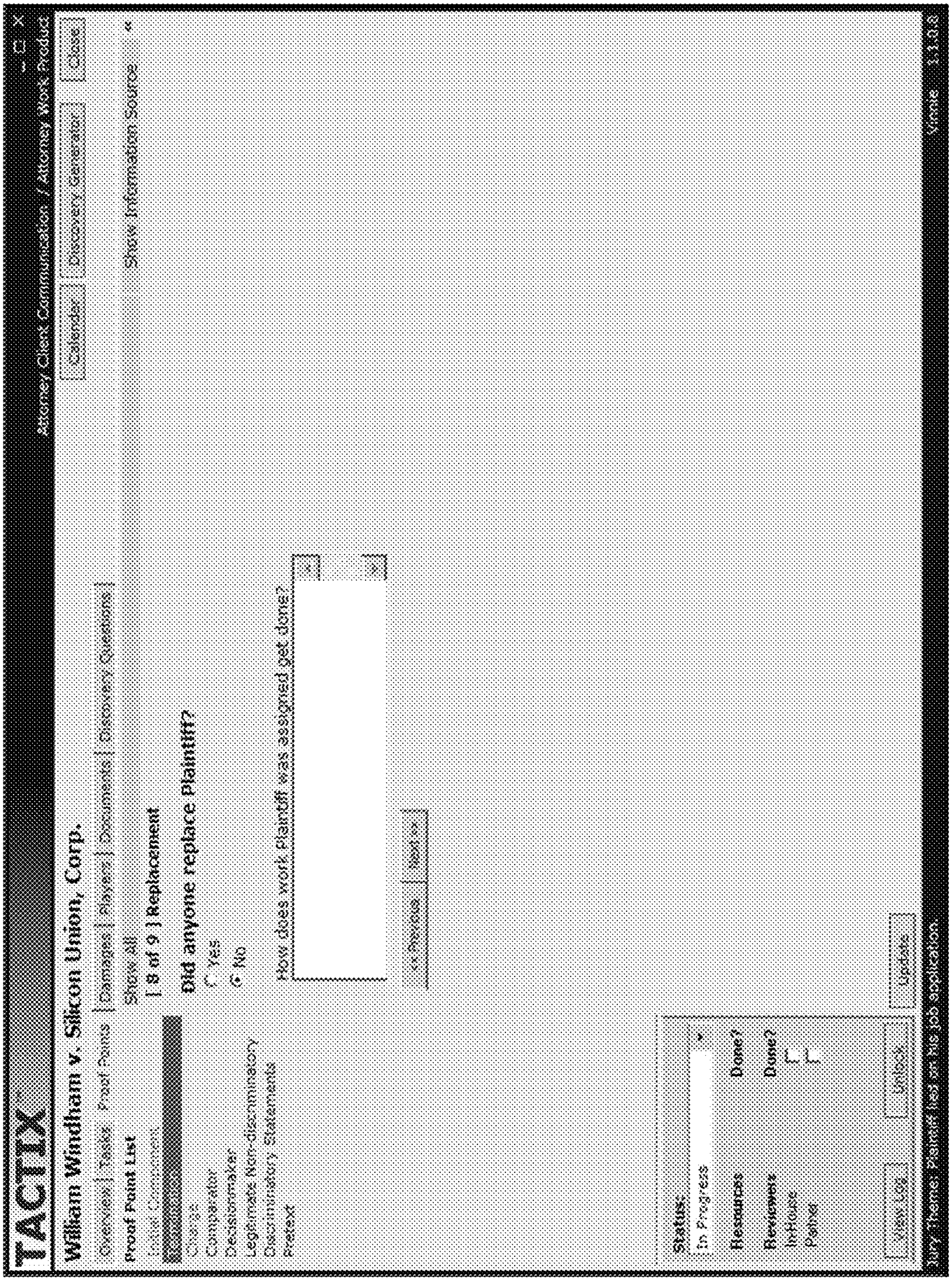
Figure 48:
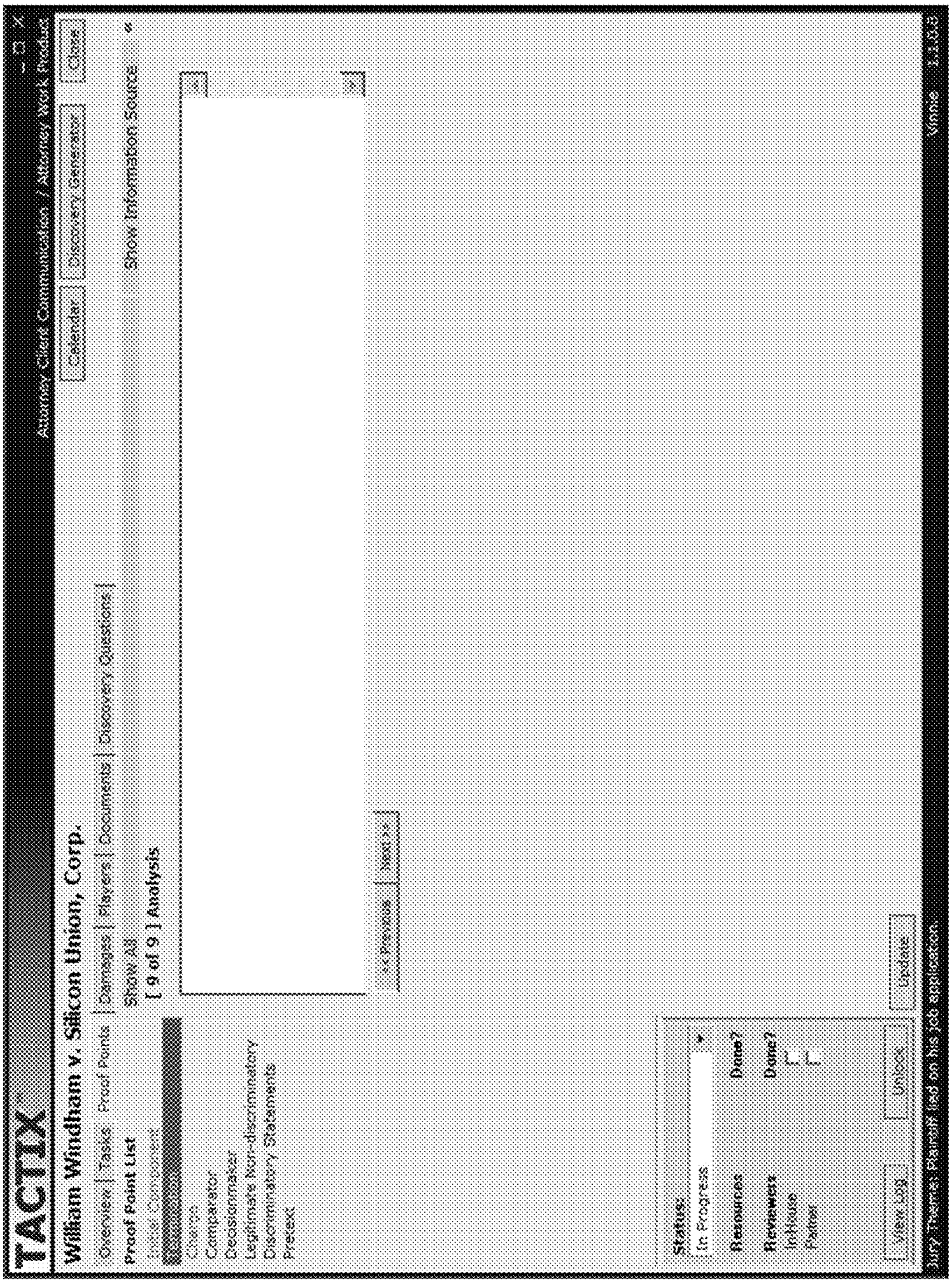
Figure 49:
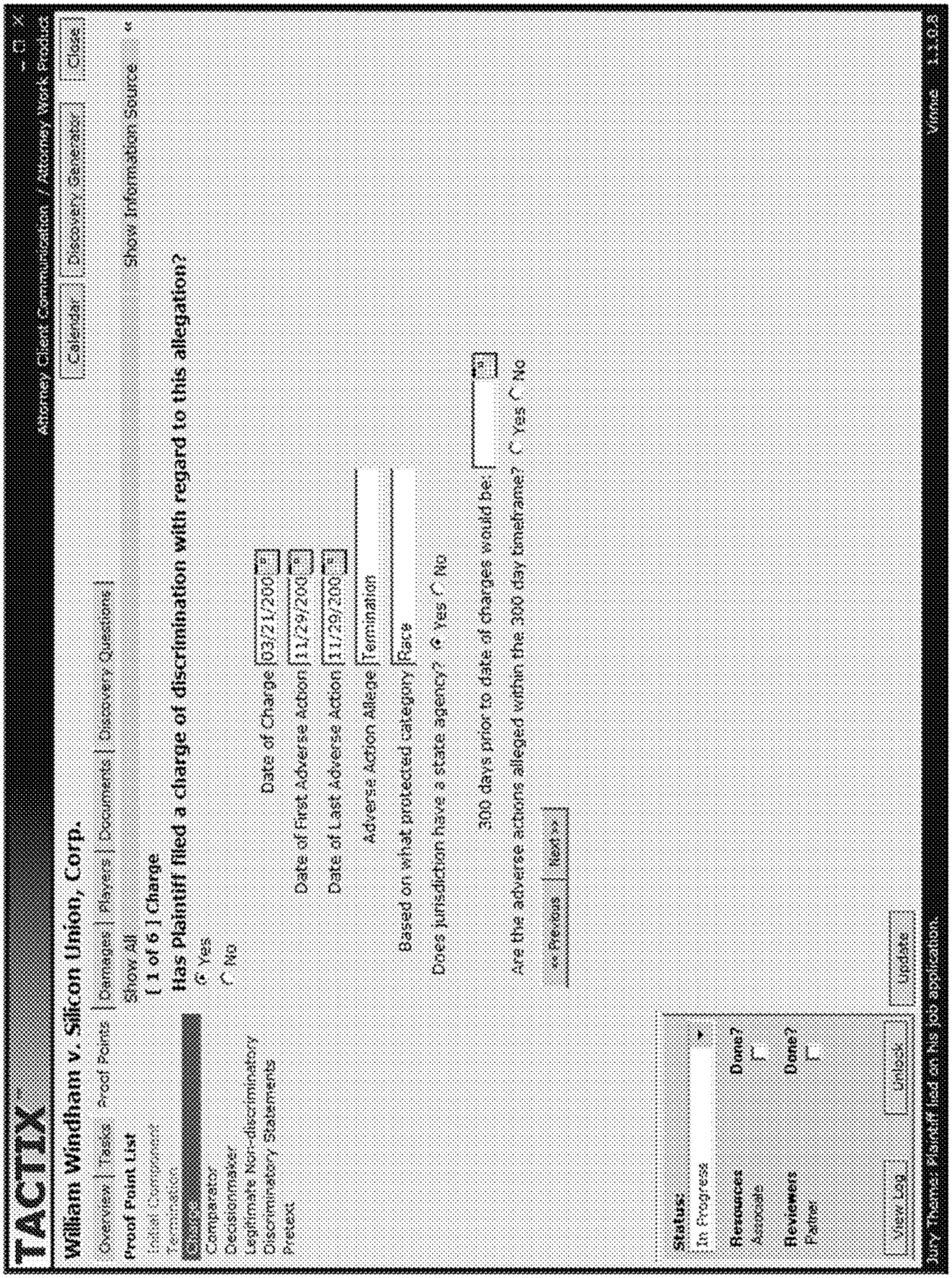
Figure 50:
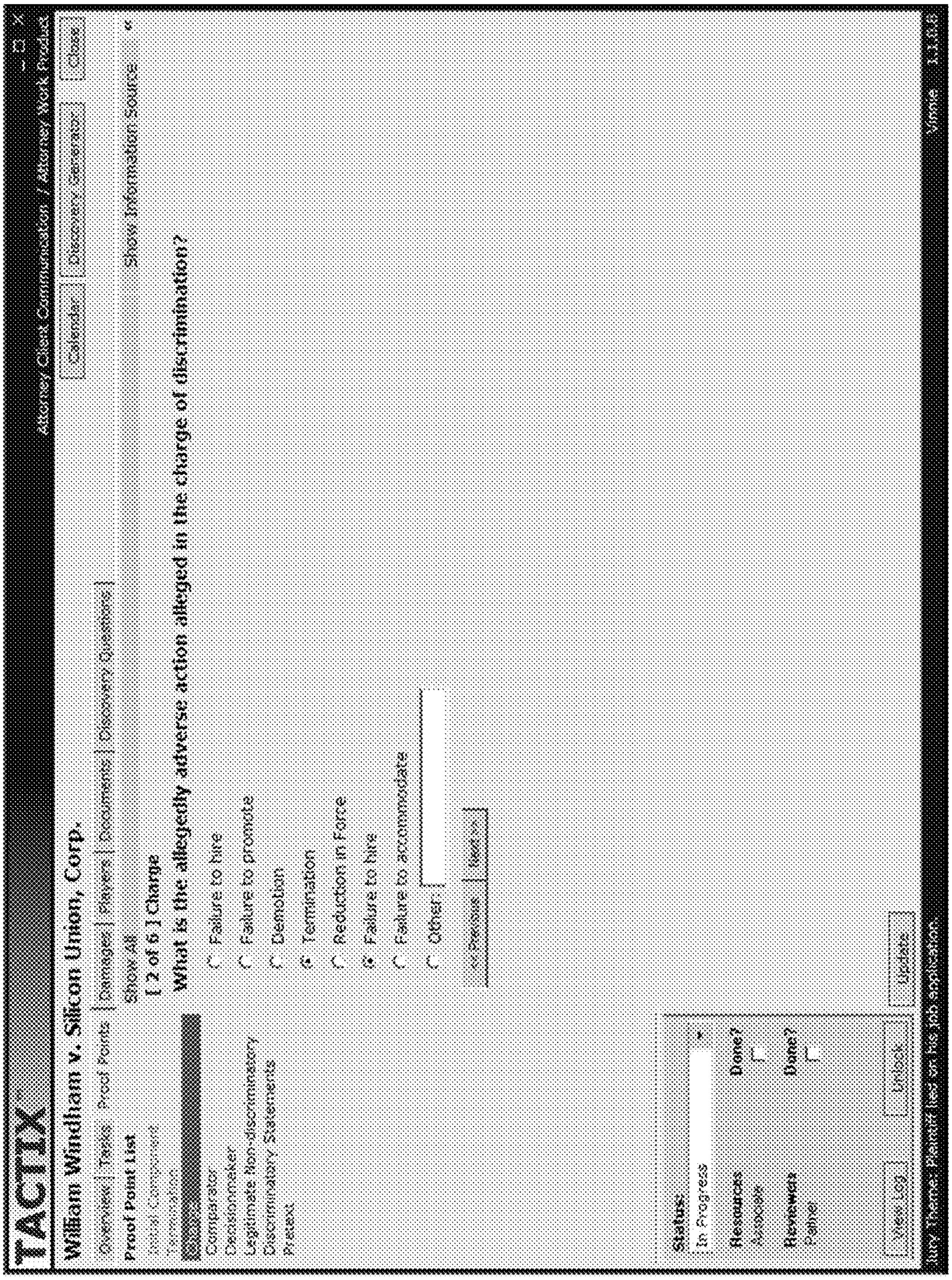
Figure 51:
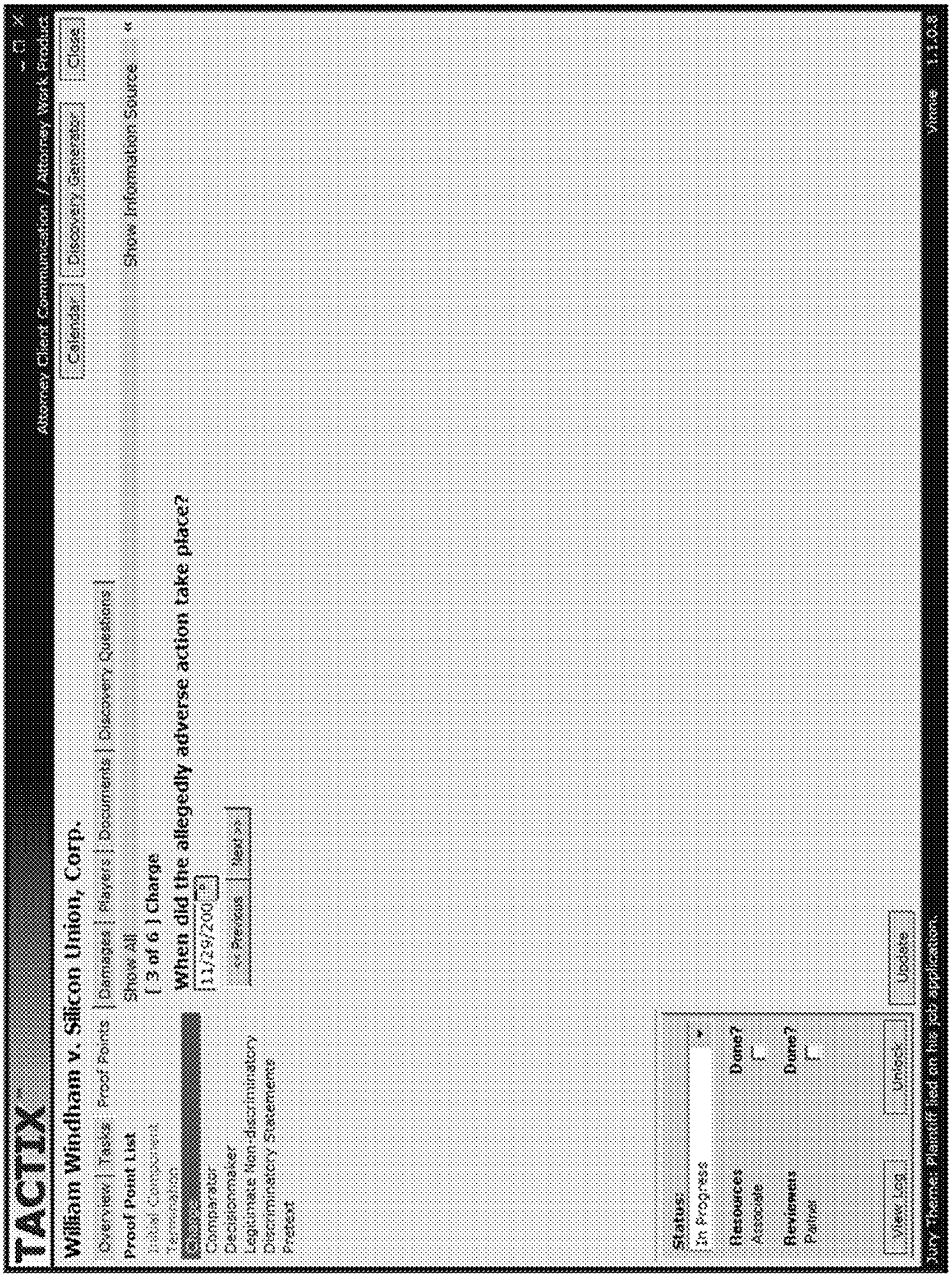
Figure 52:
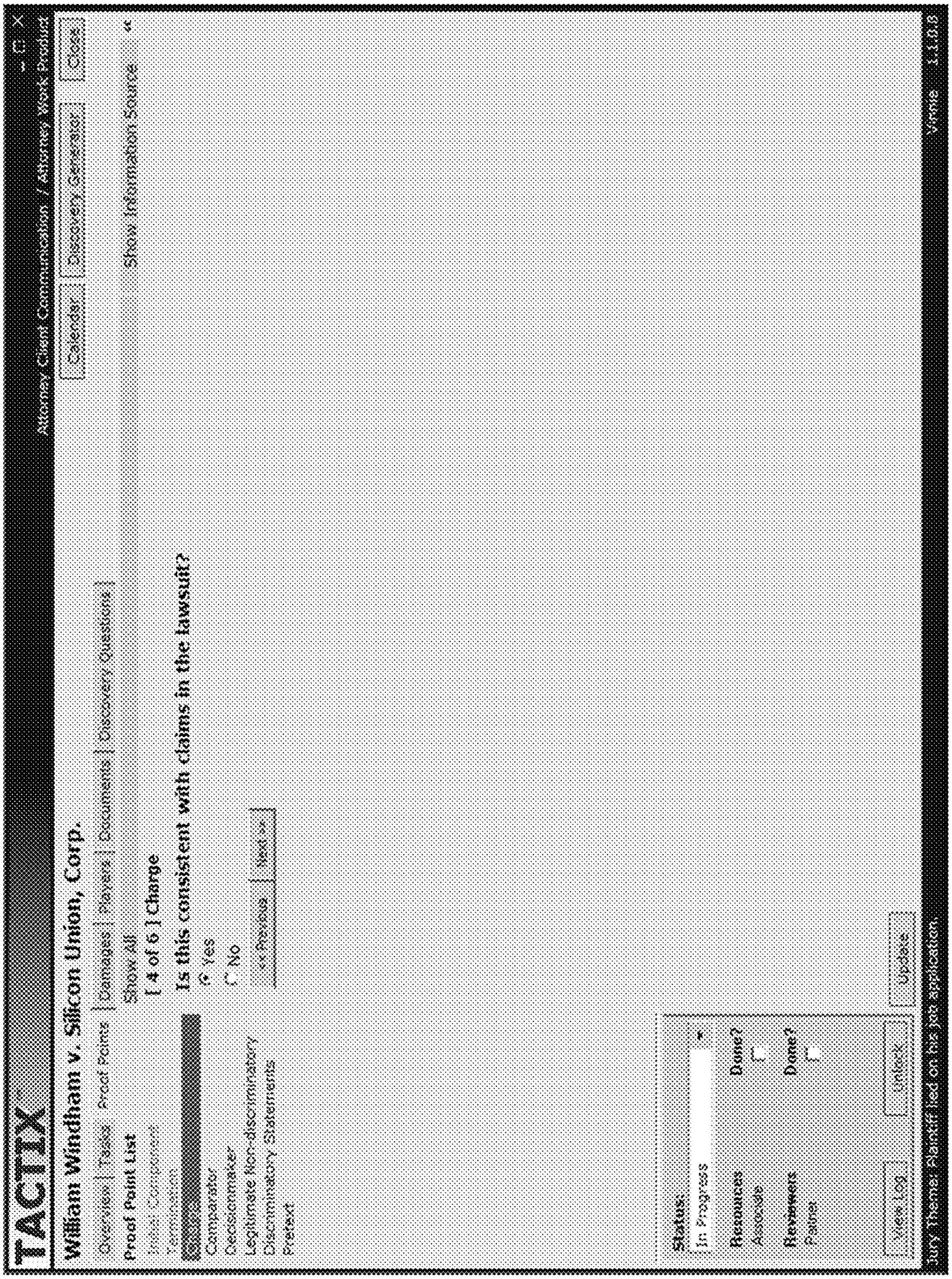
Figure 53:
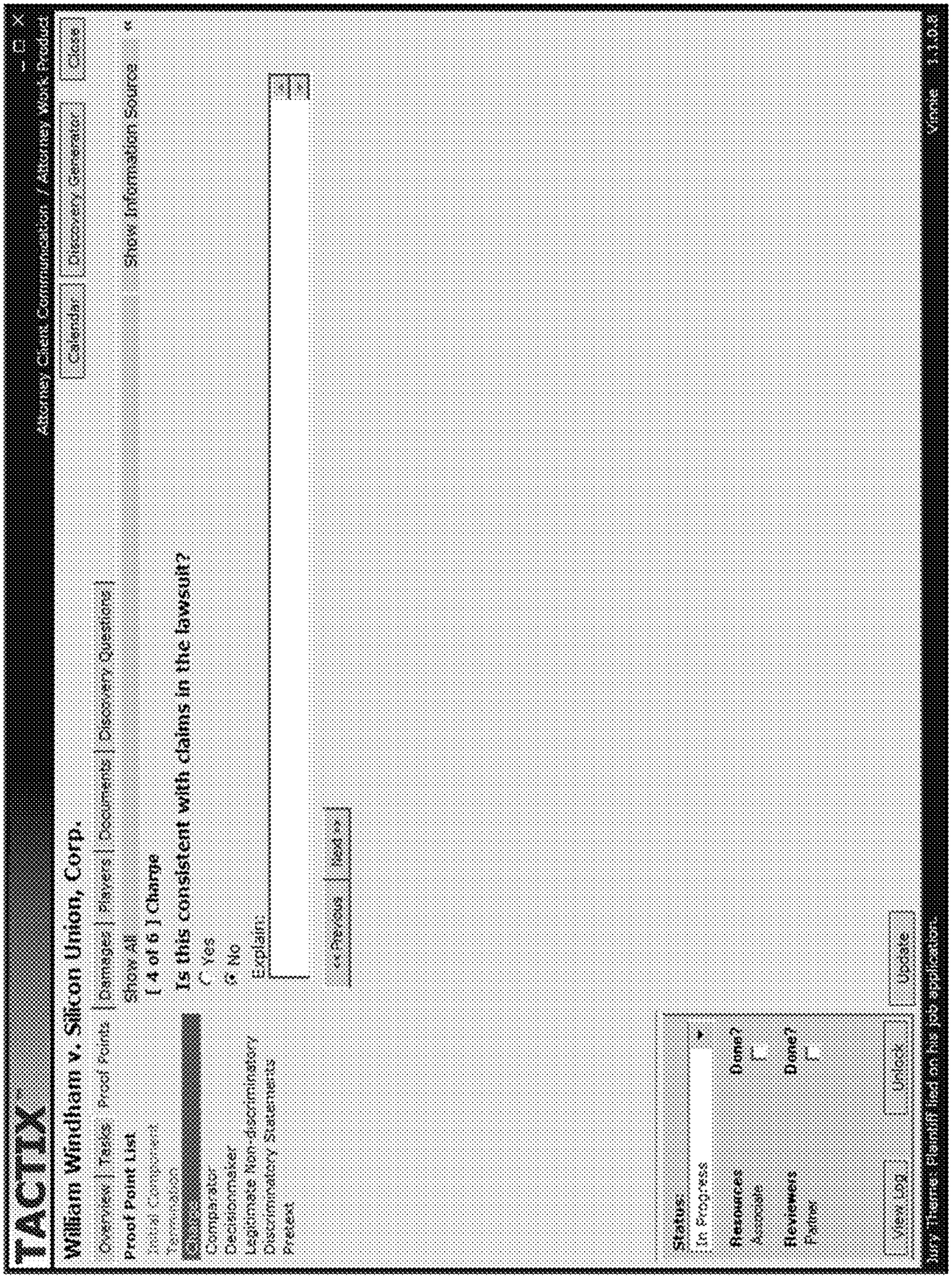
Figure 54:
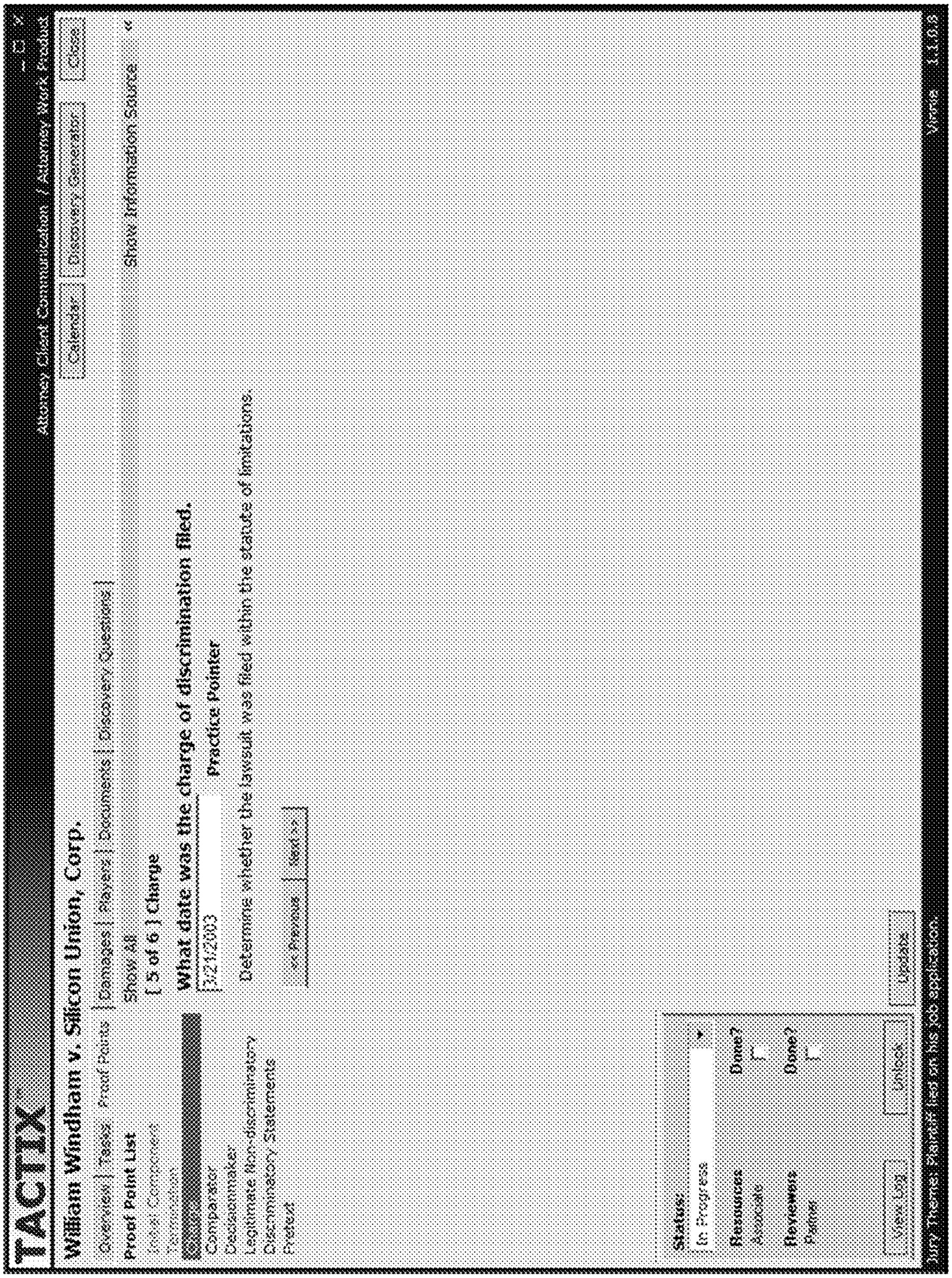
Figure 55:
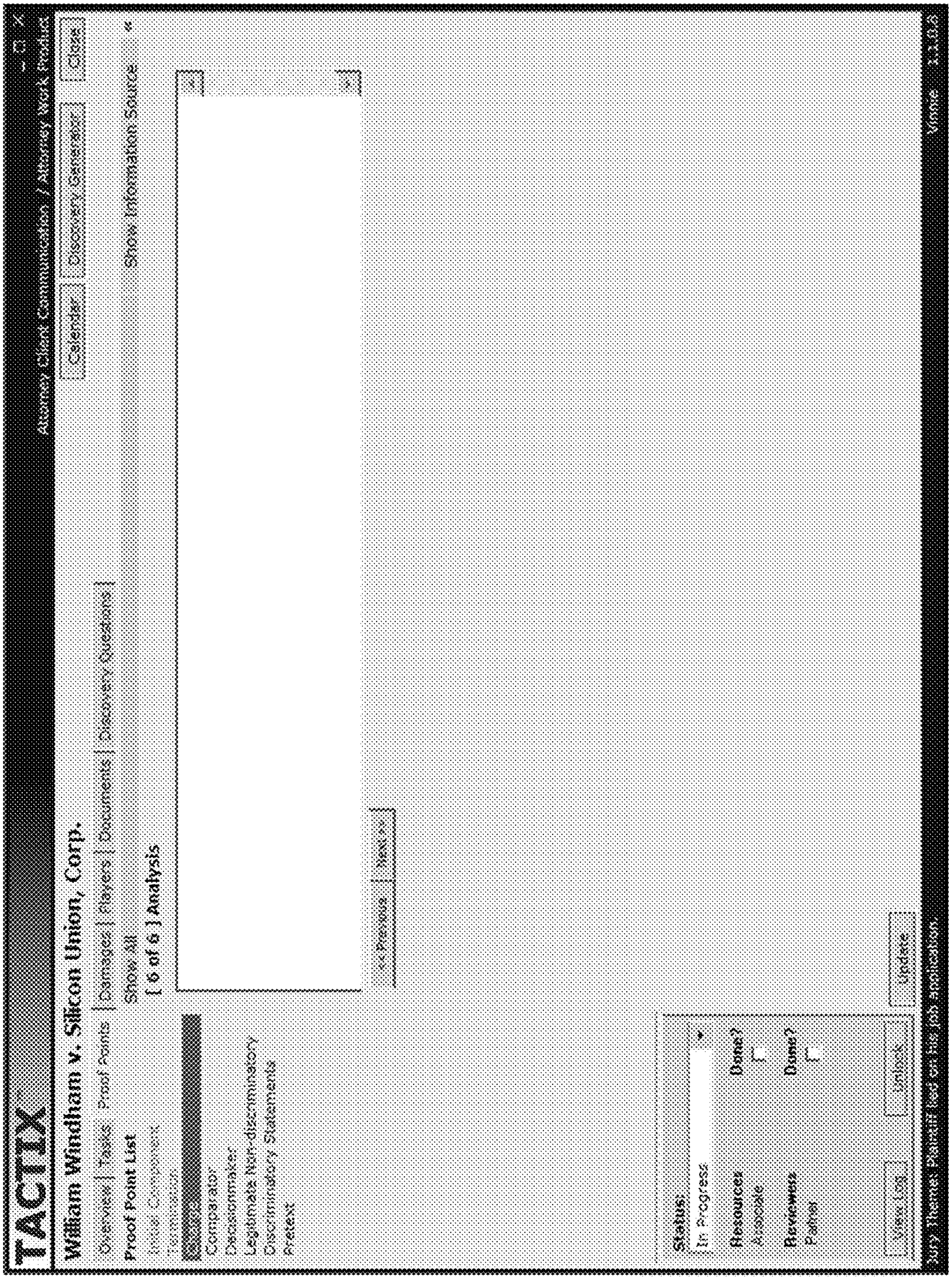
Figure 56:
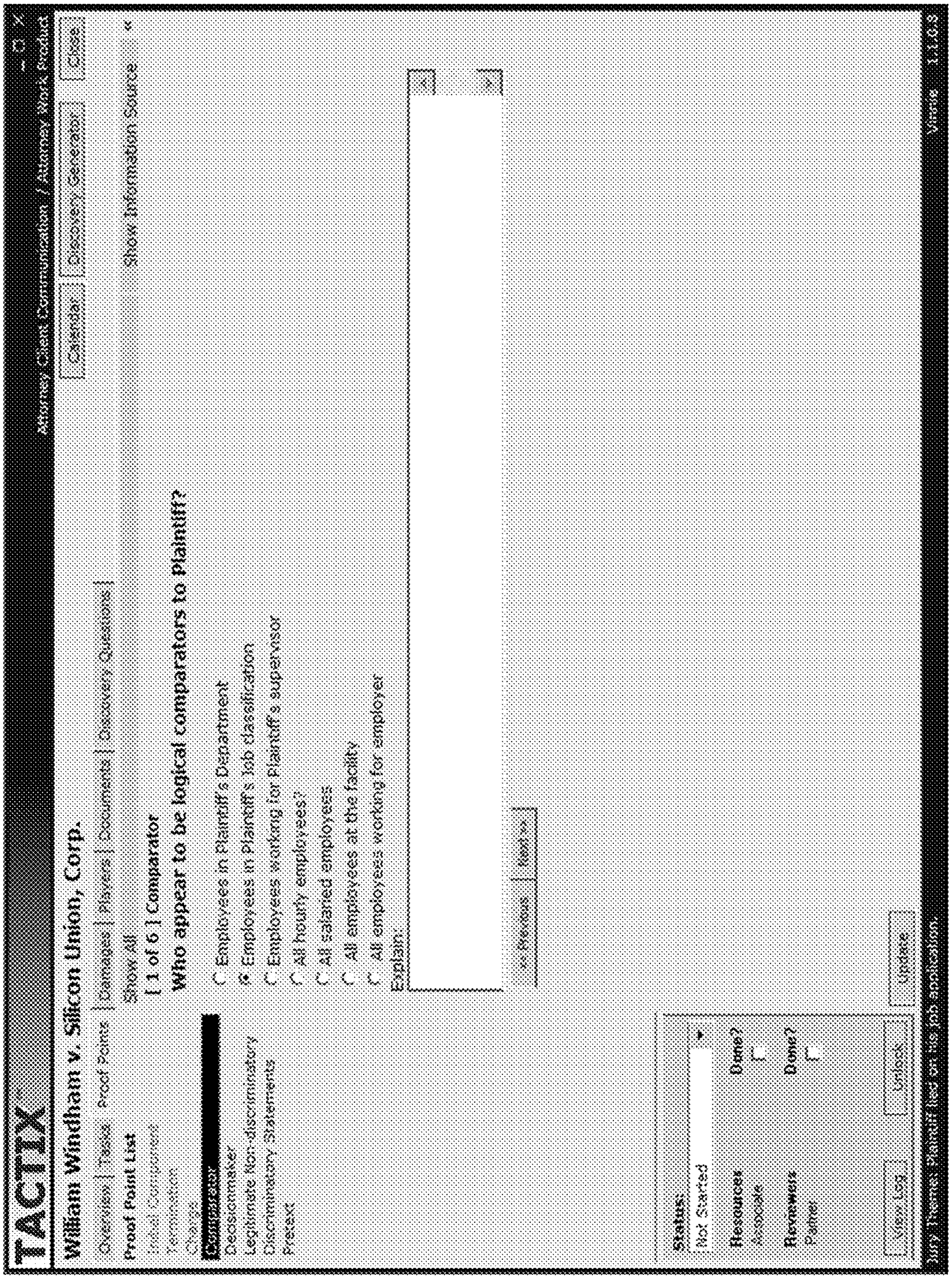
Figure 57:
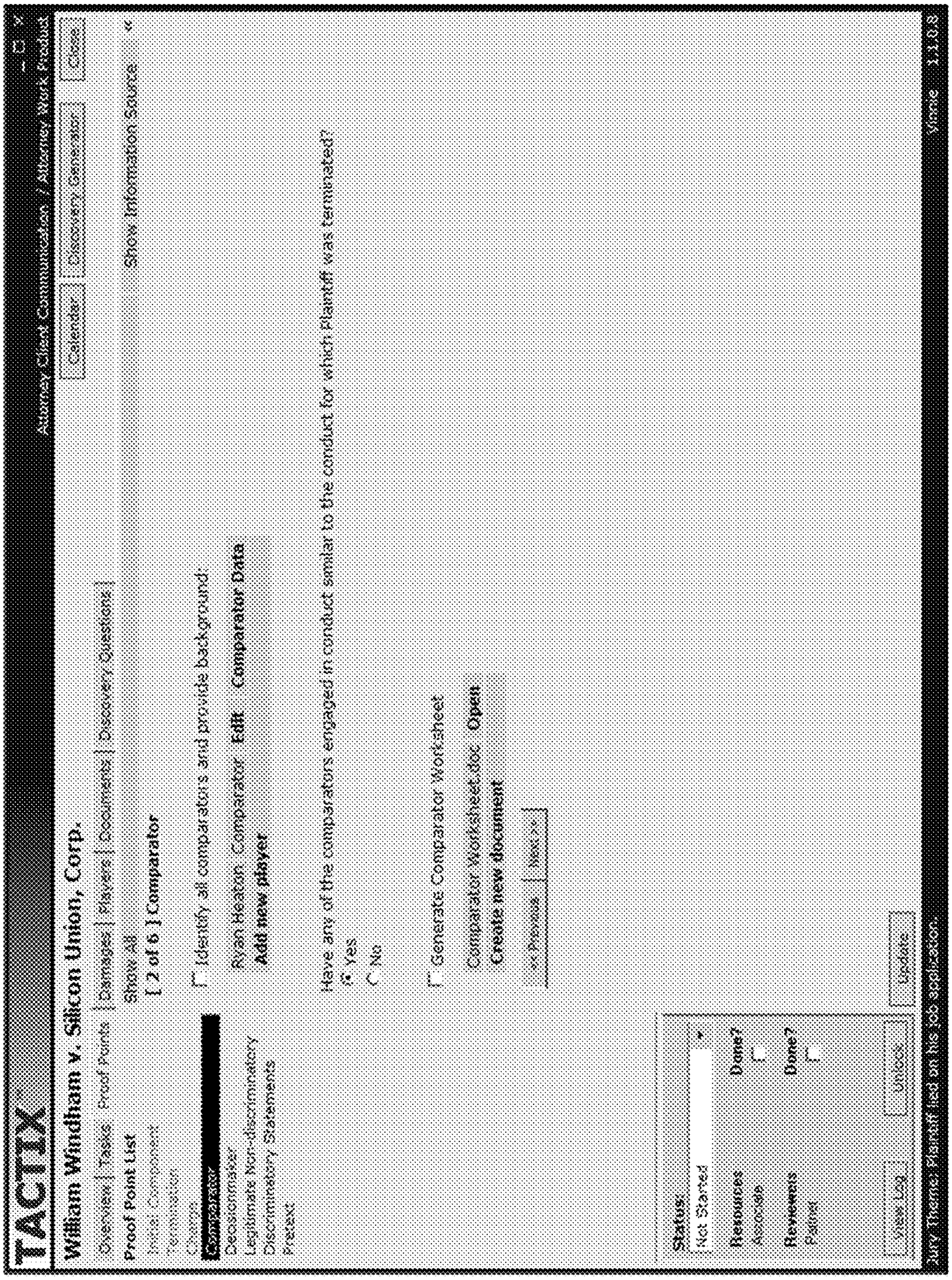
Figure 58:
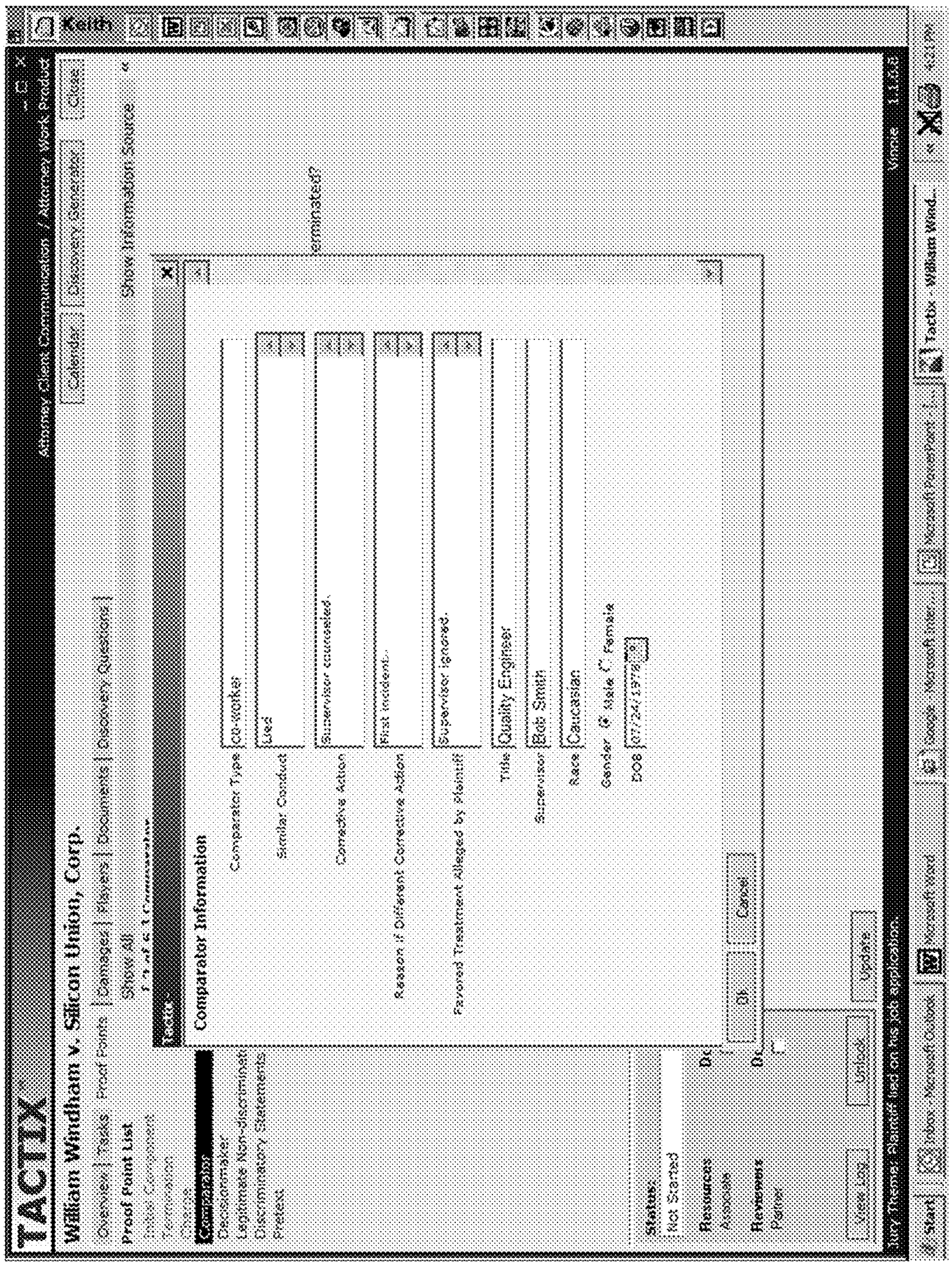
Figure 59:
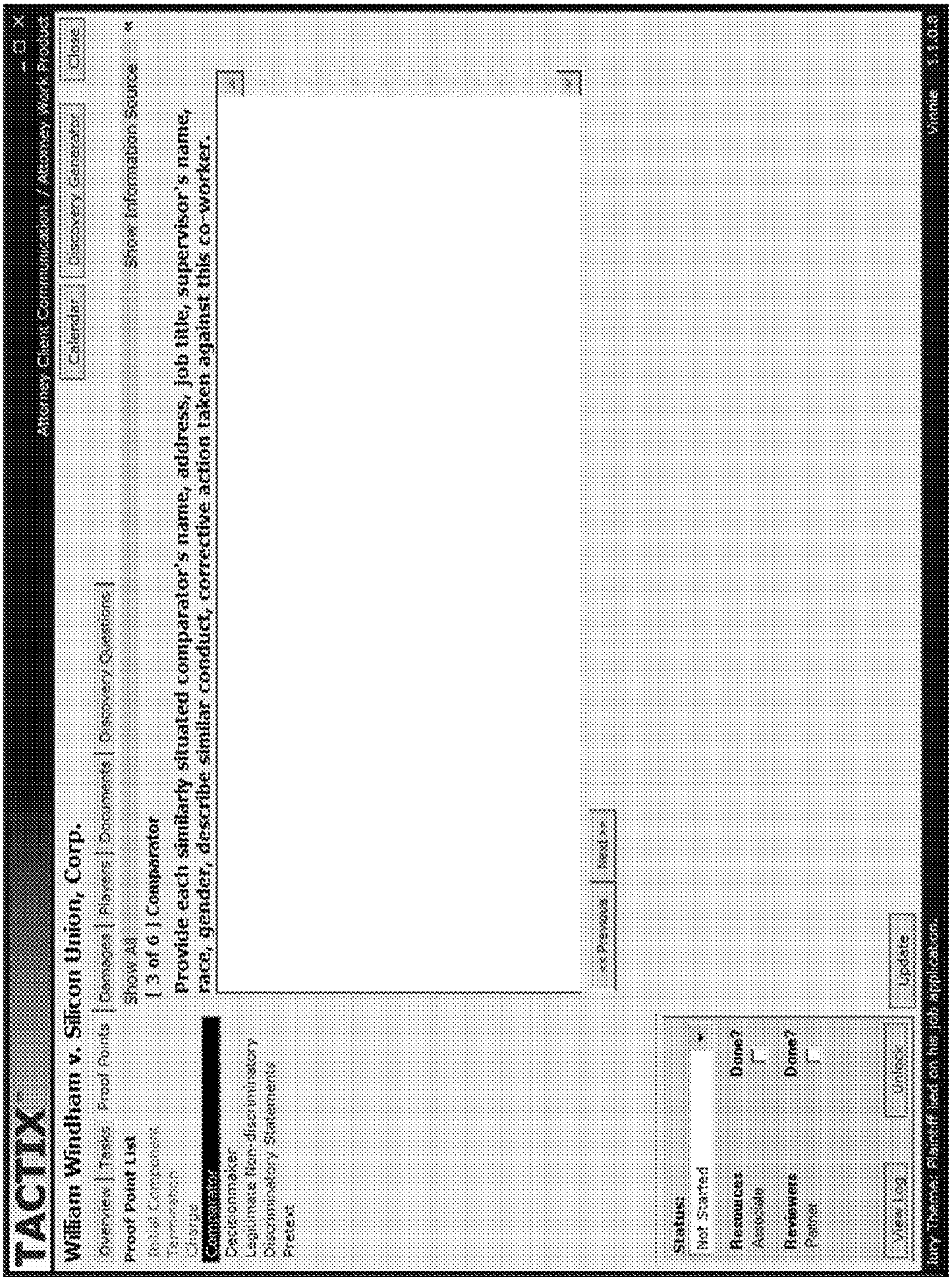
Figure 60:
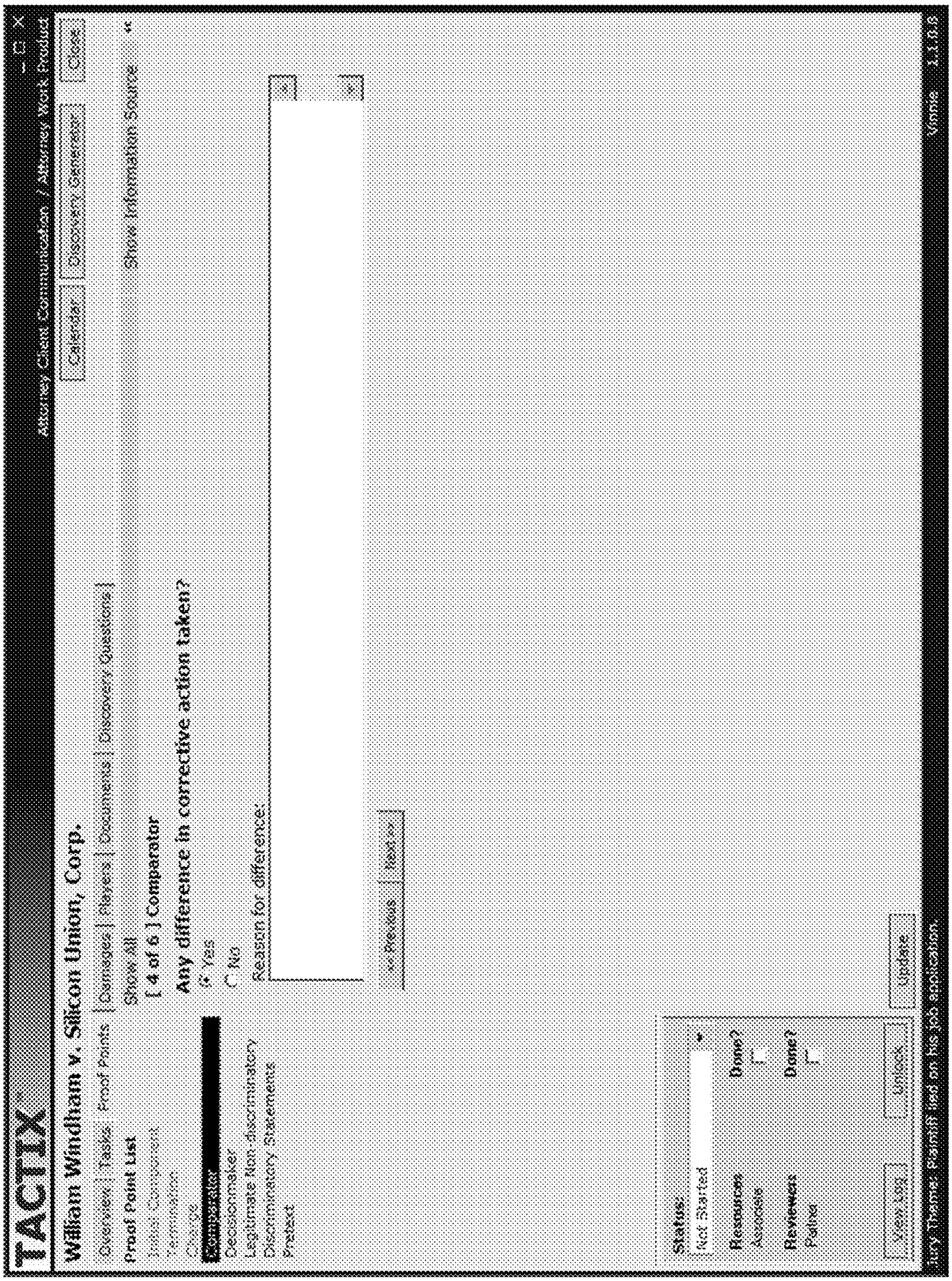
Figure 61:
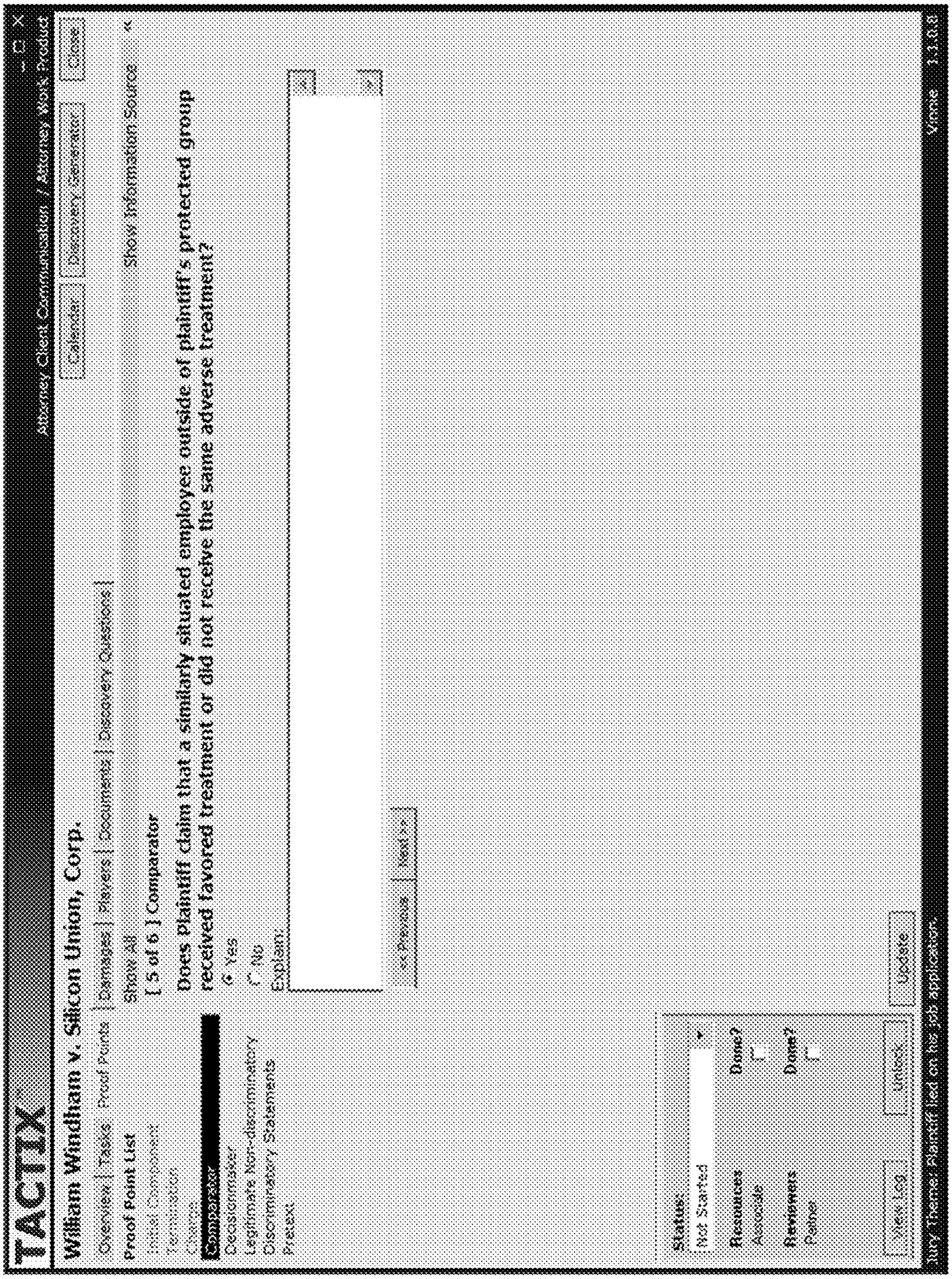
Figure 62:
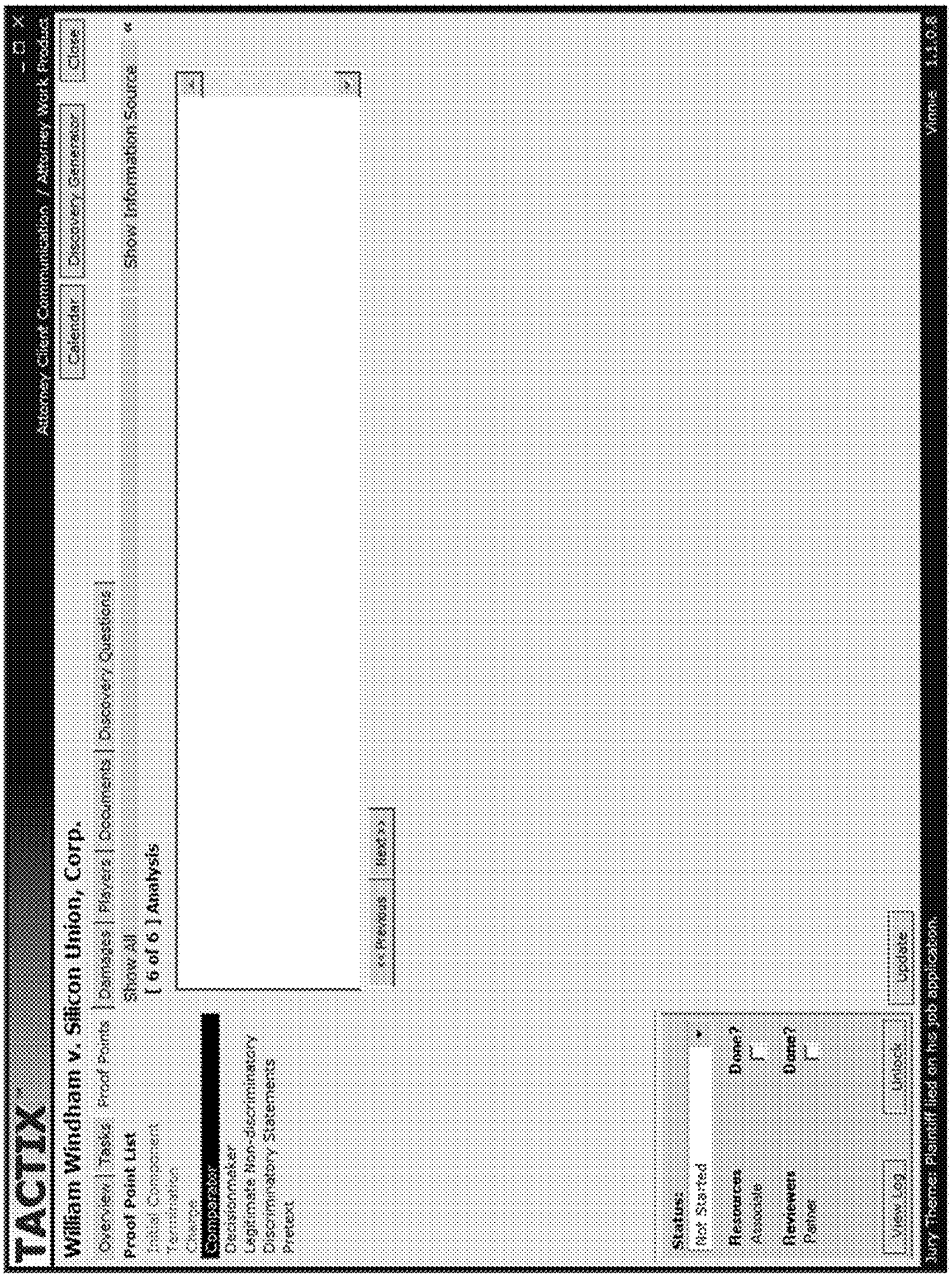
Figure 63:
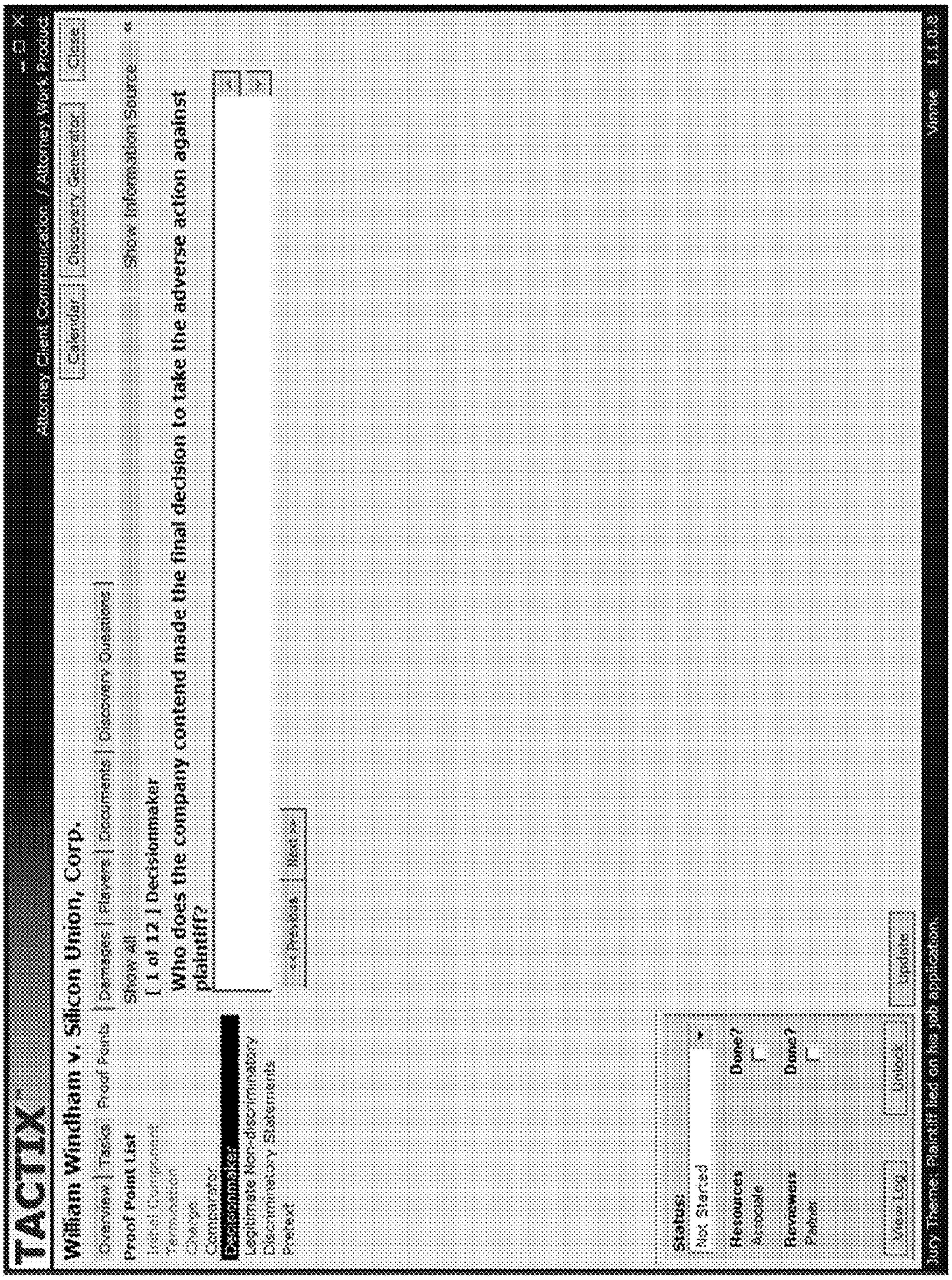
Figure 64:
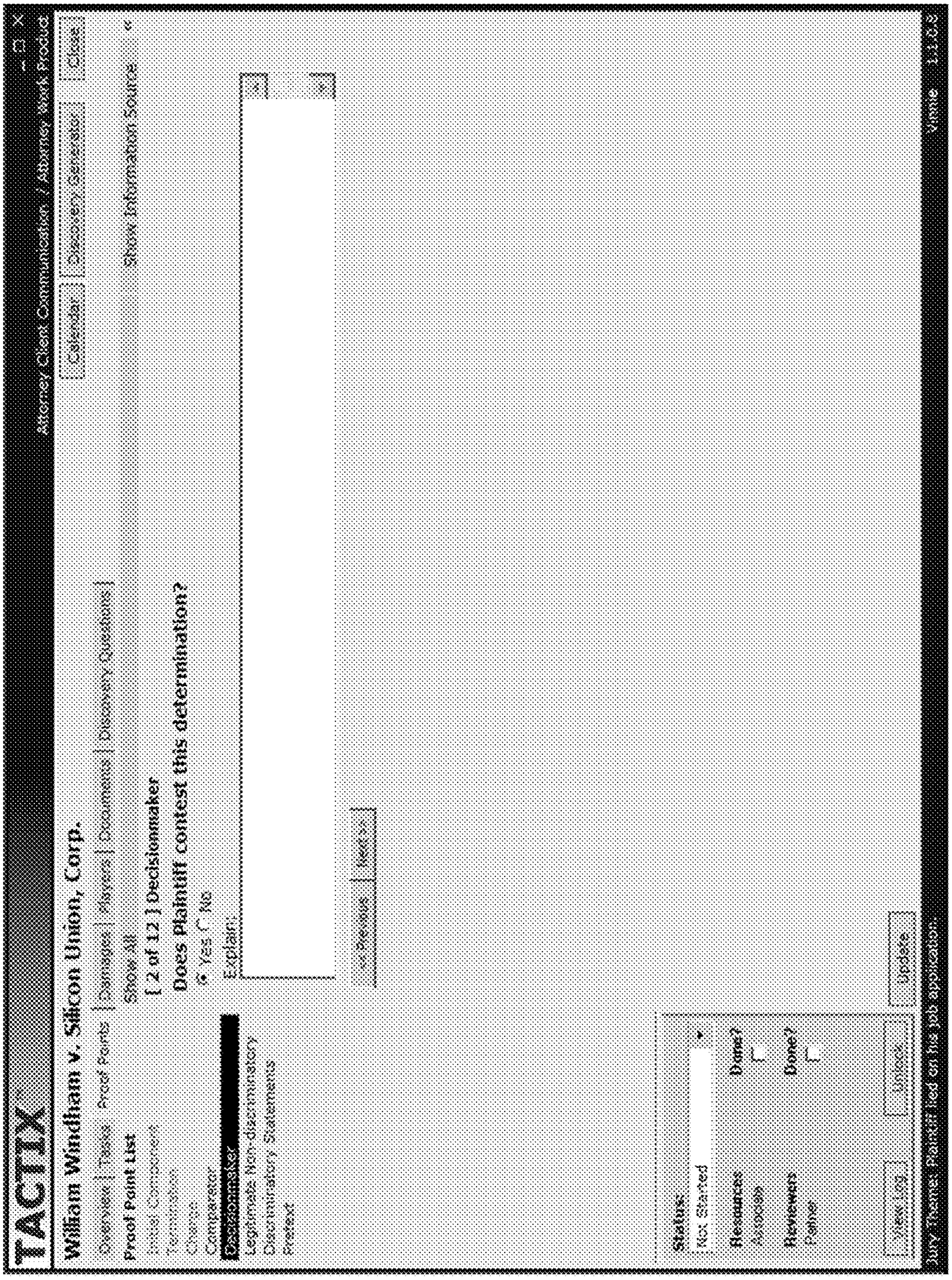
Figure 65:
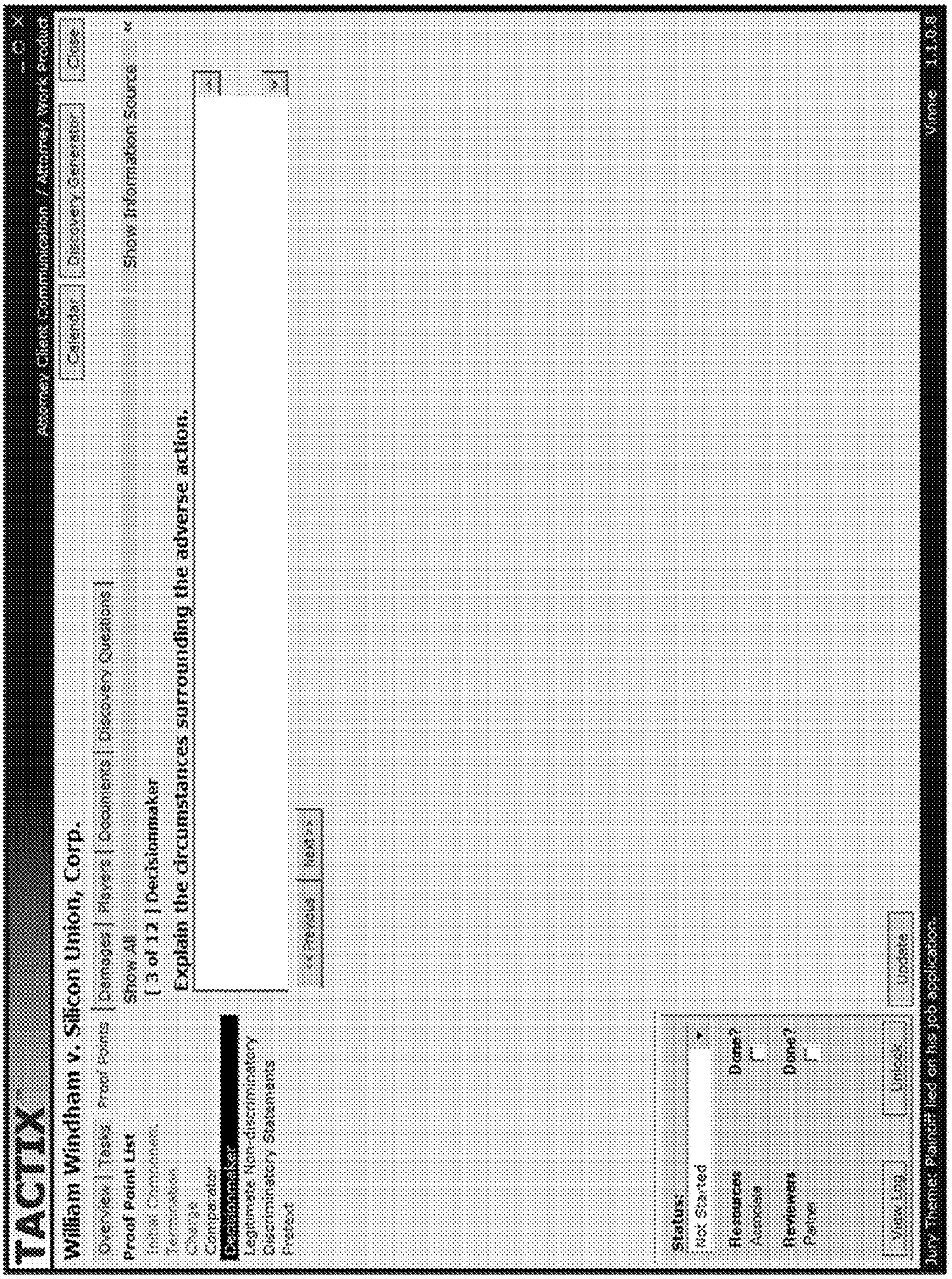
Figure 66:
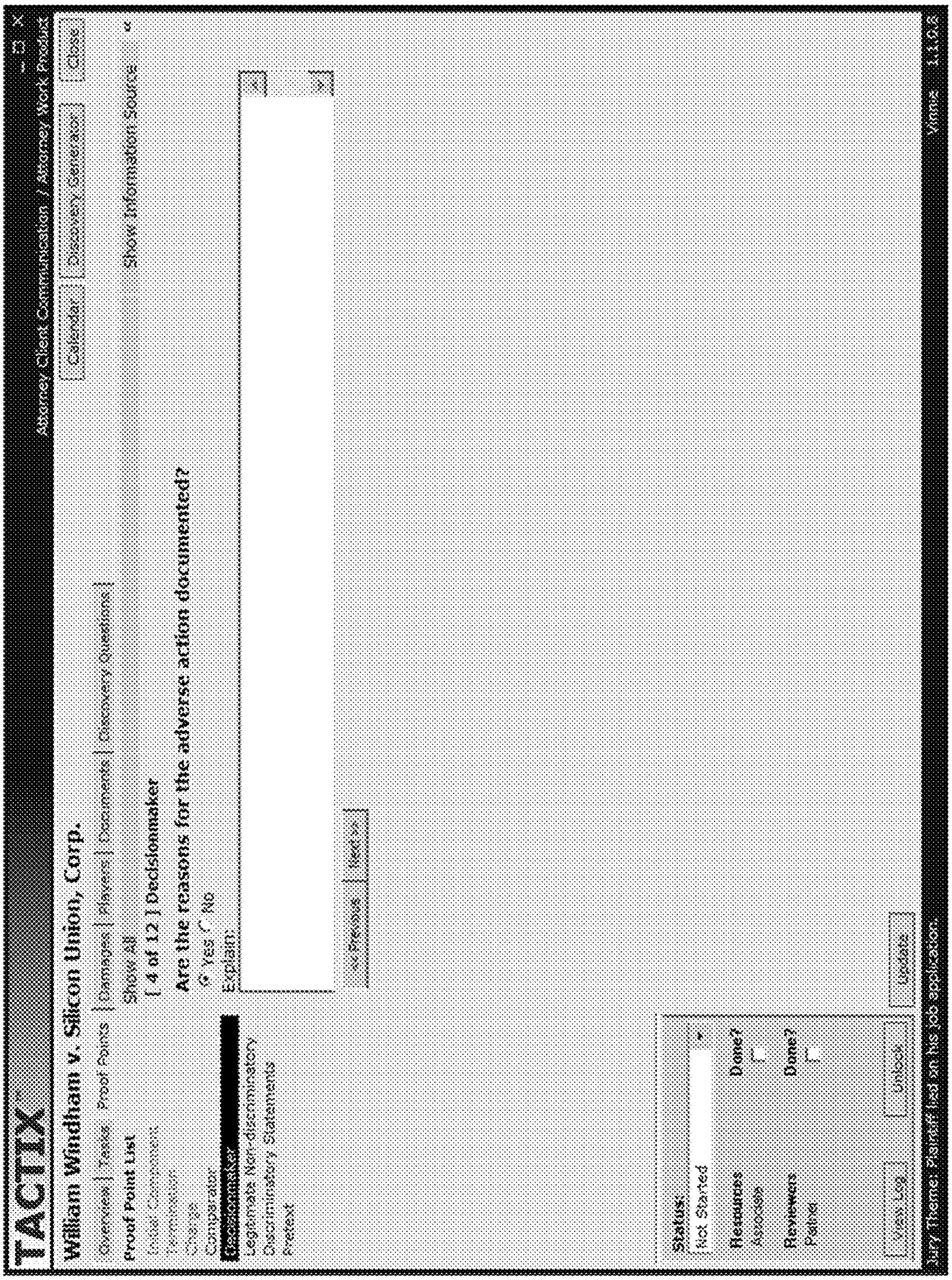
Figure 67:
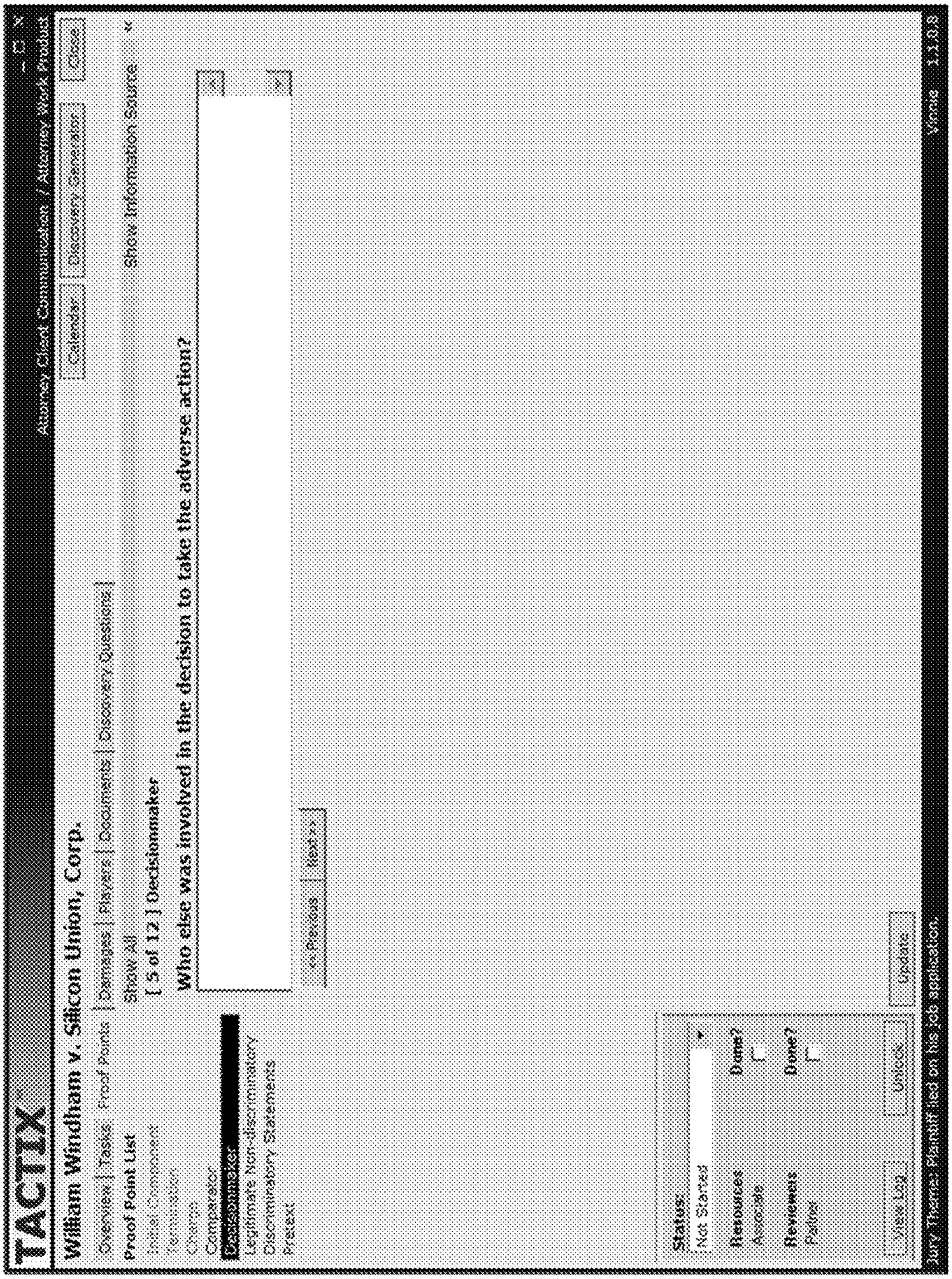
Figure 68:
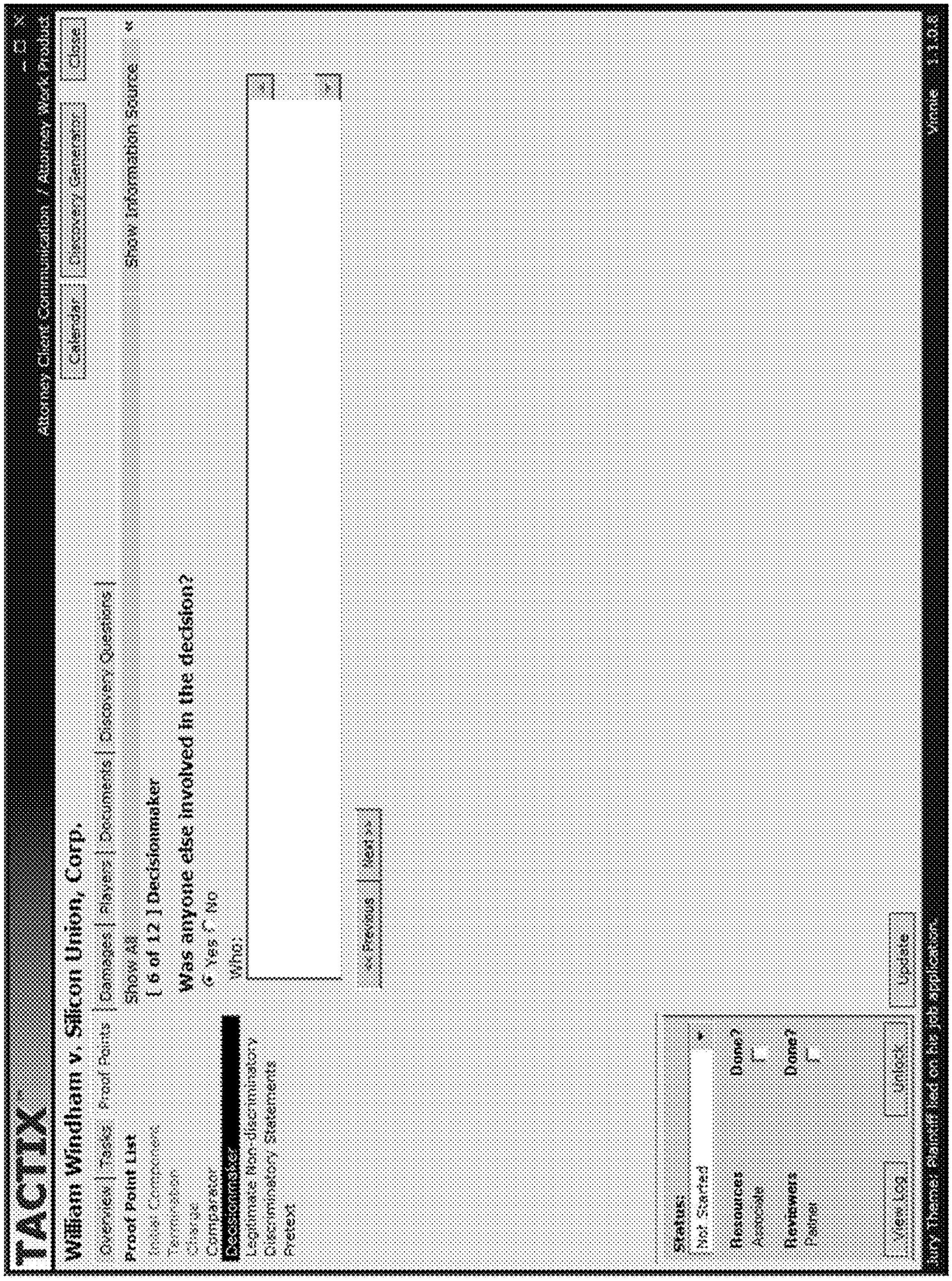
Figure 69:
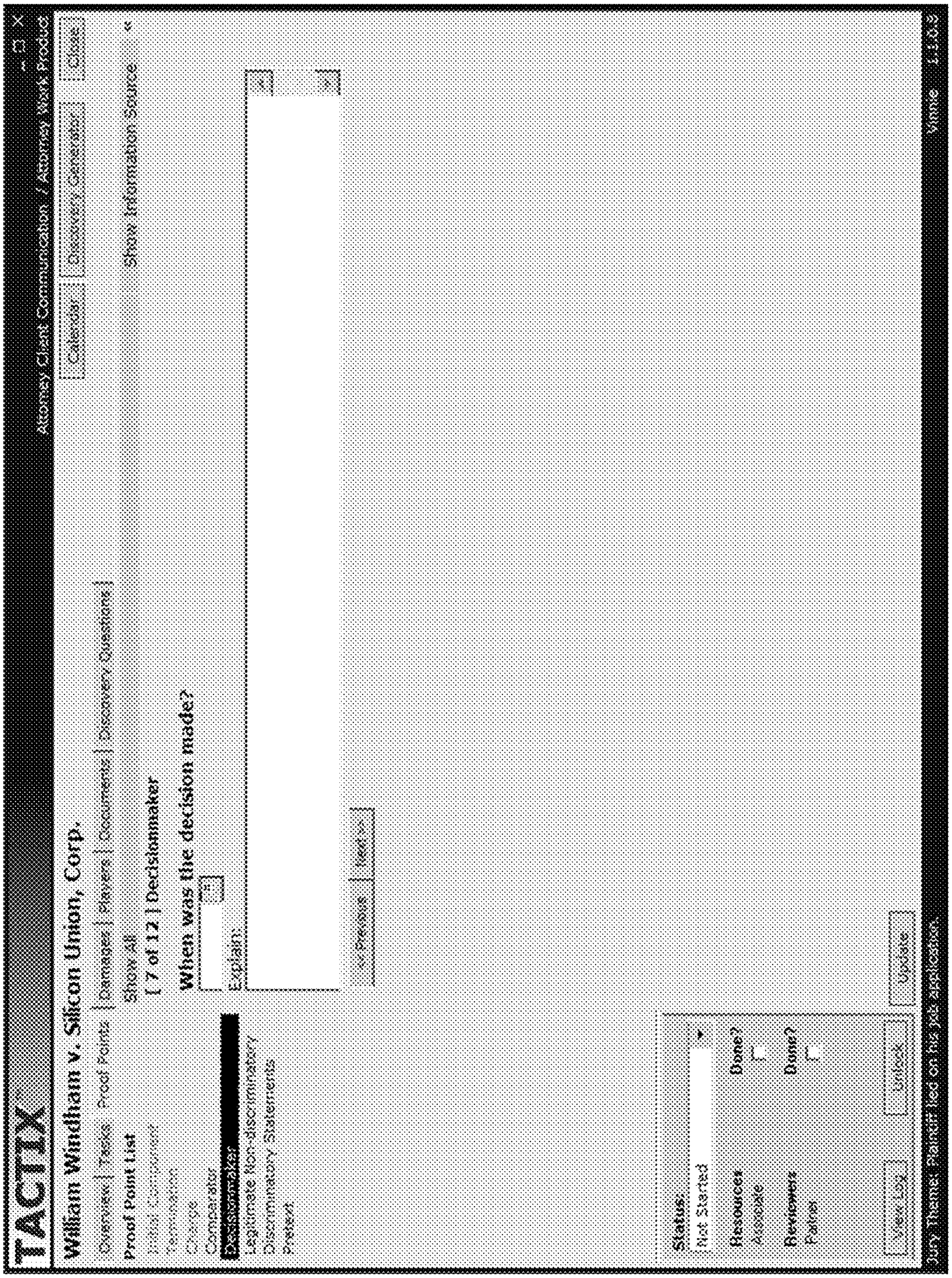
Figure 70:
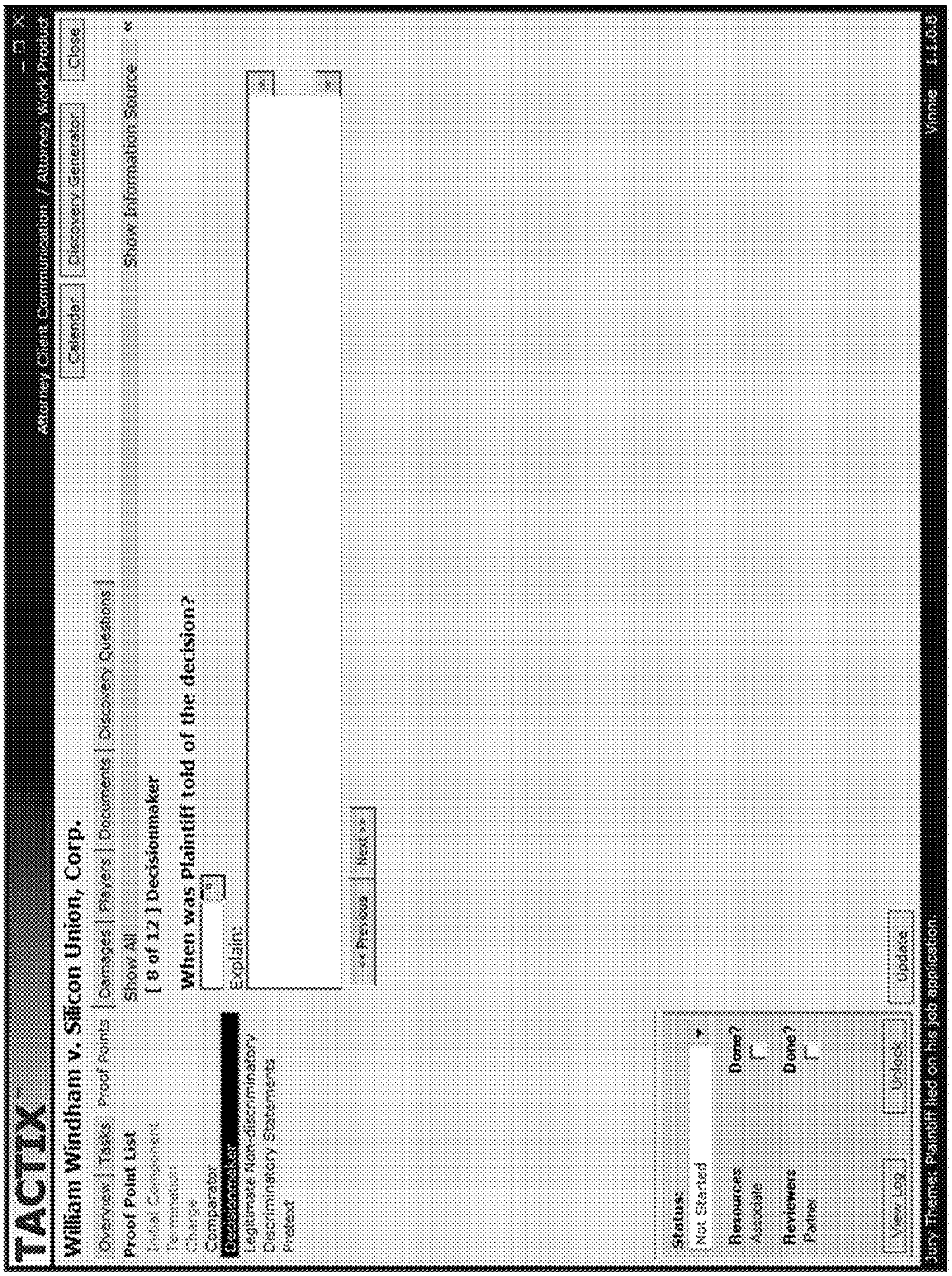
Figure 71:
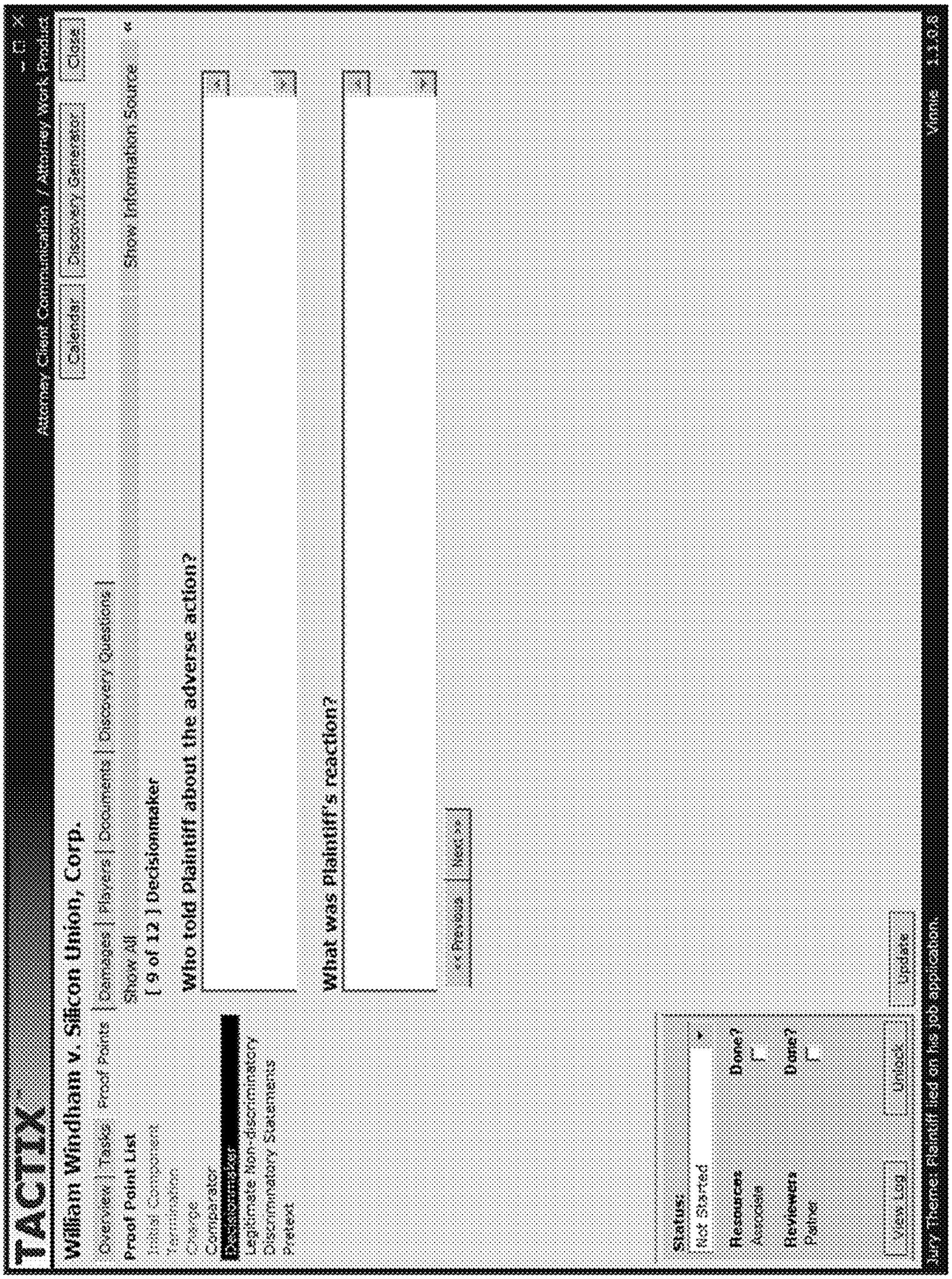
Figure 72:
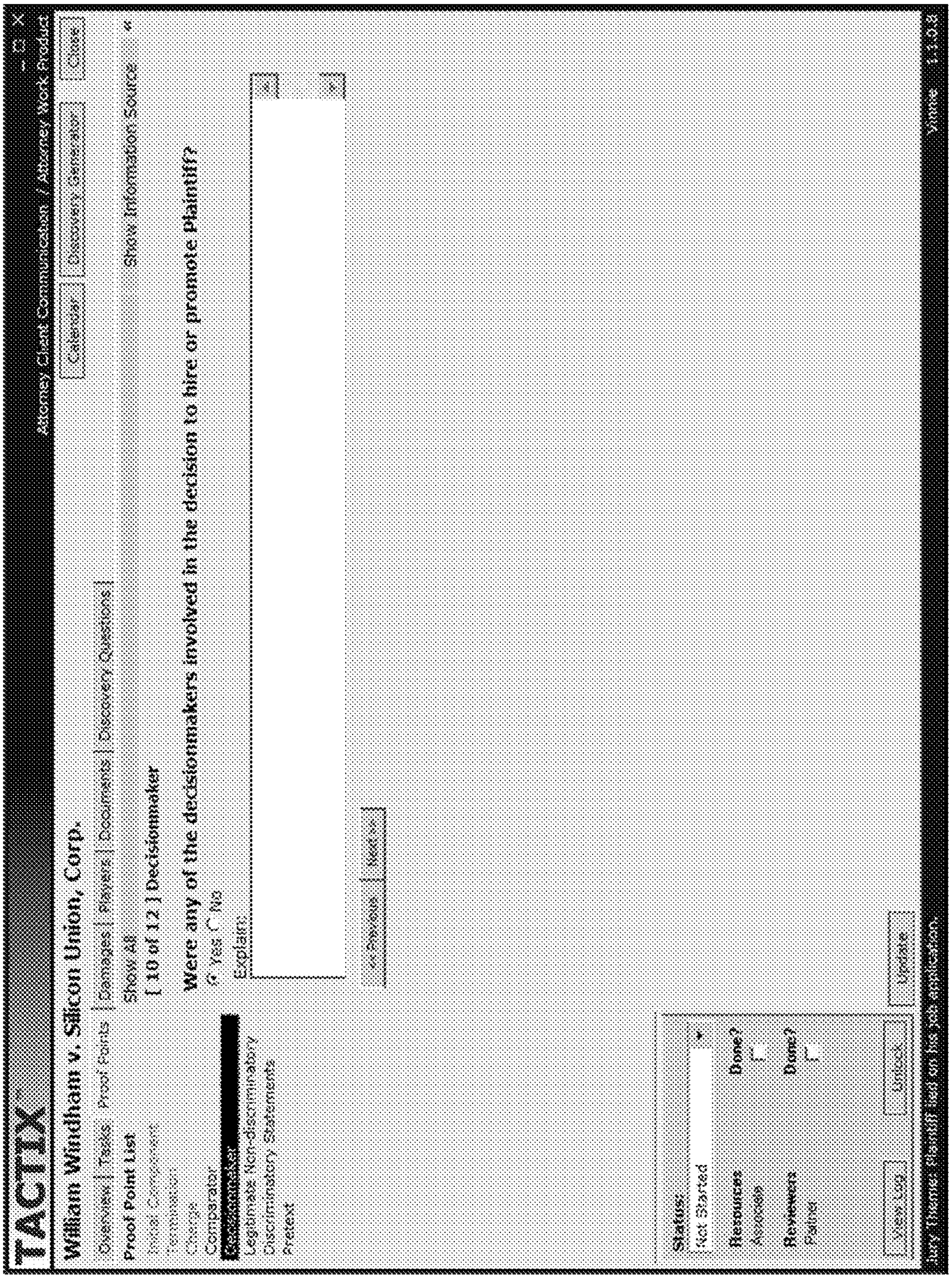
Figure 73:
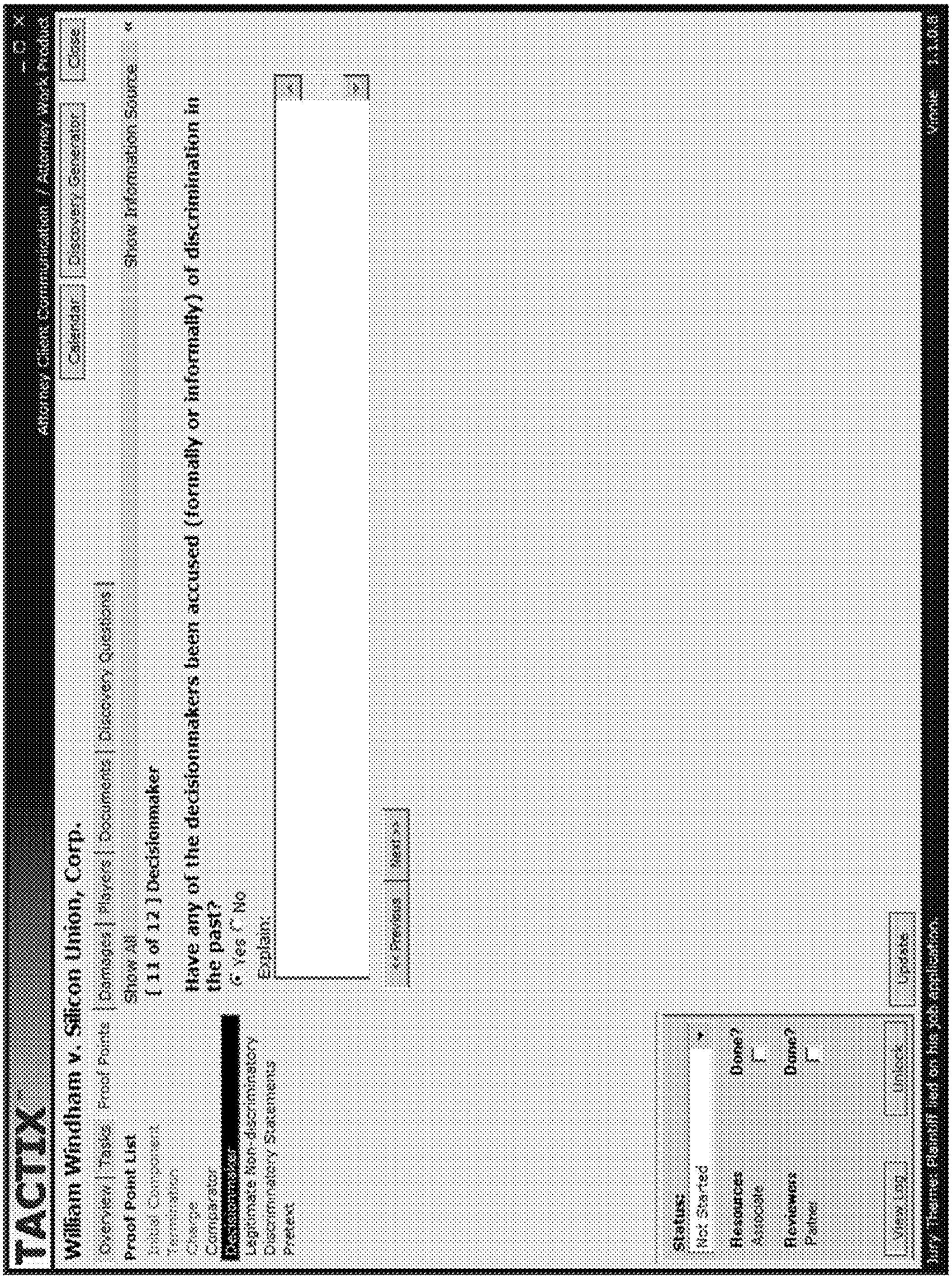
Figure 74:
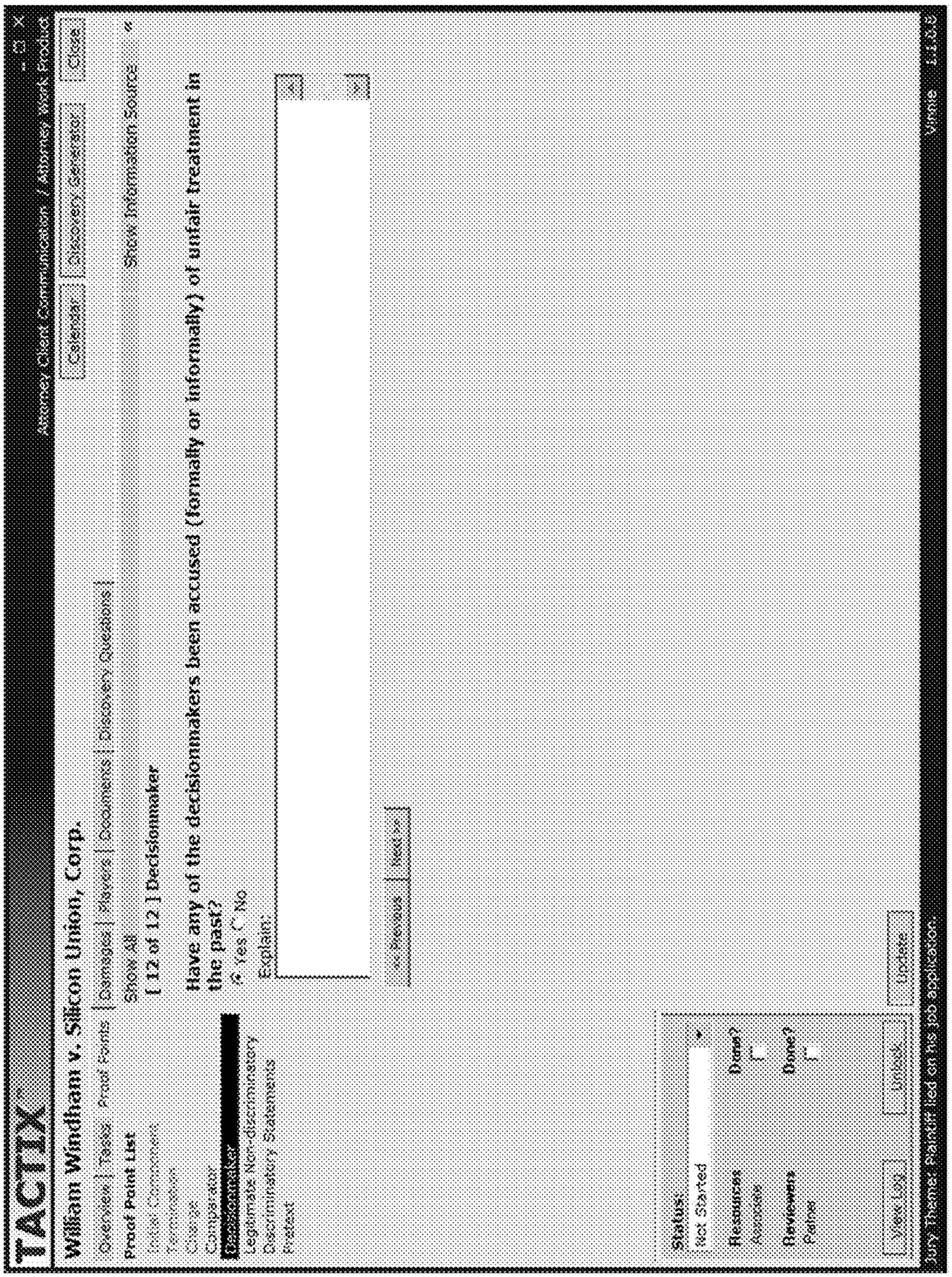

In addition to all the data gathered in the various tasks and recommendations made during the task phase, it is also necessary to do analysis based on the actual claim and evidence related to the claim. In the preferred embodiment this is done under a tab referred to as Proof Points shown starting at FIG. 32. The particular proof points in the exemplary embodiment are an initial component to determine the particular class of the case, termination information, information on prior discrimination charges, comparator information, information on the particular decision maker, any particular legitimate non-discriminatory reasons, any discriminatory statements which were made and the stated reason for determination. As shown in FIG. 32 the initial component is just a series of check boxes so that a particular set of weighting values can be used based on the actual claims in the case. Then proceeding to FIG. 38, shown are more detailed questions relating to the claim and the fundamental basis for the claim. This again provides for the categorization to be used in a weighting analysis.

FIGS. 39 to 48 are a series of questions to determine information related to the particular termination. For example, these include position (FIG. 39), job duties (FIG. 40), qualifications (FIG. 41) and so on. The particular answers to these questions are used in the weighting analysis based on the actual particular claim made in the case.

FIGS. 49 to 55 are a series of screen shots for data entry related to prior charges of discrimination by the plaintiff. These screens gather a series of data about the actual charge of discrimination which has been alleged. In general this is information that would have been filed with a particular state or federal agency as precursors to an actual lawsuit. This information is also used in the weighting analysis.

FIGS. 56 to 62 are a series of screen shots of an exemplary embodiment to obtain comparator information. Generally a comparator is an equivalent party which can be used to compare any discrimination allegations and results. Particular screens gather information about the particular comparators relative to the actual plaintiff. Again the various data is collected and appropriately used in a weighting analysis that determines case assessments.

FIGS. 63 to 74 are a series of screen shots gathering information about the decision to terminate and the decision maker in the termination. The user enters values or data into a particular block related to the particular questions. This data is both used in the analysis and to memorialize the actual information to help systemize the information gathering process.

Figure 75:
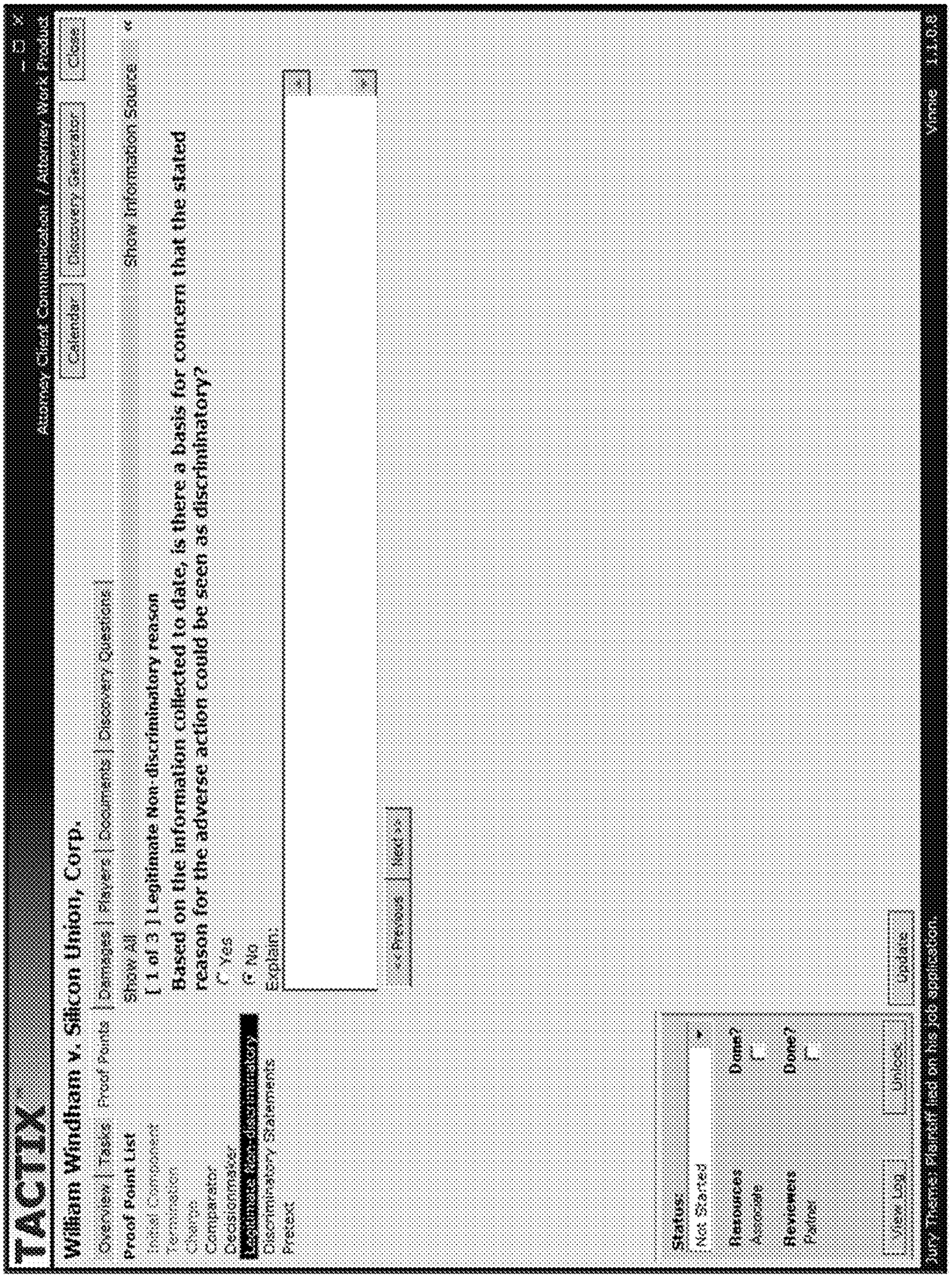
Figure 76:
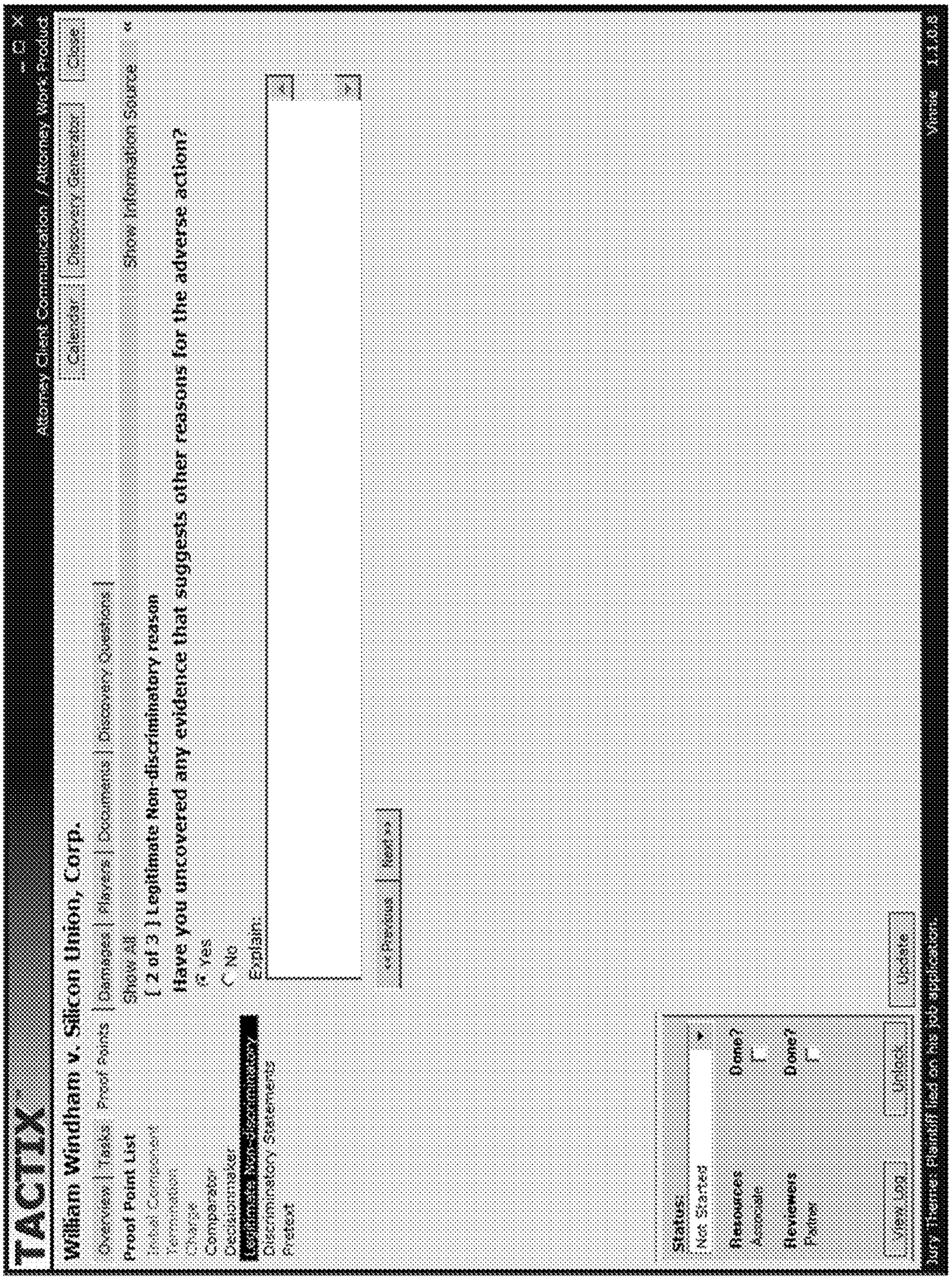
Figure 77:
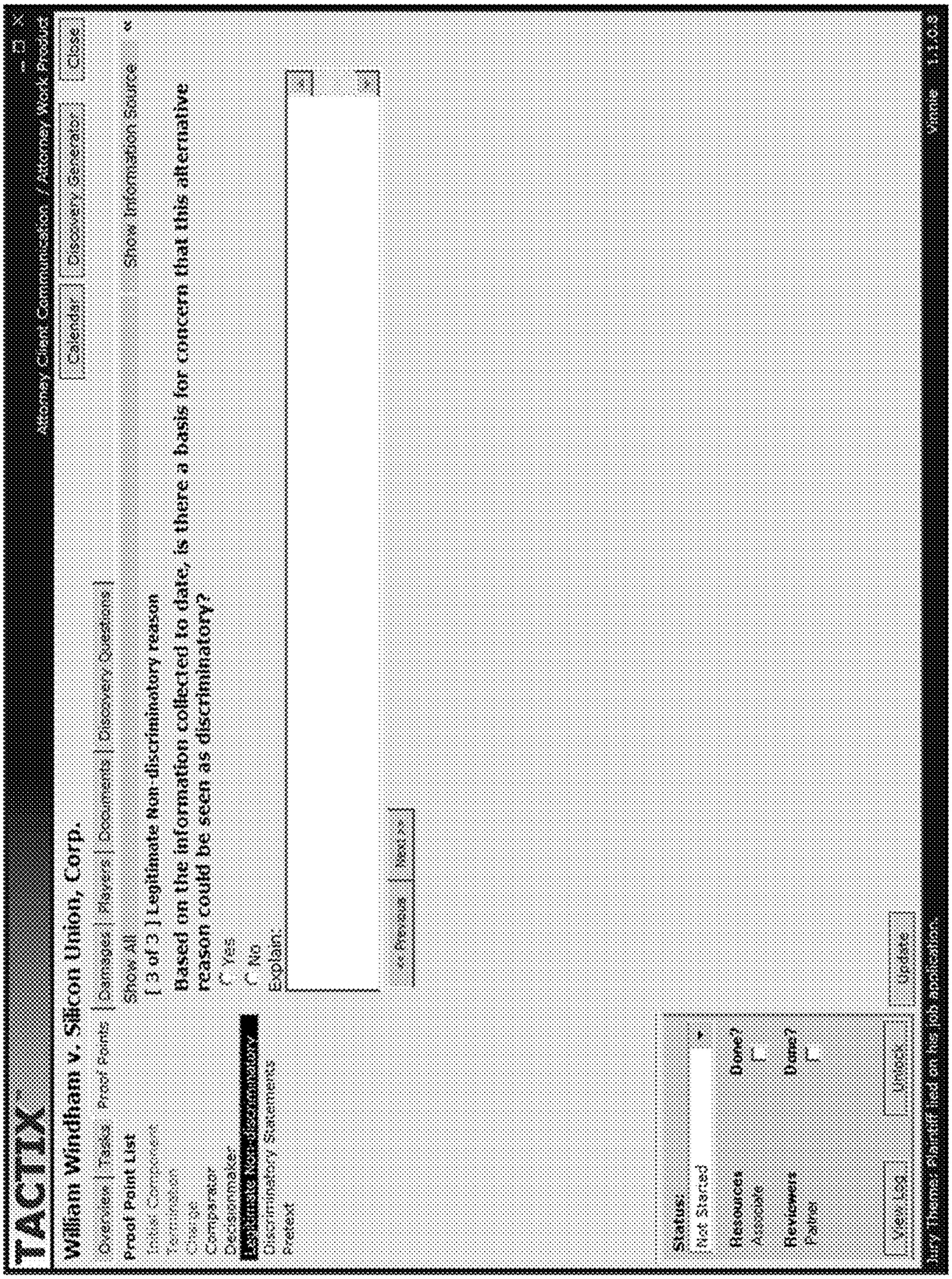

Similarly, FIGS. 75-77 show screen shots to gather information relating to a particular legitimate non-discriminatory reasons for termination. Again, the information is used in a weighting if appropriate and has a place to systematically gather and store the information.

Figure 78:
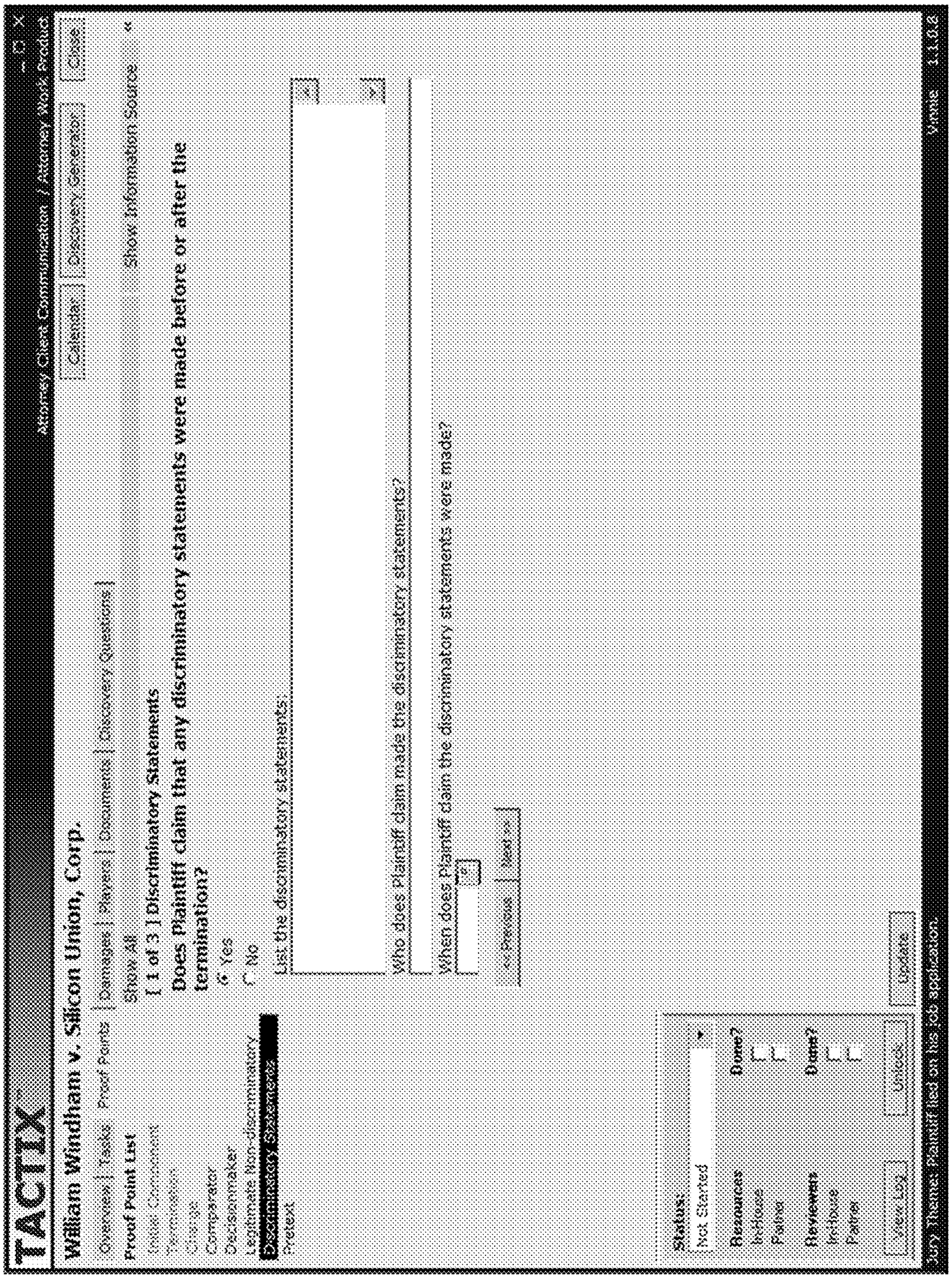
Figure 79:
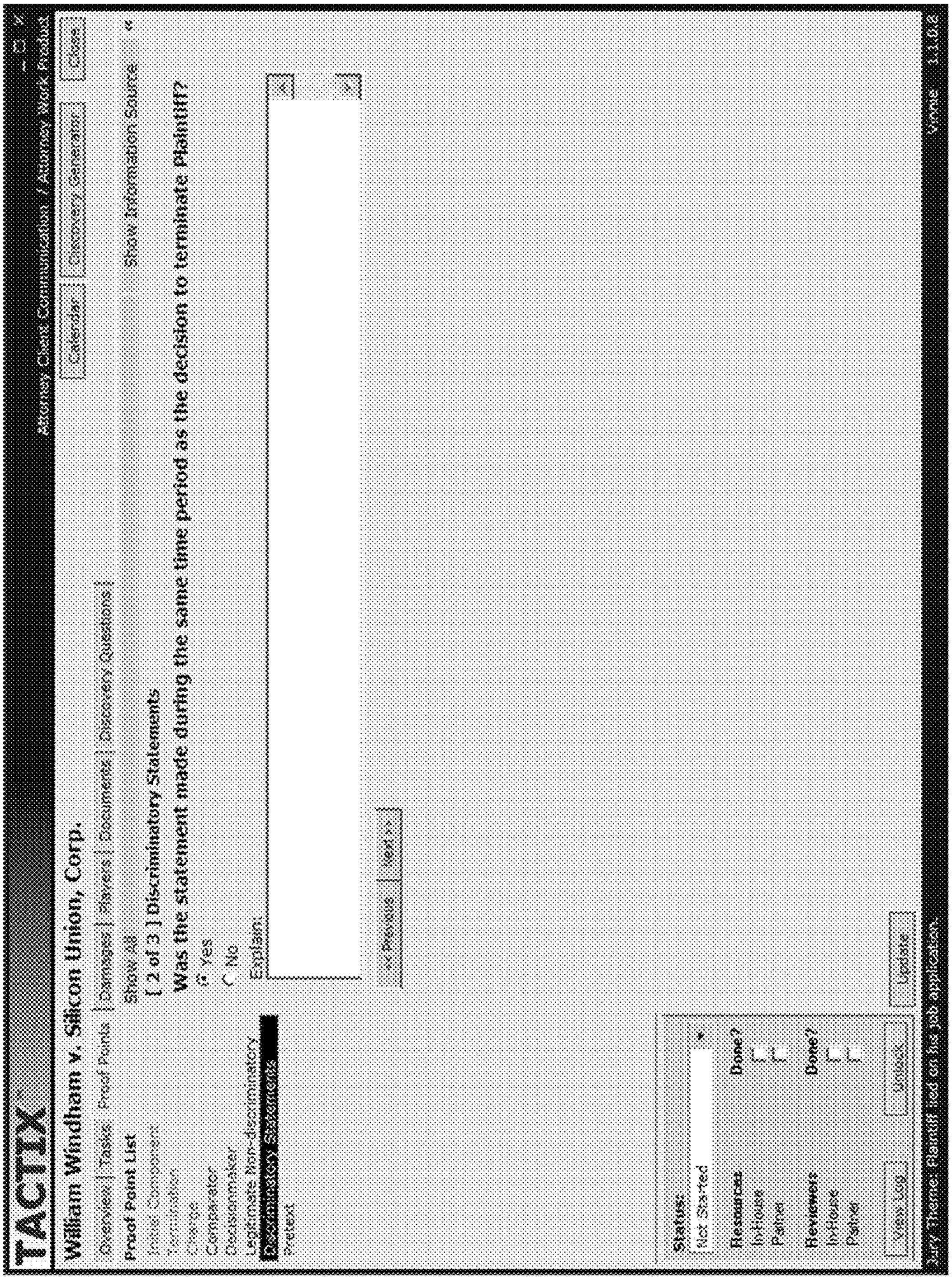
Figure 80:
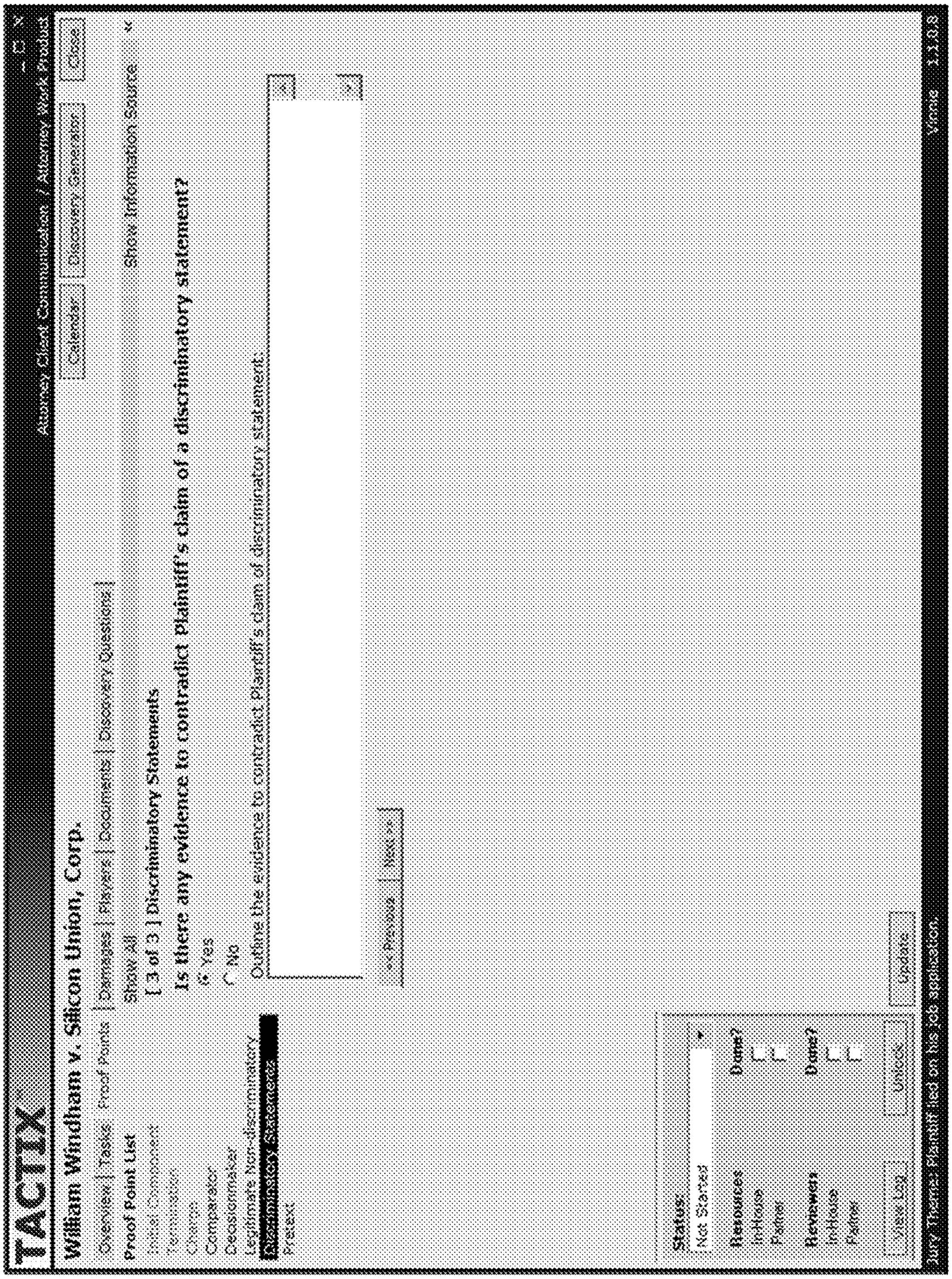

FIGS. 78 to 80 are screen shots of a series of questions that are asked to help determine if there are any discriminatory statements and to document those particular statements.

Figure 81:
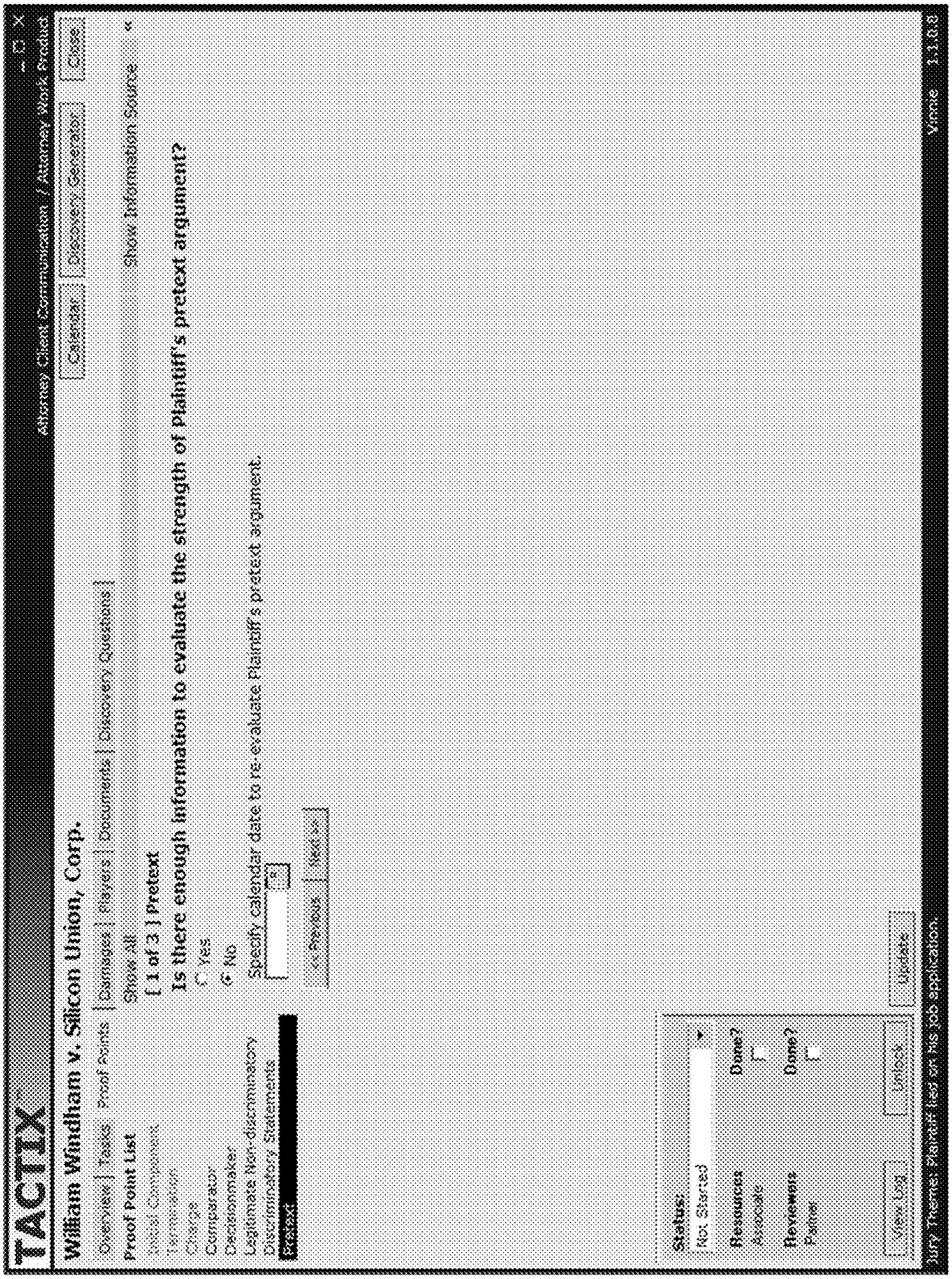
Figure 82:
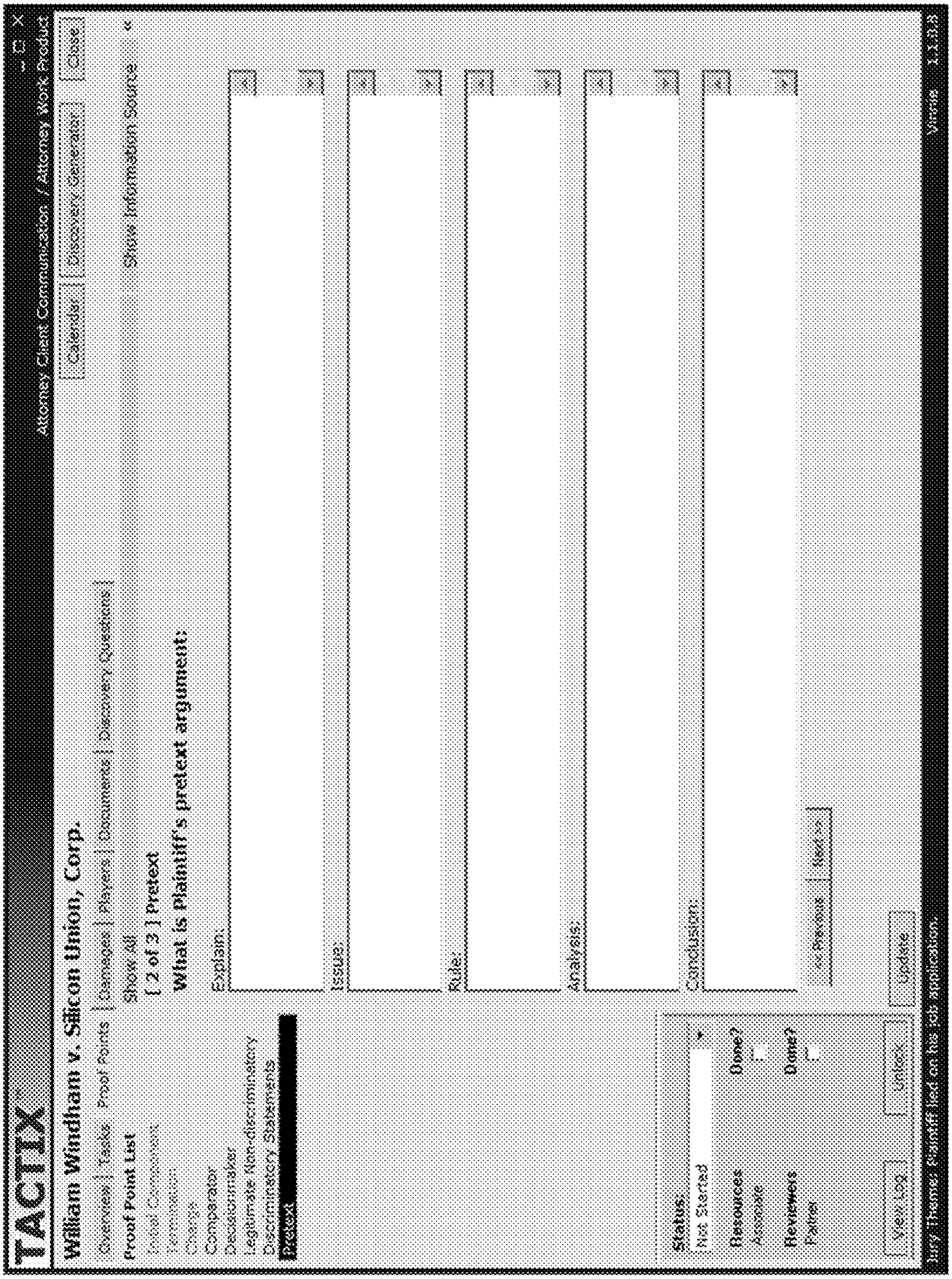
Figure 83:
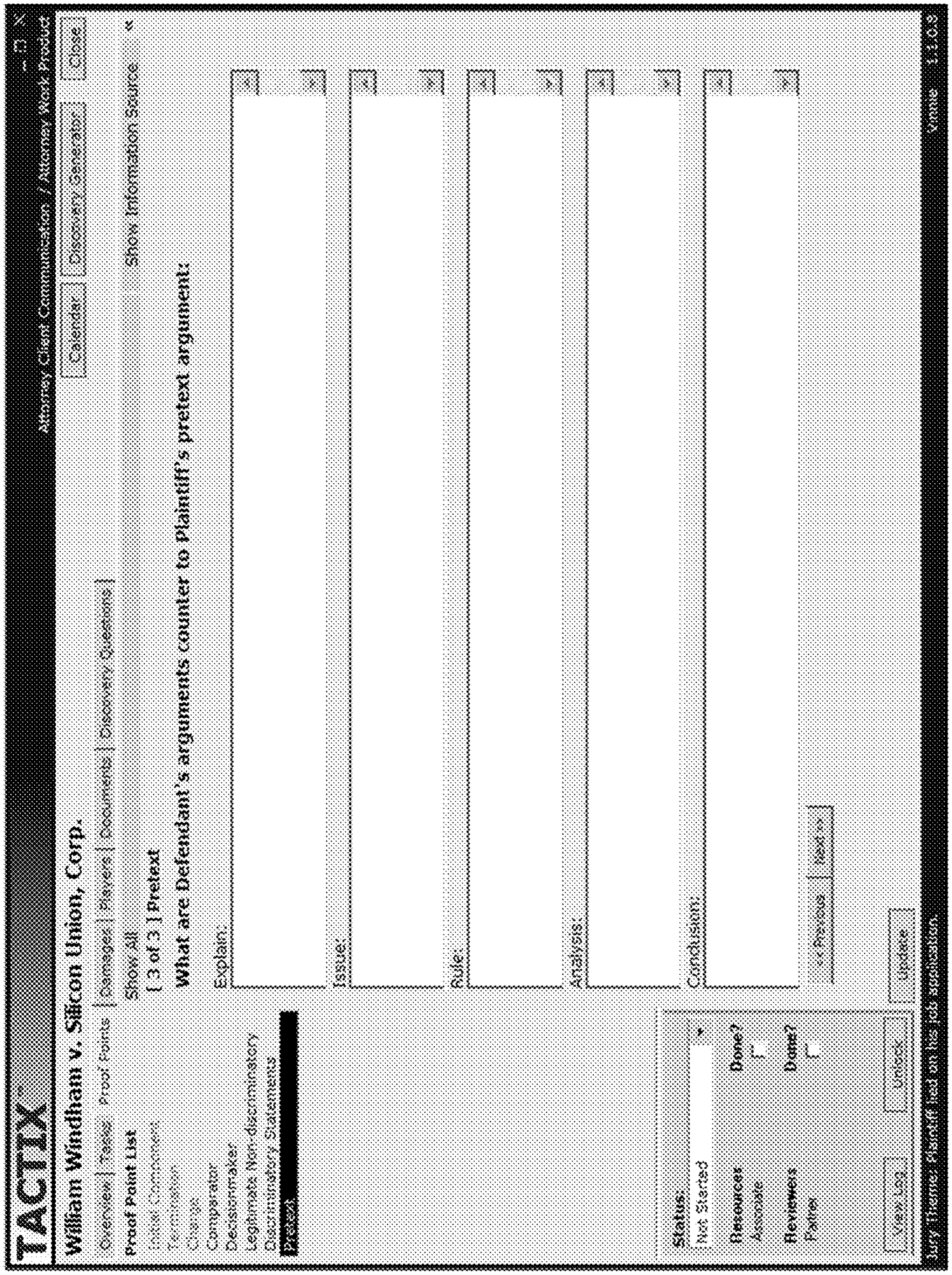
Figure 84:
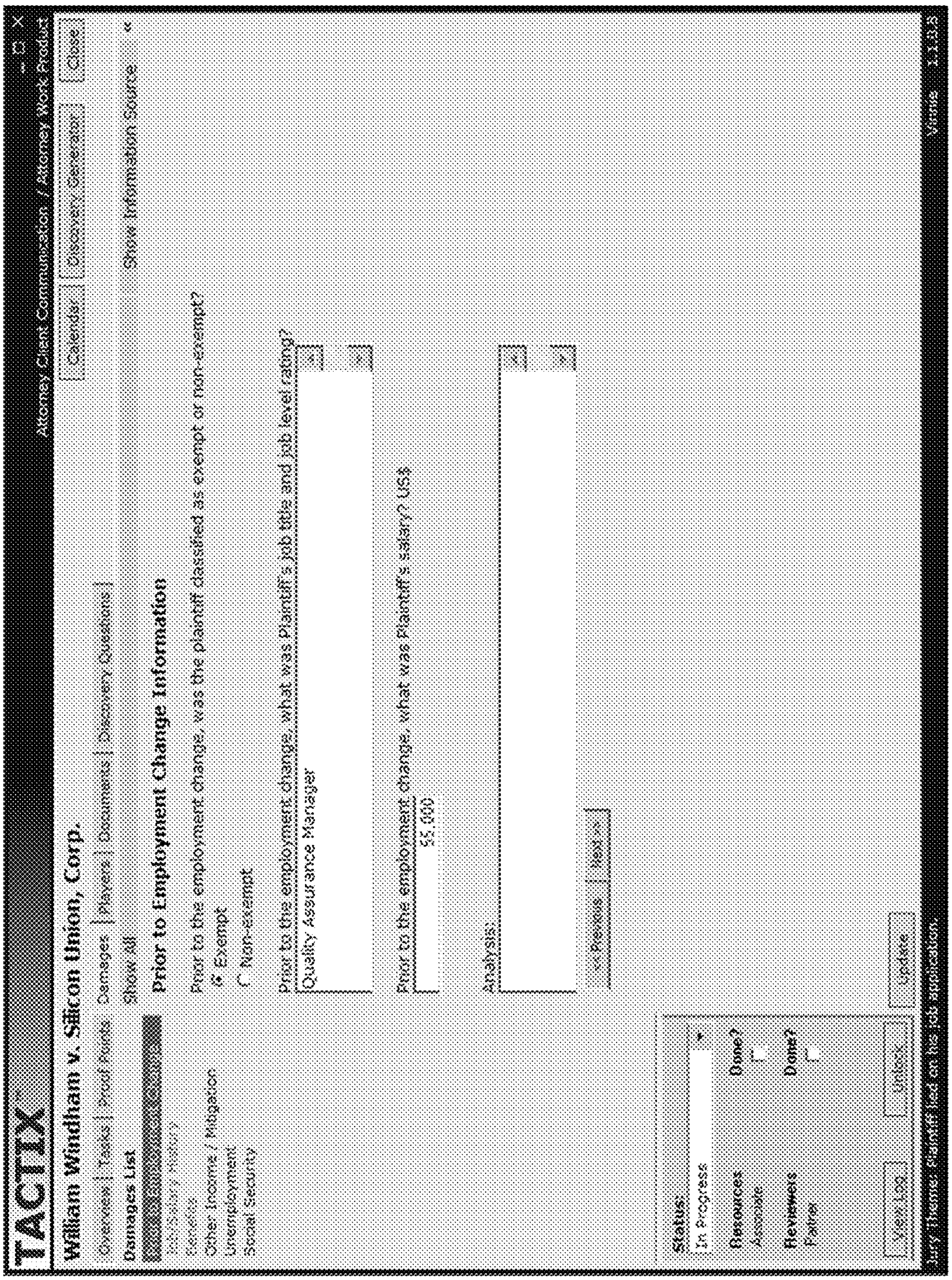
FIGS. 84 to 95 show example screen interfaces for gathering damage related information.
Figure 85:
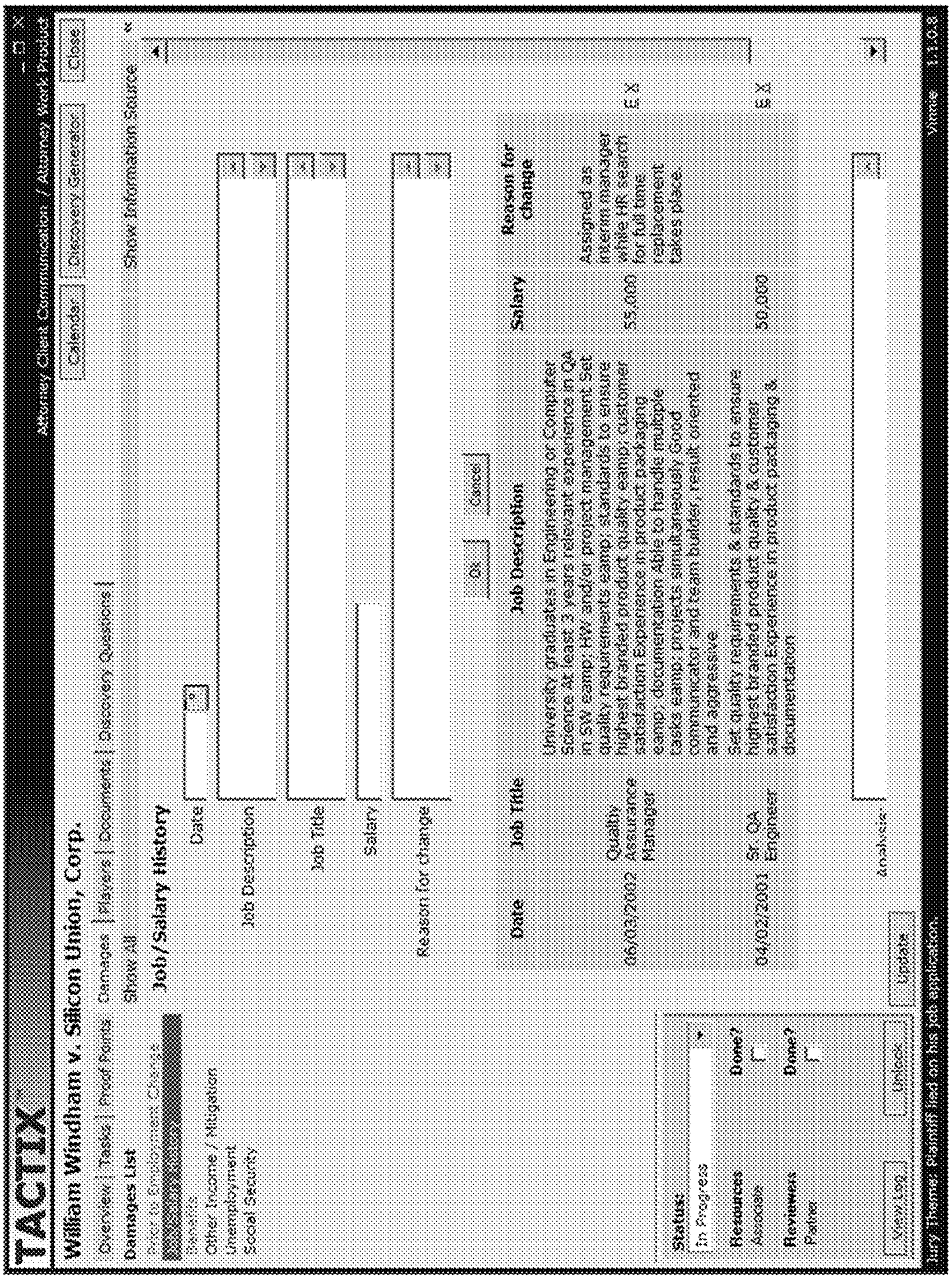
Figure 86:
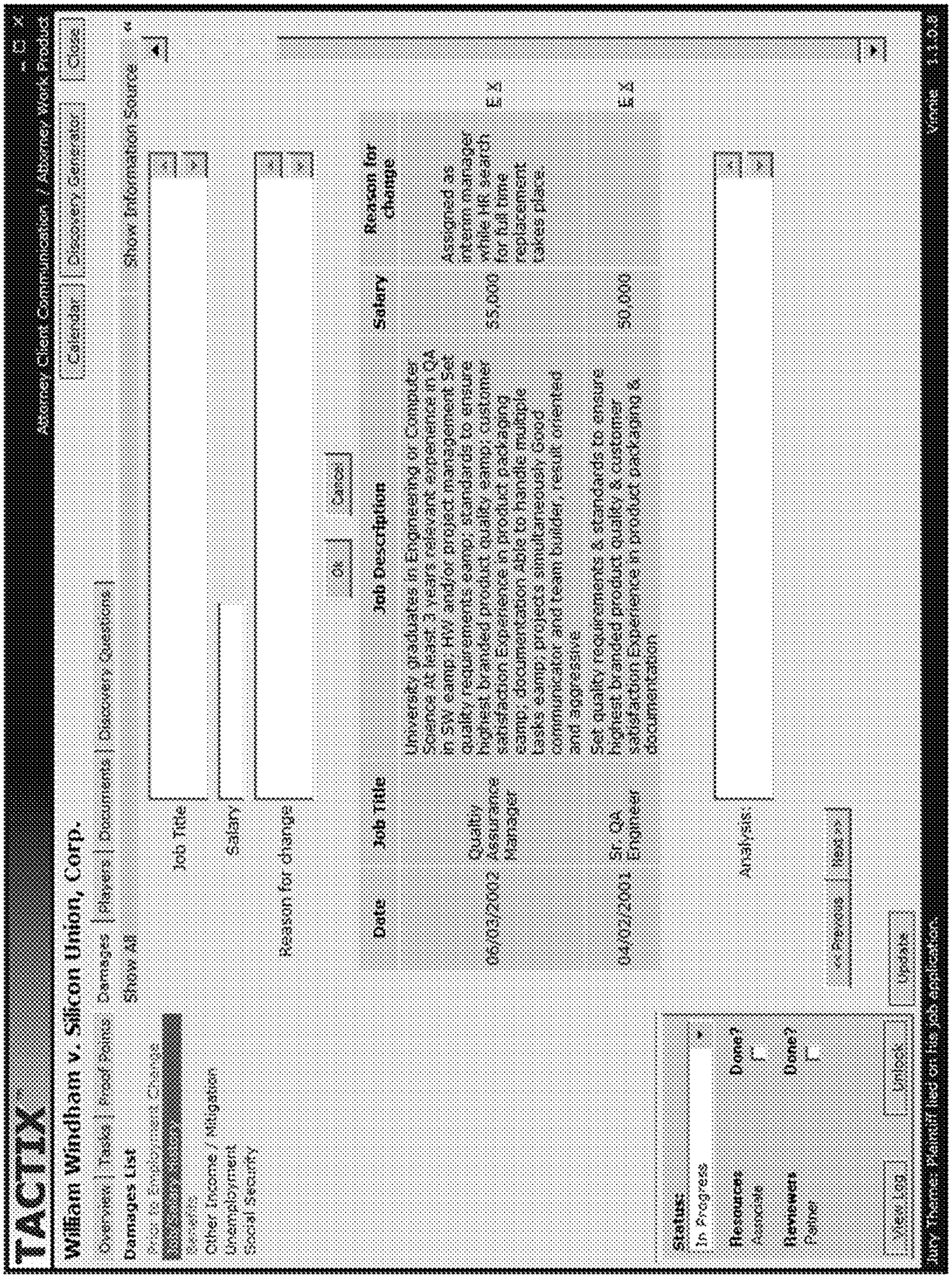
Figure 87:
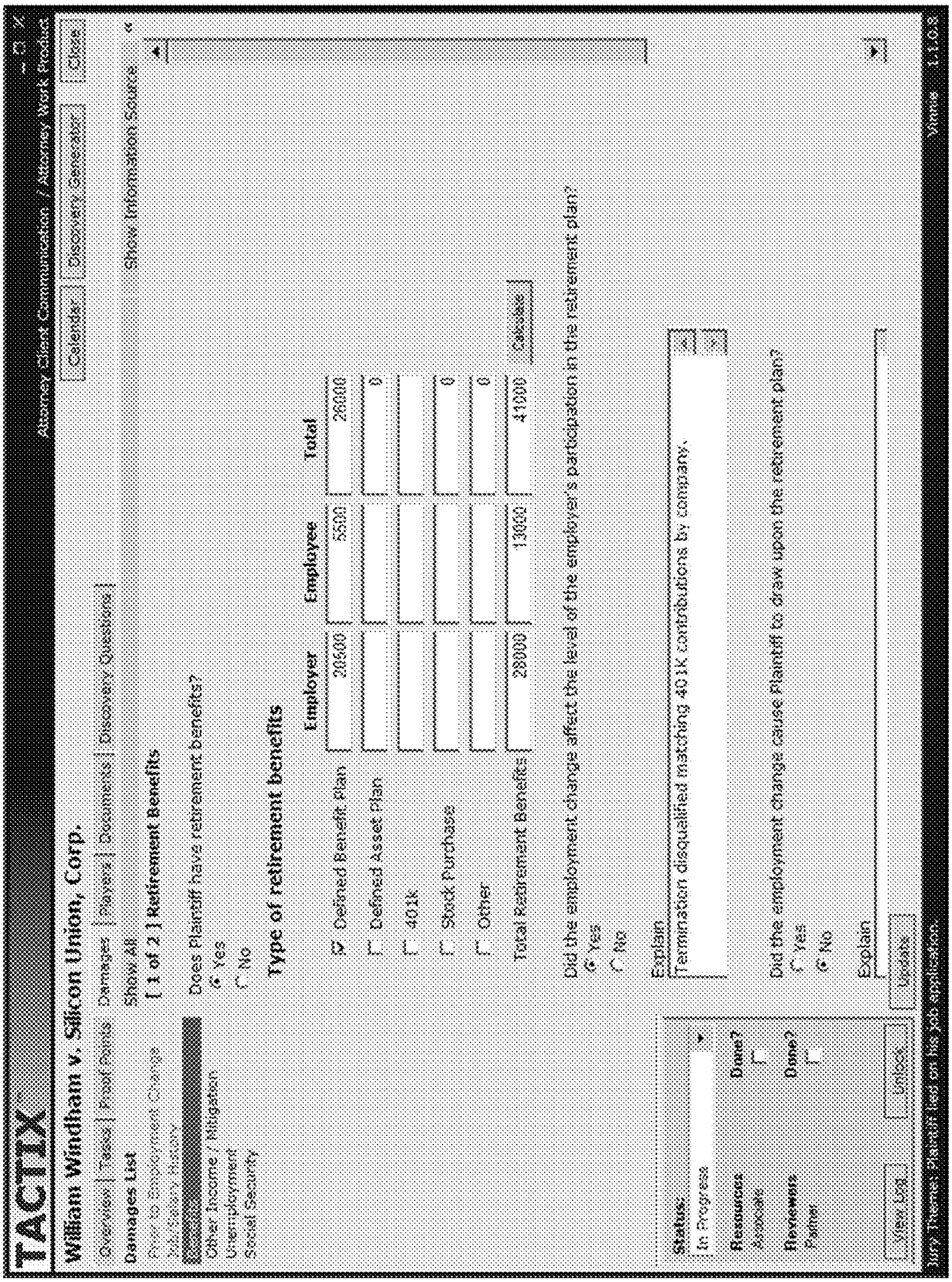
Figure 88:
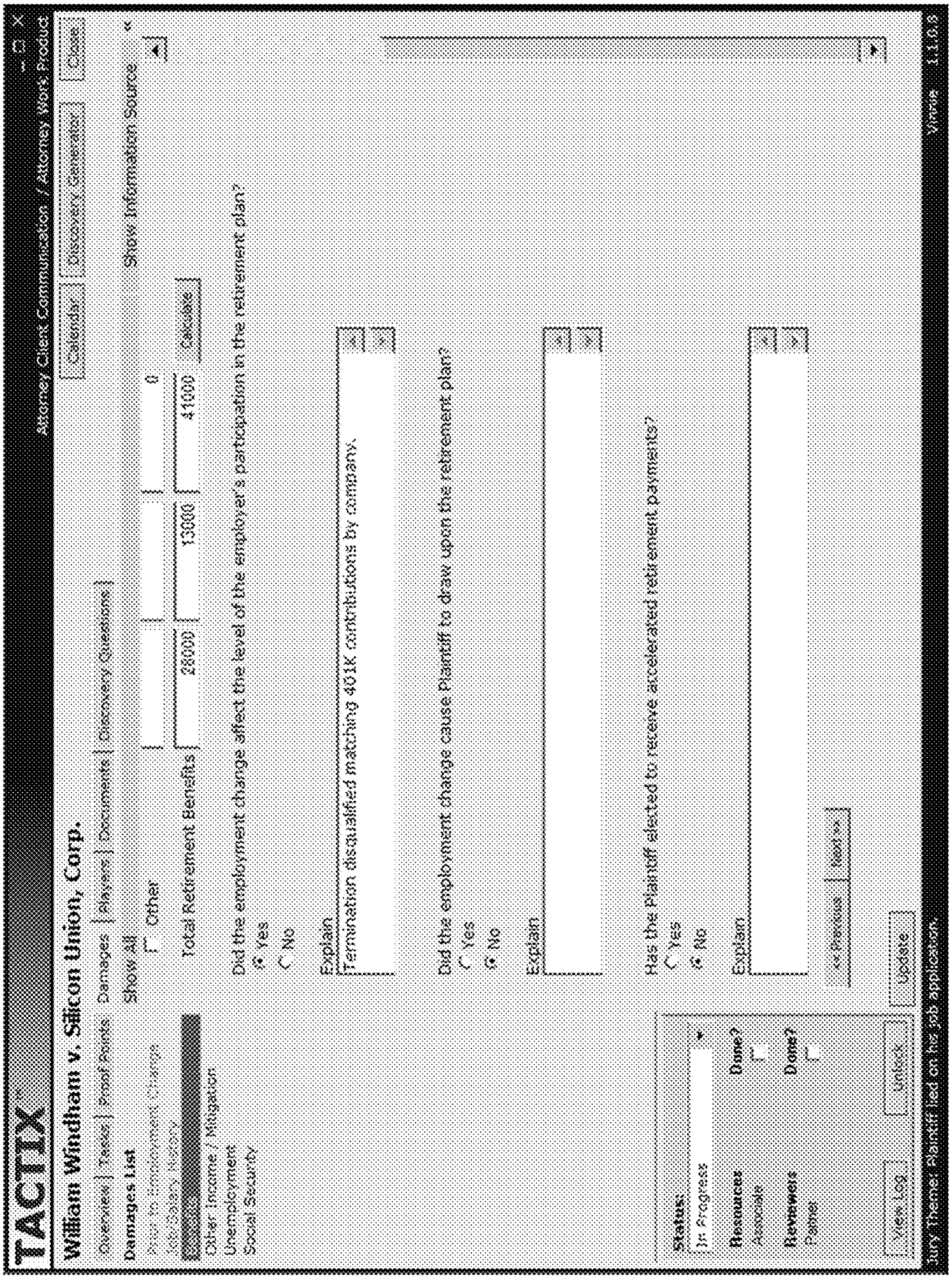
Figure 89:
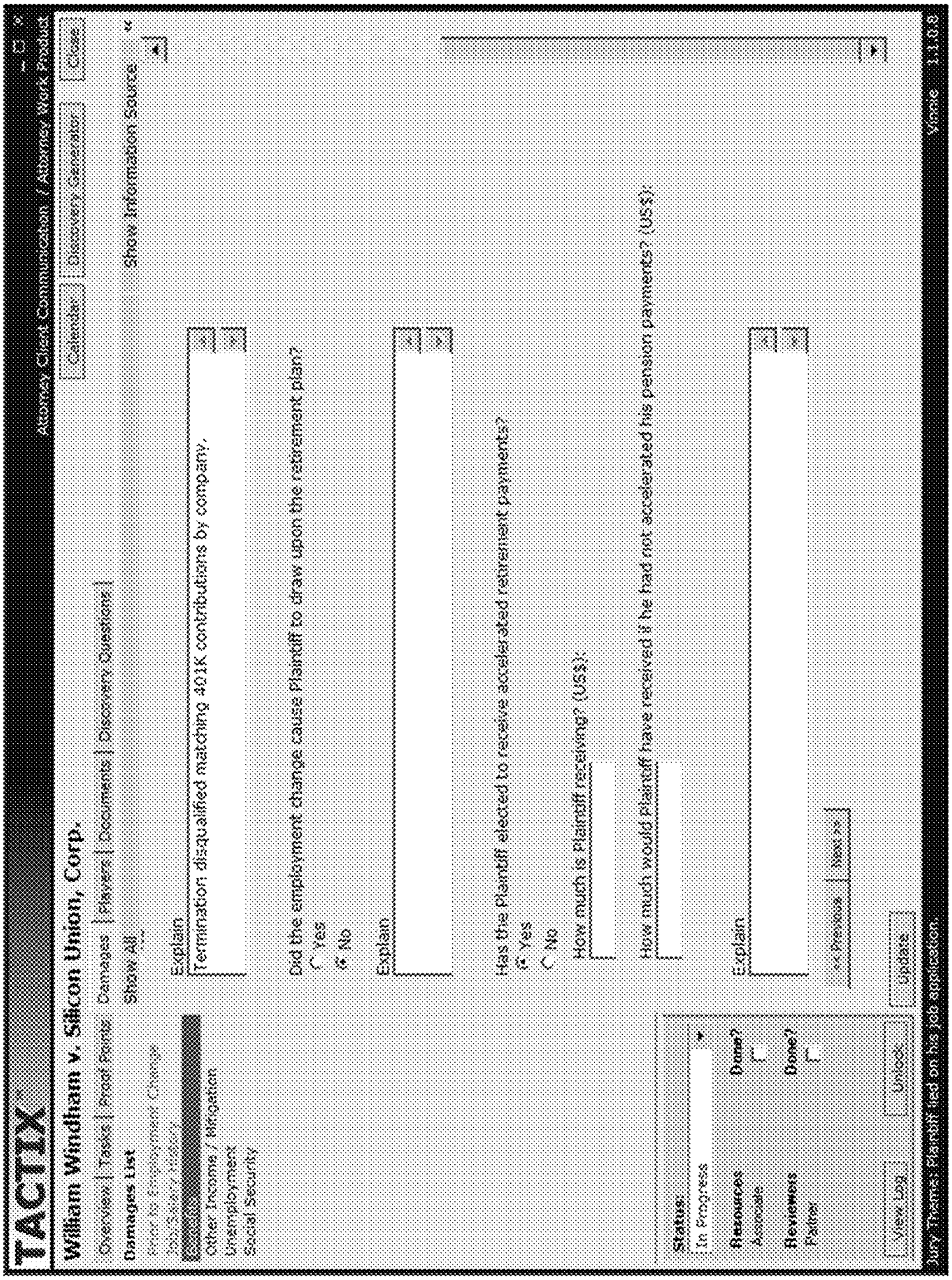
Figure 90:
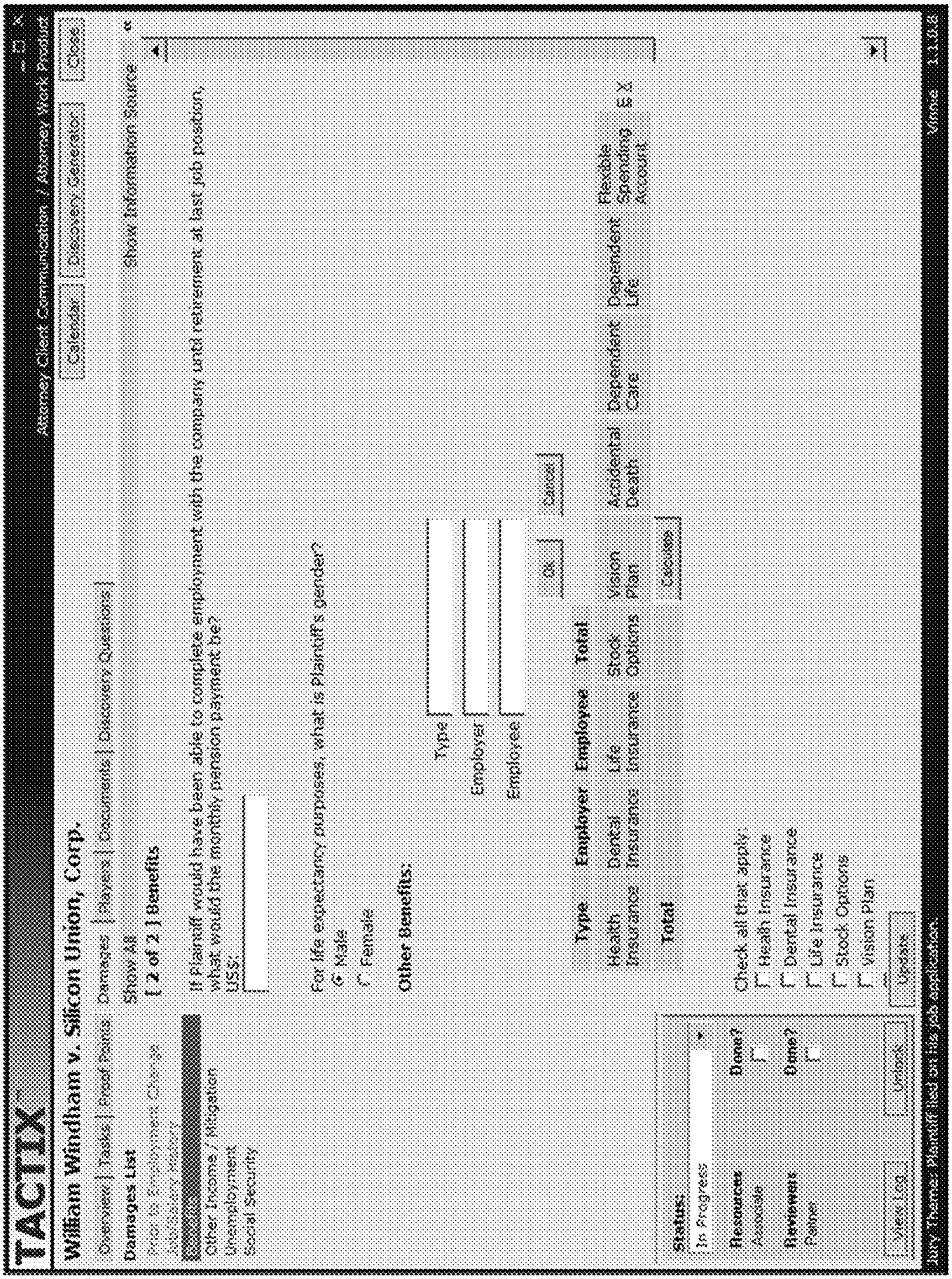
Figure 91:
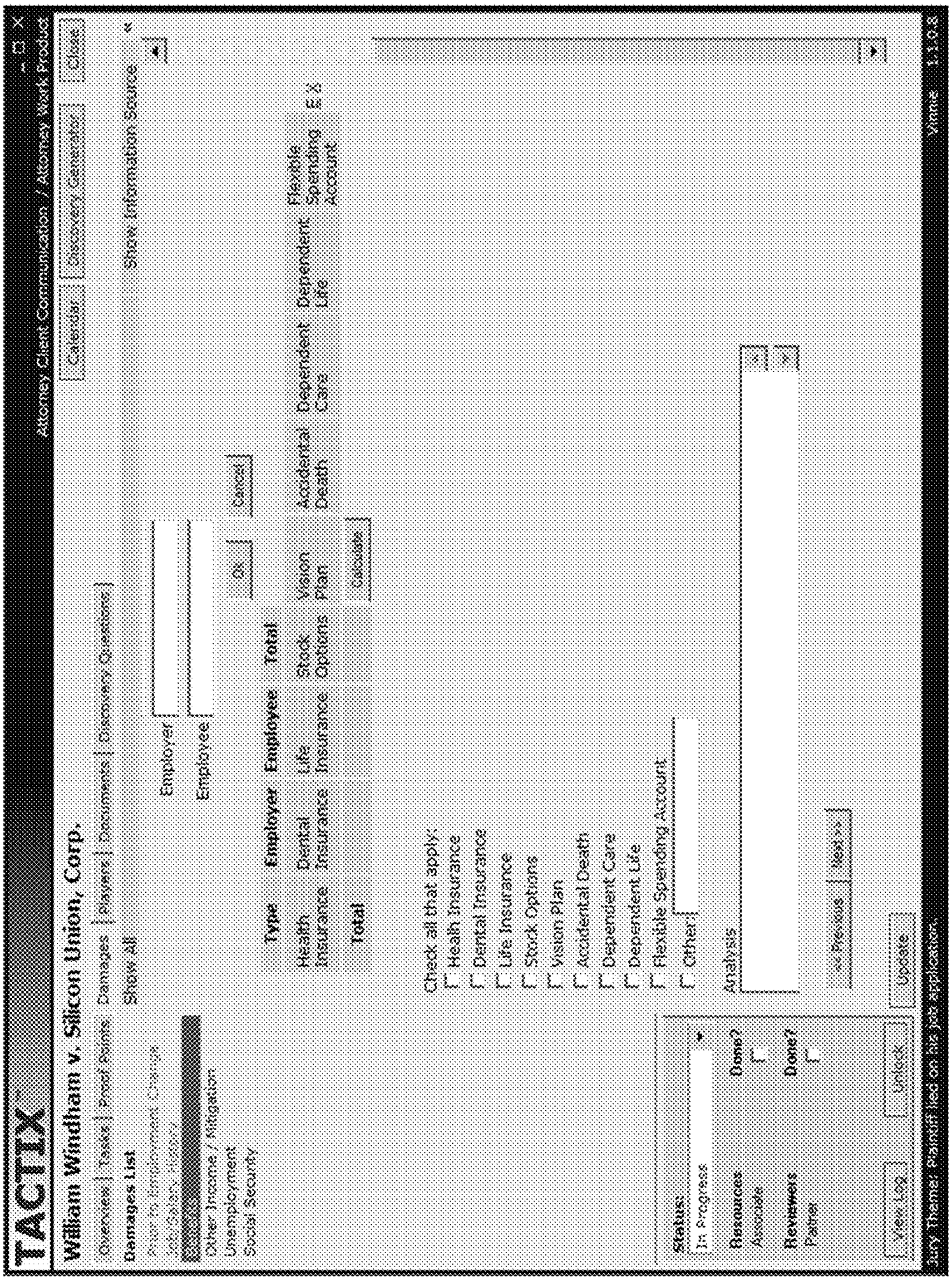
Figure 92:
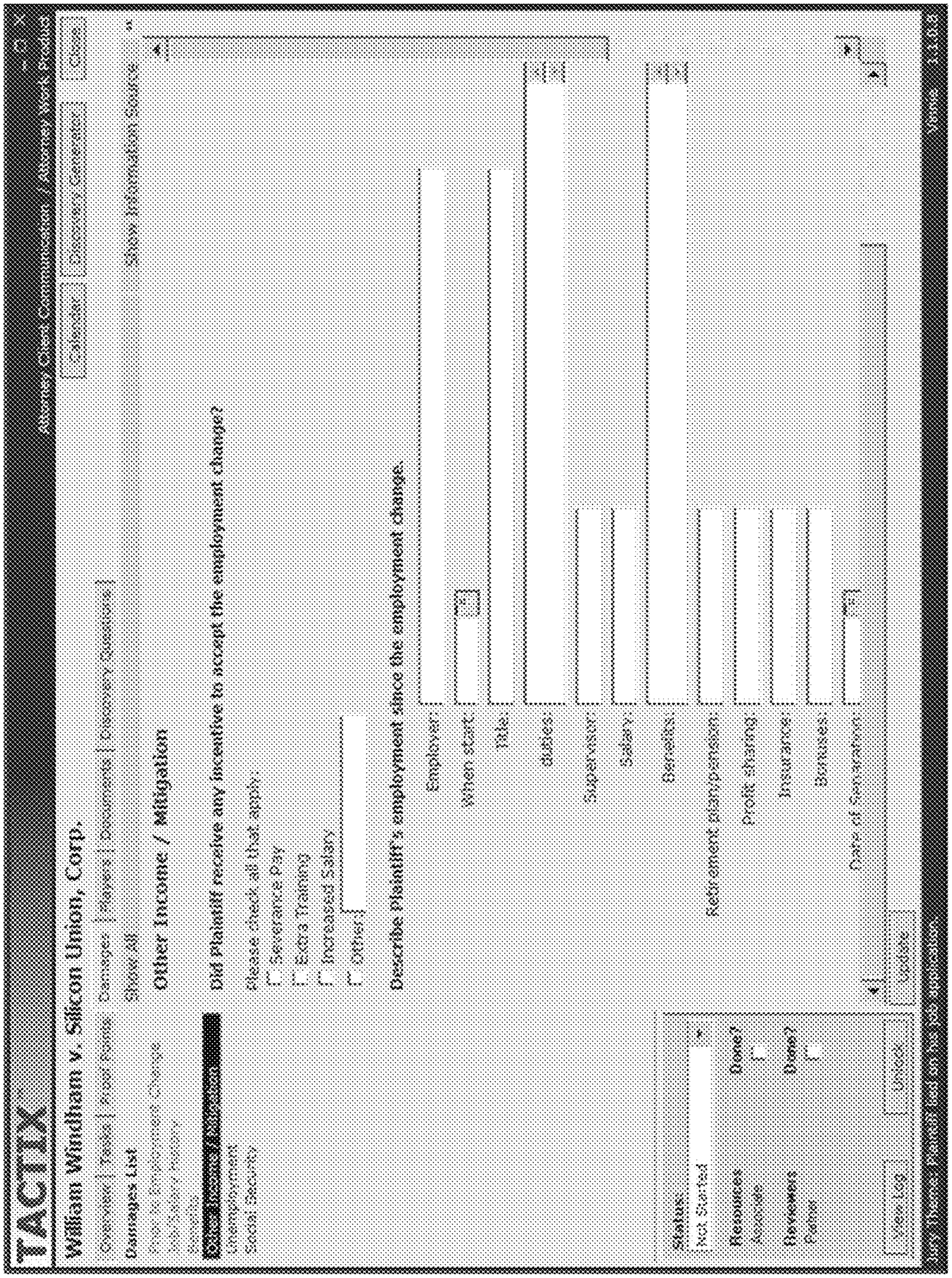
Figure 93:
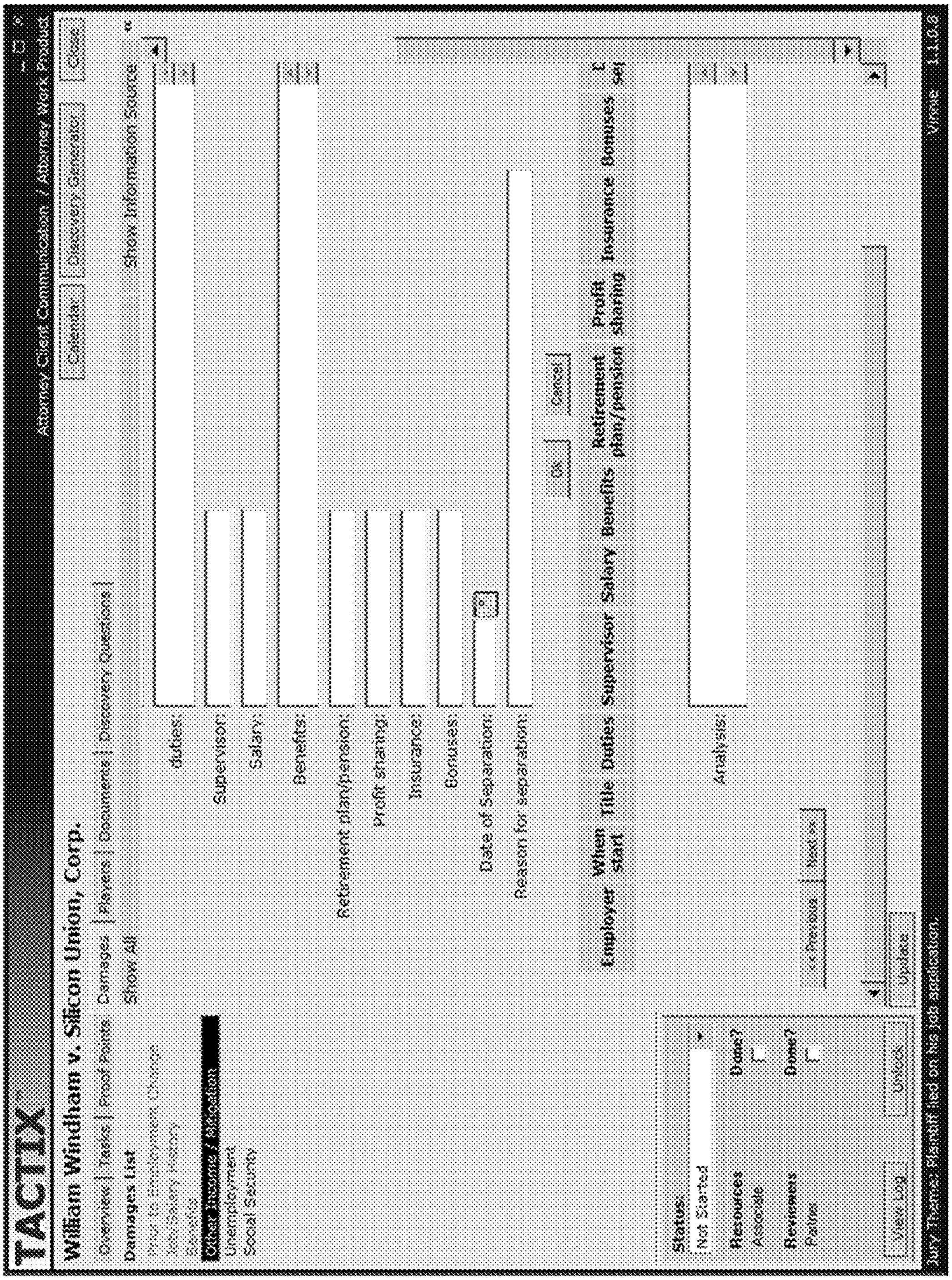
Figure 94:
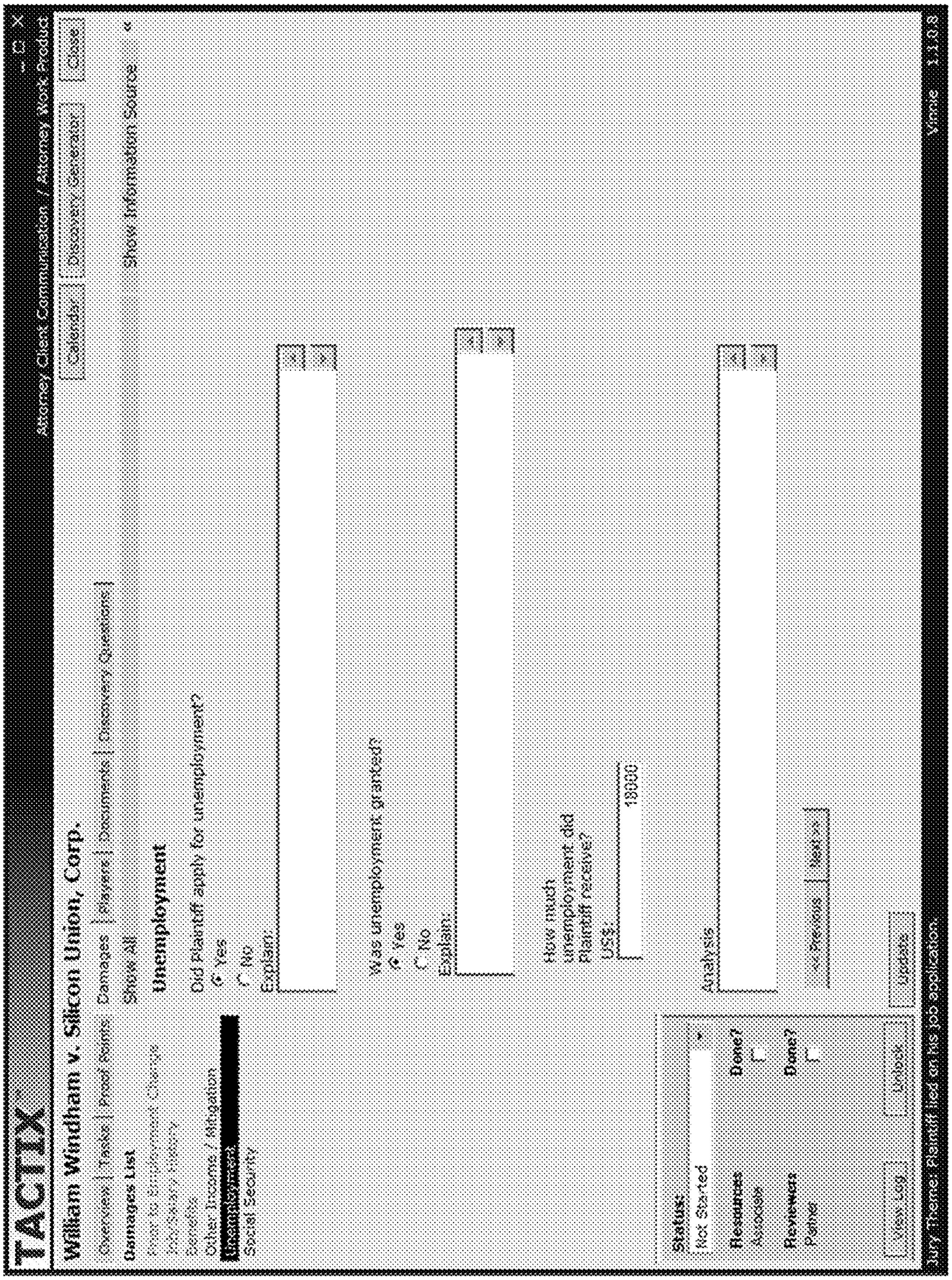
Figure 95:
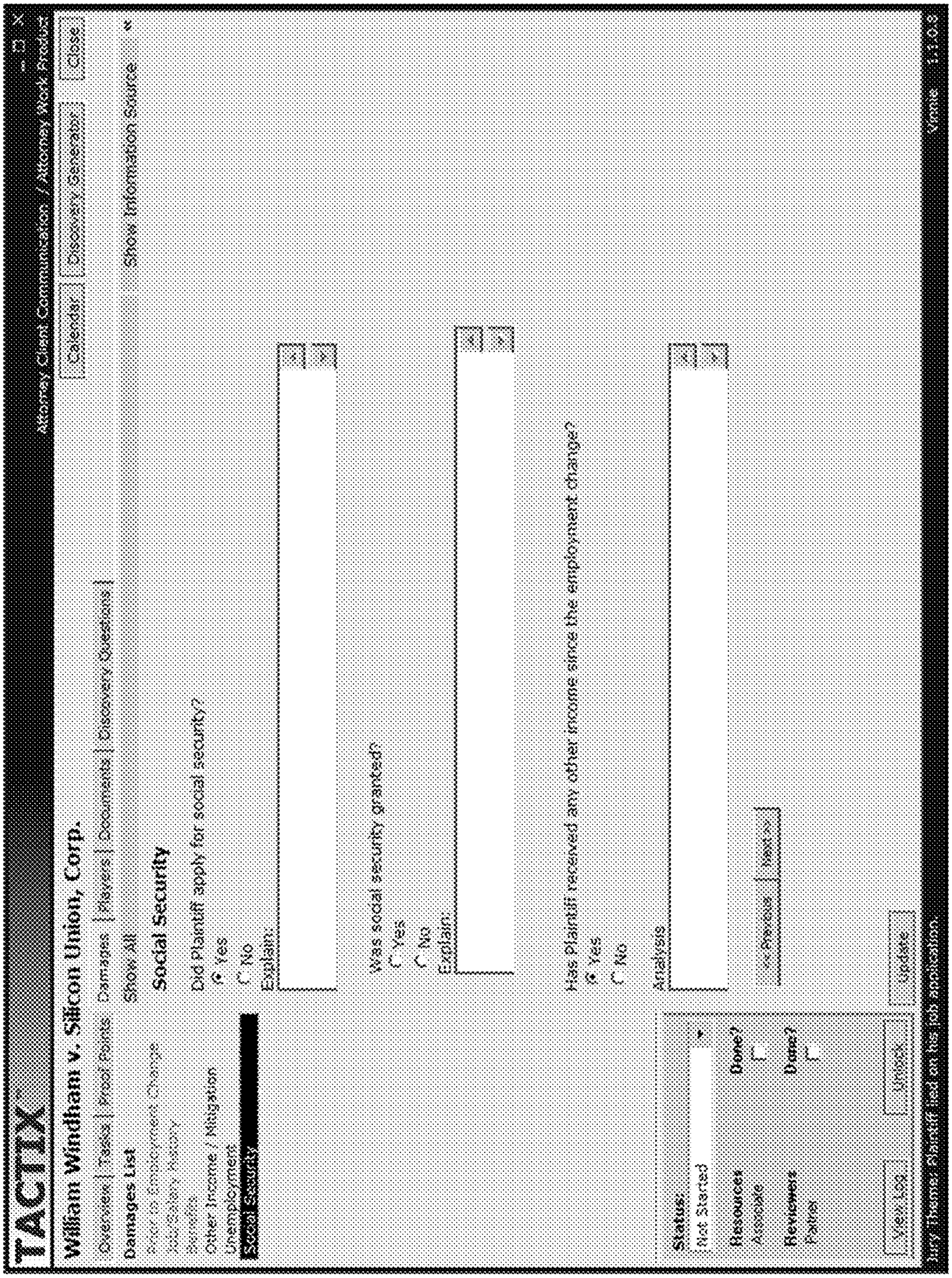

Similarly, FIGS. 81-83 are a series of screen shots of exemplary questions used to help determine the strength of an argument of the plaintiff that any termination grounds were actually a pretext for discrimination. Again, the data is gathered, analyzed, and stored.

Thus, this is a systematic way to gather all of the proof points necessary for the case, with the proof point data being used in the weighting analysis to help determine overall recommendation for the particular case.

It is also necessary to determine potential damages in the case to help do a complete assessment. Exemplary screen shots of FIGS. 84 through 95 are used to gather information relevant to the potential damages. The data will be entered by legal assistants or attorneys as necessary and would be used in the overall weighting analysis.

Figure 96:
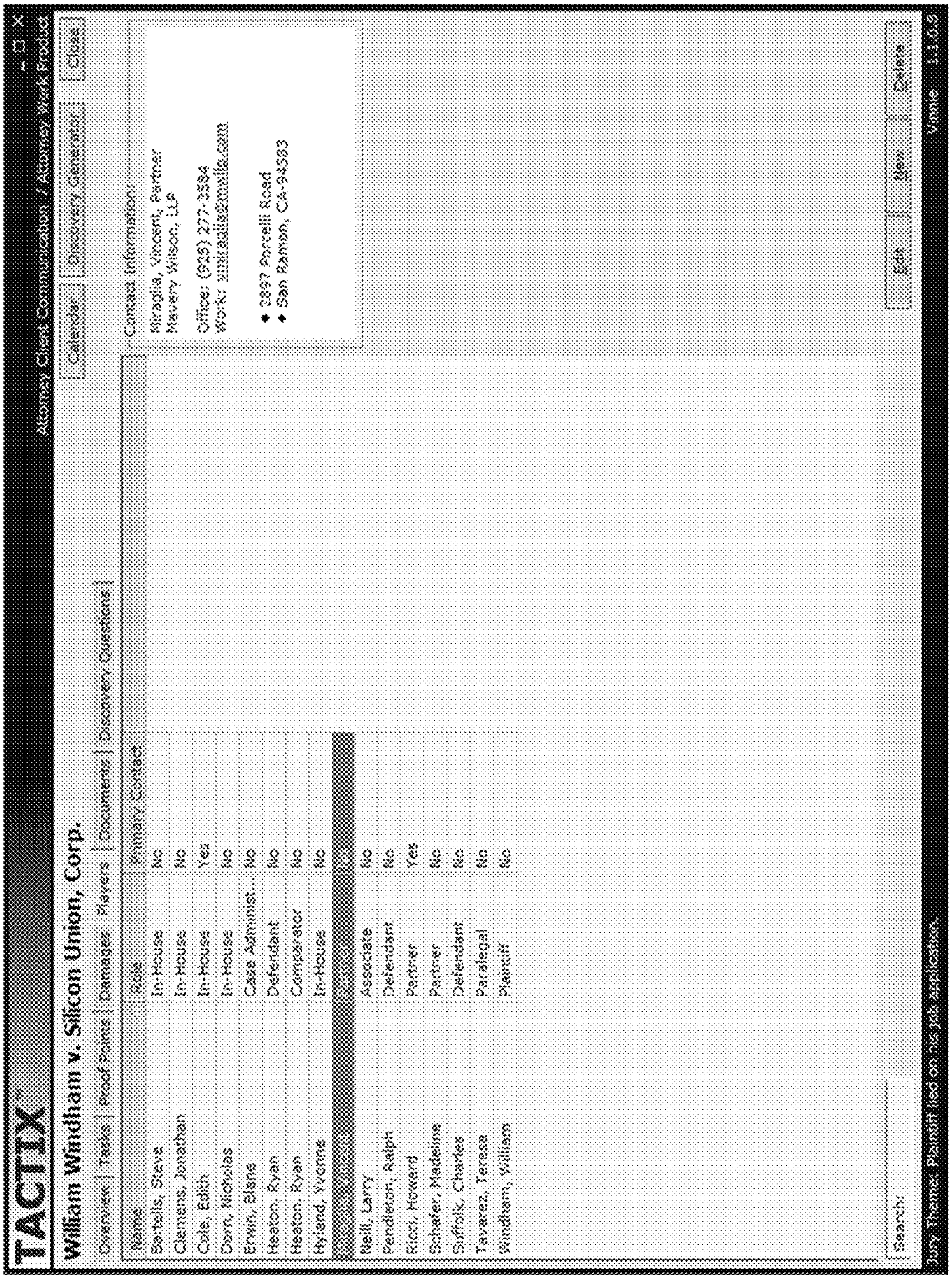
FIGS. 96 to 97 show example screen interfaces for relevant person or party information collection.
Figure 97:
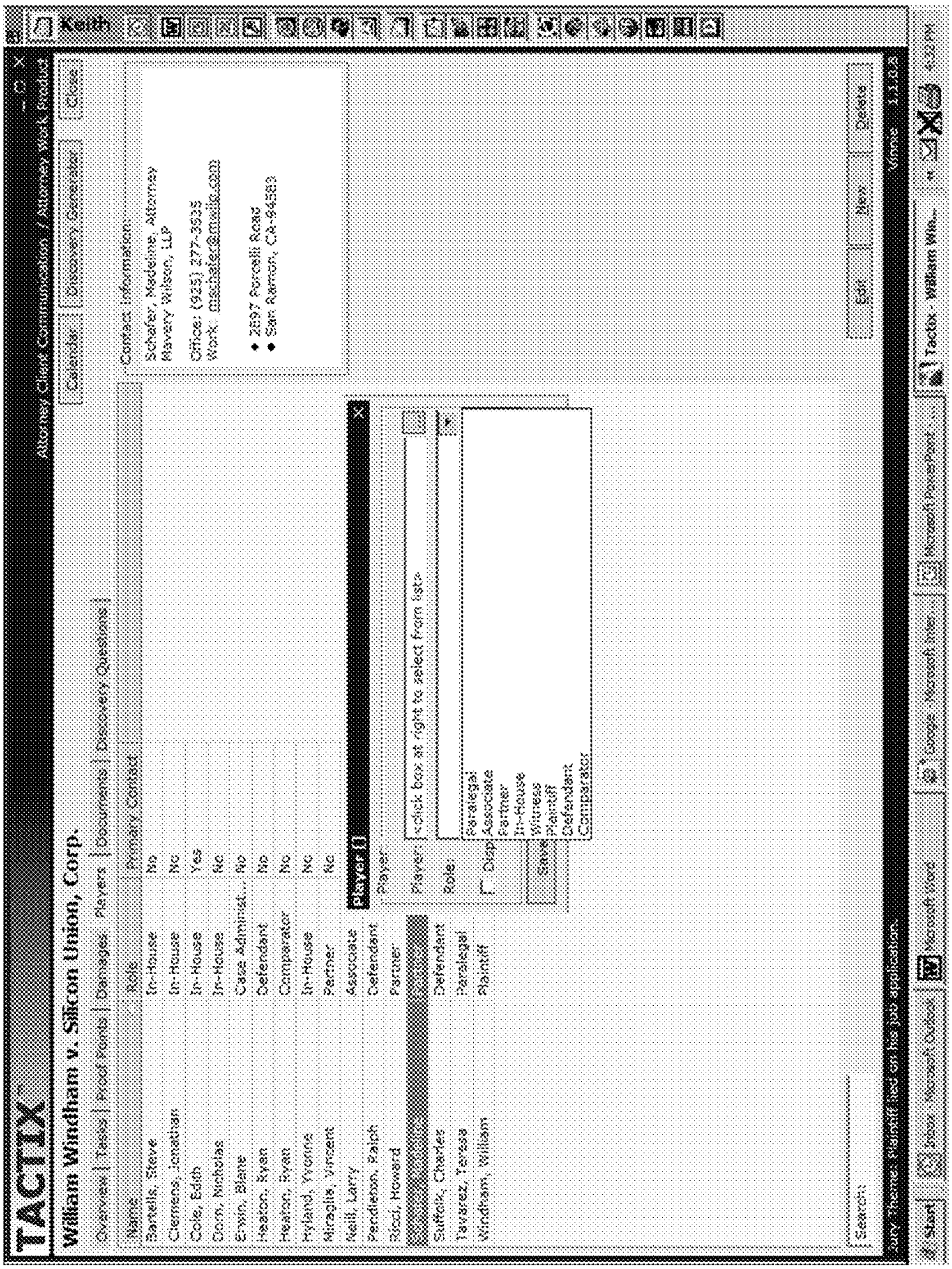

FIGS. 96 and 97 are administrative screens used to enter information about the particular parties, players, or personnel of interest in the particular lawsuit. This is used to readily maintain this information and collected for use in later stages of the lawsuit.

Figure 98:
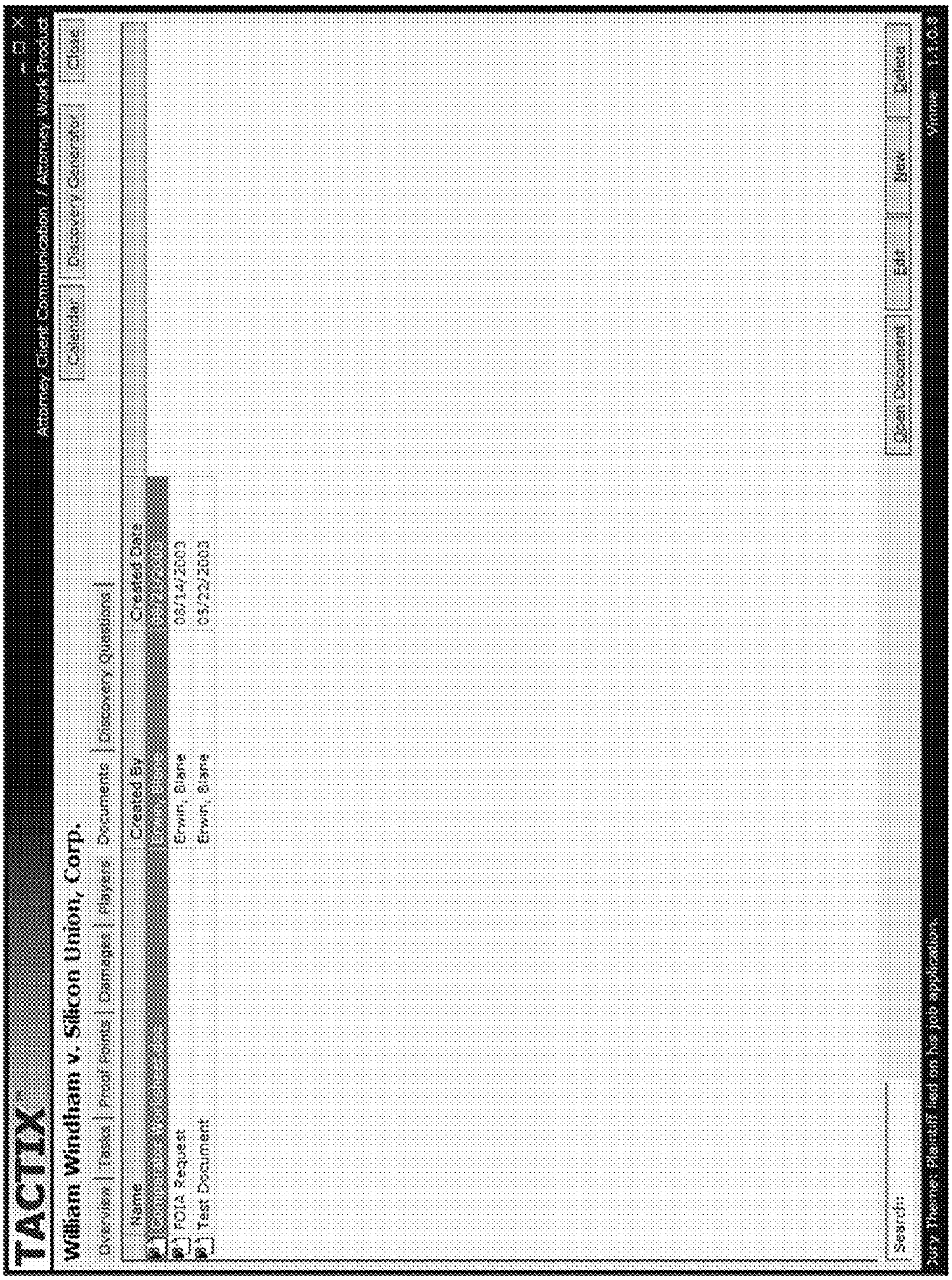
FIG. 98 shows an example screen interface for document collection.

FIG. 98 illustrates an exemplary screen shot used to list any relevant documents in the lawsuit that have been databased and logged in through the tool. The actual document can be logged in this database or a pointer to the particular document can be utilized. This allows simple selecting and organizing of the documents related to the lawsuit.

Figure 99:
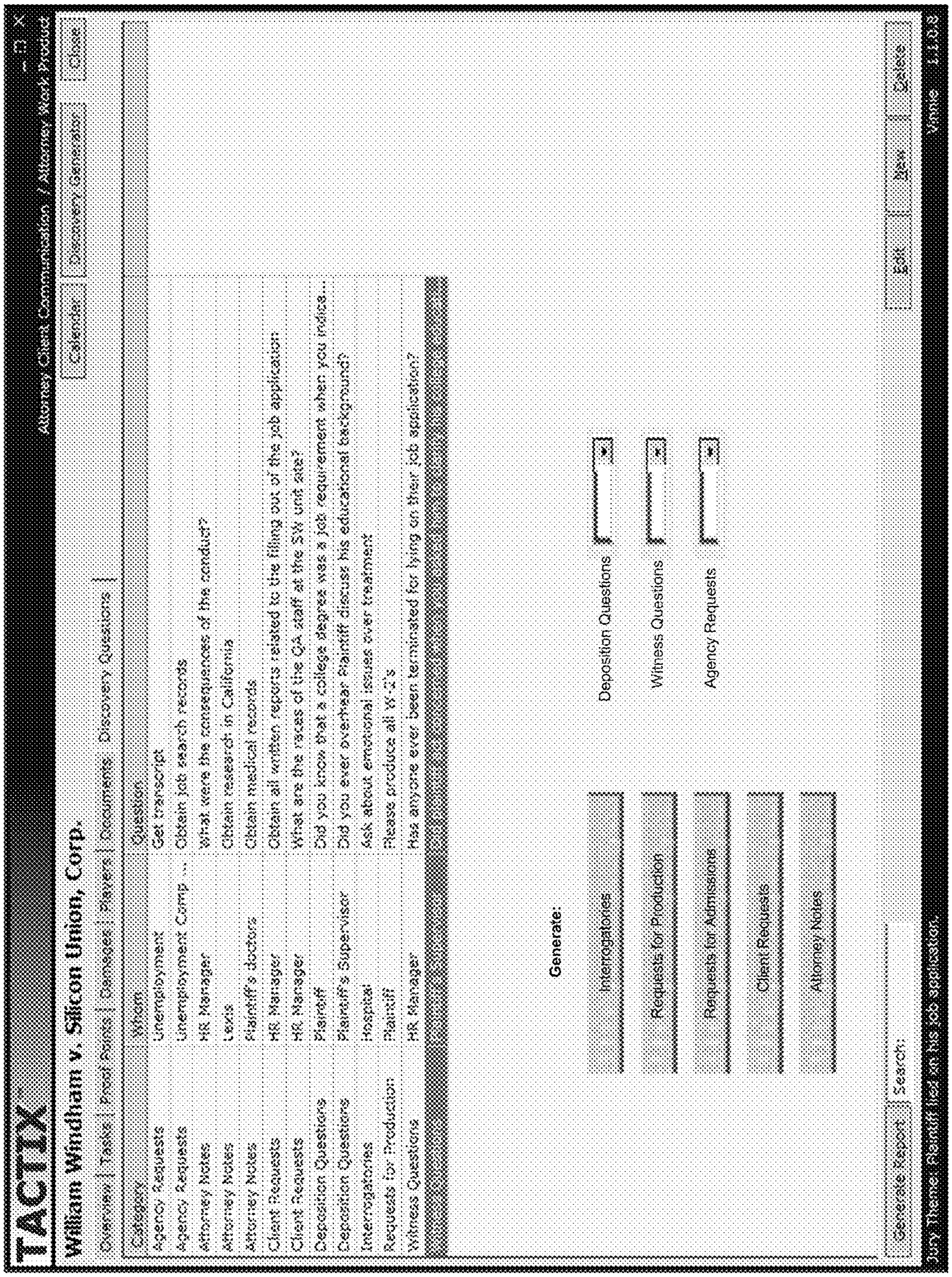
FIGS. 99 and 100 show example interfaces for collection and generation of discovery questions and materials.
Figure 100:
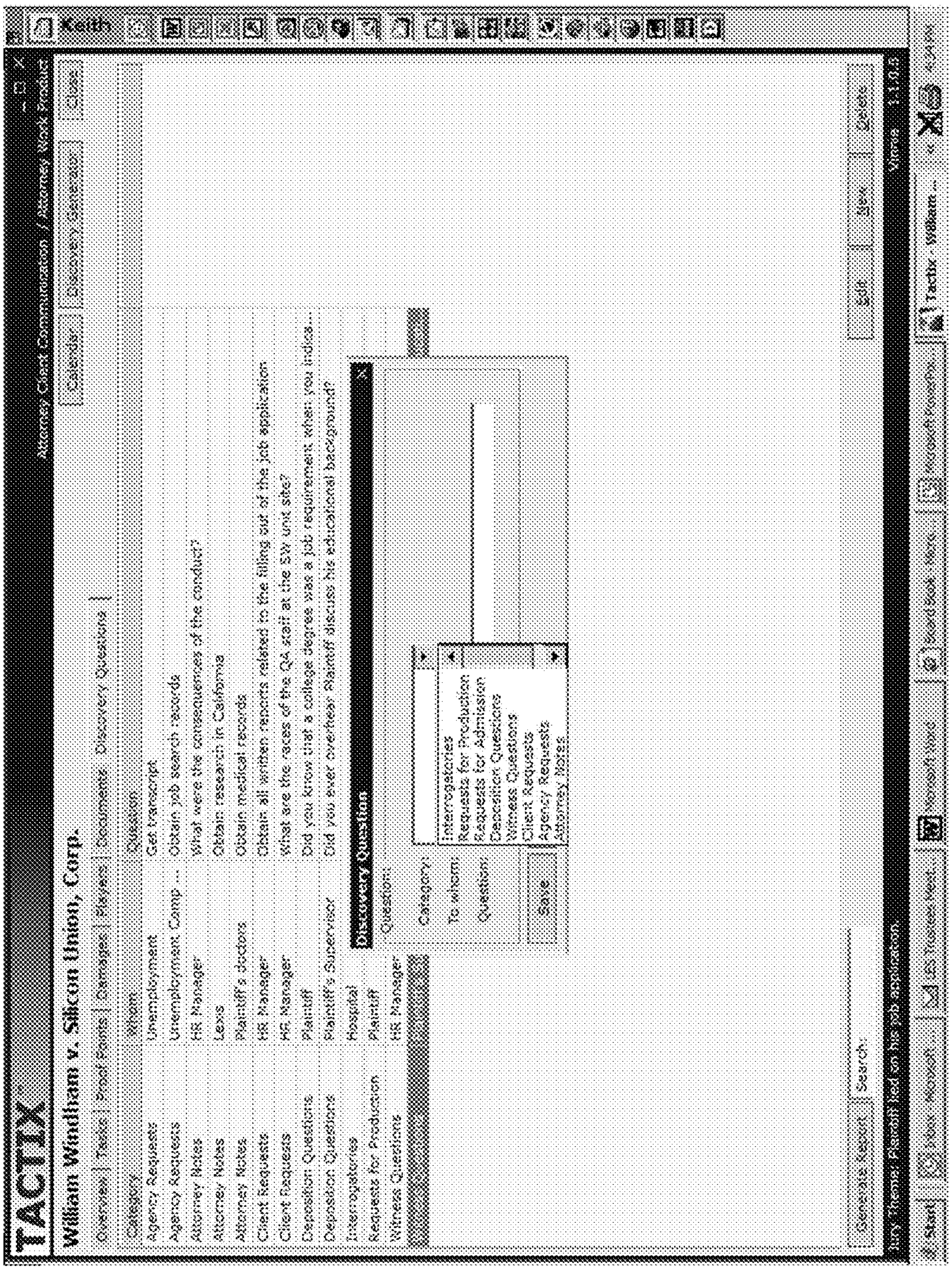

One of the important phases of a lawsuit is the discovery process. It is often long and complicated and used to gather much of the evidence and facts present for the particular case. It is common to have sample or form discovery materials available, particularly when the law firm is relatively experienced in a given area. However, in each particular case there are particular individualized discovery questions or relevant information which must be gained. Further, it is often common that these particular individualized questions are only developed as the evidence is being reviewed by the attorney and/or paralegal. To remember this particular question which has been developed during this document review, the person jots it down on a piece of paper or a note which is stuck on their monitor. Then during the course of the lawsuit the notes are lost or they fall off the monitor and are swept away. Thus this highly transitory and relevant information is lost and discovery is somewhat hampered. Review of FIGS. 99 and 100 illustrates that the tool includes a method of gathering and maintaining these particular transitory discovery questions. It is noted in the upper right-hand corner of the exemplary screen shots that there is a button indicated “Discovery Generator.” Clicking on Discovery Generator brings up a drop down box shown in FIG. 100. The class or category of discovery is indicated, an entry is made to whom the particular discovery is directed and then the ultimate question is entered. This question is then saved into a collection as shown on FIG. 99.

Also shown on FIG. 99 are a series of buttons and drop downs to generate the particular discovery materials. For example, buttons are shown for interrogatories, requests for production, requests for admissions, client requests and attorney notes. For deposition questions, witness questions, and agency requests, because these would all be directed to particular parties, selection boxes are provided to determine which are the desired parties for the desired discovery. When the selection is made or the button is clicked, the particular materials are generated. The tool selects the particular discovery questions shown in FIG. 99 and merges them with other form discovery materials relating to the particular type. When this is done, each related output is developed, generally with suitable word processing tools. Secretaries and assistants could fine-tune the particular documents as necessary for review by the attorney, who would provide additional fine-tuning. Thus the tool allows for positive, secure collection of the transitory discovery questions developed during document review and automates the inclusion of these relevant questions into standard materials commonly used.

It is understood that the above illustration of a tool using an employment litigation example is just one specific implementation of a tool according to the invention. The tool could readily be used for most other forms of litigation, particularly repetitive types of litigation such as personal injury, medical malpractice, class actions and the like. Additionally, the tool can be used in other similar circumstances where data needs to be gathered and analysis made by skilled individuals, such as audit letters and other audit processes for example.

As can be seen, a tool according to the present invention allows lesser skilled individuals to be used to do data collection and analysis while retaining the experience of more skilled individuals. The more skilled individuals can readily review the data and analysis for further oversight. This allows case assessments to be done much more cost effectively.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A tool for developing litigation discovery materials, the tool comprising:

an entry field to request collection of discovery requests, the entry field available on a plurality of screens of a graphical user interface of a computer, the plurality of screens being not directly related to discovery;

a menu available on a graphical user interface of a computer for gathering discovery related information, said menu provided in response to a request using said entry field;

storage of discovery related information gathered from said menu;

form discovery materials; and a computer implementing a discovery production mechanism to combine stored discovery related information and form discovery materials to produce discovery items for use in litigation.

2. The tool of claim 1, wherein said menu includes information related to discovery type, relevant party and a discovery request.

3. The tool of claim 2, wherein said form discovery materials include materials for a plurality of discovery types and said computer implementing a discovery production generation mechanism determines a desired discovery type and combines stored discovery related information and form discovery materials for the desired discovery type.

4. The tool of claim 3, wherein said computer implementing a discovery production mechanism further determines a relevant party for selected discovery types and combines stored discovery related information and form discovery materials relevant only to the relevant party.

* * * * *